(12) United States Patent
Yousouf et al.

(10) Patent No.: US 11,909,613 B2
(45) Date of Patent: *Feb. 20, 2024

(54) ON-DEMAND OUTAGES NOTIFICATION IN A CLOUD ENVIRONMENT

(71) Applicant: SAP SE, Walldorf (DE)

(72) Inventors: Shenol Hulmi Yousouf, Sofia (BG);
Stoyan Zhivkov Boshev, Sofia (BG);
Petar Rusev Rusev, Tenevo (BG)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,031

(22) Filed: Jan. 23, 2023

(65) Prior Publication Data
US 2023/0269152 A1 Aug. 24, 2023

Related U.S. Application Data

(63) Continuation of application No. 17/584,536, filed on Jan. 26, 2022, now Pat. No. 11,563,657, which is a continuation of application No. 17/169,787, filed on Feb. 8, 2021, now Pat. No. 11,265,236.

(51) Int. Cl.
*H04L 43/0811* (2022.01)
*H04L 67/10* (2022.01)

(52) U.S. Cl.
CPC ......... *H04L 43/0811* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,548,125 B2 | 10/2013 | Liik et al. | |
| 8,879,712 B2* | 11/2014 | Kovalenko | H04L 43/0882 379/243 |
| 9,122,841 B2 | 9/2015 | Pavlov et al. | |
| 9,143,616 B2* | 9/2015 | Kovalenko | H04L 43/0882 |
| 9,432,398 B2 | 8/2016 | Iliev et al. | |

(Continued)

OTHER PUBLICATIONS

U.S. Appl. No. 17/067,223, filed Oct. 9, 2020, Boshev.

(Continued)

*Primary Examiner* — Quang N Nguyen
(74) *Attorney, Agent, or Firm* — Fish & Richardson P.C.

(57) ABSTRACT

The present disclosure relates to computer-implemented methods, software, and systems for on-demand outage notifications in a cloud environment. Data defining statuses of network calls exchanged between web agents registered at correspondingly different network segments of a cloud platform is evaluated to determine health statuses of the cloud platform. In response to receiving a request to subscribe an application for notifications for a current health status, registering, at the health service, the application to receive the notifications associated with health statuses of network connectivity of the cloud platform. The application is registered to receive the notifications at a subscription network address under a notification regime. A notification for the current health status of network connectivity of the cloud platform is dynamically provided by the health service. The notification is provided to the registered application according to notification rules defined in the notification regime.

20 Claims, 22 Drawing Sheets

(56) References Cited

U.S. PATENT DOCUMENTS

| | | |
|---|---|---|
| 9,450,700 B1 | 9/2016 | Van Tonder et al. |
| 9,602,521 B2 | 3/2017 | Iliev et al. |
| 9,826,035 B2 | 11/2017 | Genevski et al. |
| 10,275,346 B2 | 4/2019 | Boshev et al. |
| 10,374,904 B2* | 8/2019 | Dubey ............... H04L 43/045 |
| 10,528,624 B2 | 1/2020 | Boshev |
| 11,012,331 B1* | 5/2021 | Nightser ............ H04L 41/0677 |
| 11,265,236 B1 | 3/2022 | Yousouf et al. |
| 2006/0193300 A1 | 8/2006 | Rawat et al. |
| 2006/0256711 A1 | 11/2006 | Kusama et al. |
| 2009/0077230 A1 | 3/2009 | Poppe |
| 2009/0248883 A1 | 10/2009 | Suryanarayana et al. |
| 2014/0075009 A1* | 3/2014 | Kovalenko ............ H04L 43/04 709/224 |
| 2014/0109188 A1 | 4/2014 | Pavlov et al. |
| 2015/0248337 A1 | 9/2015 | Adler |
| 2015/0278042 A1 | 10/2015 | Antony et al. |
| 2015/0295800 A1 | 10/2015 | Bala et al. |
| 2015/0304158 A1* | 10/2015 | Dharmadhikari ..... H04L 41/046 714/37 |
| 2016/0080230 A1 | 3/2016 | Anand et al. |
| 2016/0210209 A1 | 7/2016 | Verkaik et al. |
| 2016/0259708 A1 | 9/2016 | Della Corte et al. |
| 2016/0294603 A1 | 10/2016 | Whitner et al. |
| 2016/0314543 A1 | 10/2016 | Krish et al. |
| 2016/0337204 A1* | 11/2016 | Dubey ............... G06F 3/04847 |
| 2018/0062961 A1 | 3/2018 | Numata |
| 2019/0140926 A1 | 5/2019 | Nayak et al. |
| 2019/0188107 A1 | 6/2019 | Alston et al. |
| 2019/0190778 A1 | 6/2019 | Easterling et al. |
| 2020/0145299 A1 | 5/2020 | Do et al. |
| 2020/0186455 A1 | 6/2020 | Lokhandwala et al. |
| 2020/0314168 A1 | 10/2020 | Nauerz et al. |
| 2021/0392048 A1* | 12/2021 | Olden ............... H04L 41/0816 |
| 2022/0255821 A1* | 8/2022 | Yousouf ............ H04L 41/0668 |
| 2022/0255822 A1 | 8/2022 | Yousouf et al. |
| 2022/0255823 A1 | 8/2022 | Yousouf et al. |
| 2022/0385528 A1 | 12/2022 | Yousouf et al. |
| 2023/0156032 A1* | 5/2023 | Andriani ............ H04L 63/20 726/22 |

OTHER PUBLICATIONS

U.S. Appl. No. 17/068,245, filed Oct. 12, 2020, Boshev.
U.S. Appl. No. 17/098,618, filed Nov. 16, 2020, Boshev et al.
U.S. Appl. No. 17/169,754, filed Feb. 8, 2021, Yousouf et al.
U.S. Appl. No. 17/169,787, filed Feb. 8, 2021, Yousouf et al.
U.S. Appl. No. 17/170,105, filed Feb. 8, 2021, Yousouf et al.
U.S. Appl. No. 17/170,166, filed Feb. 8, 2021, Yousouf et al.
U.S. Appl. No. 17/201,225, filed Mar. 15, 2021, Yousouf et al.
U.S. Appl. No. 17/208,496, filed Mar. 22, 2021, Boshev et al.
U.S. Appl. No. 17/208,558, filed Mar. 22, 2021, Boshev et al.
U.S. Appl. No. 17/325,810, filed May 20, 2021, Boshev et al.
U.S. Appl. No. 17/883,093, filed Aug. 8, 2022, Yousouf et al.
Git.wdf.sap.corp [online], "Abstract Design and Concepts (Without Consul)" Jul. 2020 [retrieved on Jul. 7, 2020], retrieved from: URL <https://git.wdf.sap.corp/plugins/gitiles/NGJP/JPaaS/com.sap.core.neo.architecture/+/refs/heads/master/jpaas/overall/crosstopics/Multi-DC/dc.health.service.high.level.design.md>, 18 pages.
Git.wdf.sap.corp [online], "Accessing the Rest API" Jul. 2020, [Retrieved on Jul. 7, 2020], retrieved from: URL <https://git.wdf.sap.corp/plugins/gitiles/NGJP/JPaaS/com.sap.core.neo.architecture/+/refs/heads/master/jpaas/overall/crosstopics/Multi-DC/dc.health.service.rest.api.md#health-check-statuses-api>, 12 pages.
Non-Final Office Action issued in U.S. Appl. No. 17/169,754 dated Sep. 15, 2021, 25 pages.
Non-Final Office Action issued in U.S. Appl. No. 17/170,105 dated Jun. 9, 2021, 25 pages.
Non-Final Office Action issued in U.S. Appl. No. 17/170,166 dated Jan. 10, 2022, 52 pages.
Wiki.wdf.sap.corp [online], "Evaluation of Health Check Data" Jul. 2020, [retrieved on Jul. 7, 2020], retrieved from: URL <https://wiki.wdf.sap.corp/wiki/display/DR/Evaluation+of+Health+Check+Data#EvaluationofHealthCheckData-CalculatingtheStatusofGlobalOutages>, 16 pages.

* cited by examiner

ON-DEMAND OUTAGES NOTIFICATION IN A CLOUD ENVIRONMENT

CLAIM OF PRIORITY

This application claims priority under 35 USC § 120 to U.S. patent application Ser. No. 17/584,536, filed on Jan. 26, 2022, now U.S. Pat. No. 11,563,657, issued on Jan. 24, 2023, entitled "ON-DEMAND OUTAGES NOTIFICATION INA CLOUD ENVIRONMENT"; which claims priority to and under 35 USC § 120 to U.S. patent application Ser. No. 17/169,787, filed on Feb. 8, 2021, now U.S. Pat. No. 11,265,236, issued on Mar. 1, 2022, entitled "ON-DEMAND OUTAGES NOTIFICATION IN A CLOUD ENVIRONMENT", Issued as U.S. Pat. No. 11,265,236 on Mar. 1, 2022; the entire contents of each and together are hereby incorporated by reference.

TECHNICAL FIELD

The present disclosure relates to computer-implemented methods, software, and systems for data processing in a cloud environment.

BACKGROUND

Software complexity is increasing and causes changes in the software product cycles, requirements, and possibilities for delivery of software applications and platform systems. Customer's needs are transforming, with increased requests for flexibility in terms of processes and landscapes, and also high availability to access software resources provided by the underlying platform infrastructure. Cloud environments may experience network connectivity disruptions, hardware failures, and other technical issues affecting responsiveness of running software applications, services, and databases. Disruptions at the cloud environments may be associated with disruptions of services provided to external entities by the databases, applications, and/or services.

SUMMARY

The present disclosure involves systems, software, and computer implemented methods for determining health status for network connectivity of applications, databases, and services running on a cloud platform.

In a first aspect, one example method may include operations such as configuring a plurality of internal web agents installed at a corresponding plurality of network segments of a first cloud platform and a plurality of external web agents installed at an external second cloud platform, wherein the plurality of internal web agents and the plurality of external web agents are configured to perform network calls between themselves and the other web agents and to store response data for sent and received network calls, wherein an internal web agent from the plurality of internal web agents is configured to execute an external network call to an external resource available on the Internet to collect response data; automatically collecting data from the plurality of internal web agents to generate structured data defining network connectivity status corresponding to the plurality of network segments of the first cloud platform based on the performed network calls between the internal and external web agents; and in response to evaluating the structured data, determining a health status of network connectivity of the first cloud platform to be provided to platform services provided by the first cloud platform and/or applications running on the first cloud platform to support managing of lifecycles of entities running on the first cloud platform.

In some instances, evaluating the structure data may include determining whether there is an outage associated with the cloud platform, wherein an outage is determined based on response results of the performed network calls between the plurality of internal web agents and the plurality of external web agents. In those instances, in response to determining that there is an outage, determining scope of the outage, wherein the scope of the outage defines limited network segments of the cloud platform, wherein the outage is associated with at least one of an outbound, inbound, and internal network connection disruptions.

In some instances, the example method may include providing a notification to at least one subscribed entity running at one of the plurality of network segments on the first cloud platform. The notification may include an identification of the scope of the determined outage.

In some instances, determining the health status of network connectivity of the first cloud platform may include identifying a network outage at a network segment from the plurality of network segments based on the evaluation of the structured data, wherein identifying the network outage comprises determining a limit of connectivity between at least one of (i) entities running at the network segment and entities at other network segments of the first cloud platform, (ii) entities running at the first cloud platform and entities running at different cloud platforms connected to the first cloud platform, and (iii) external resources to the first cloud platform accessible over the Internet.

In some instances, at least one web agent from the plurality of internal web agents is installed within each of the network segments of the first cloud platform.

In some instances, the network segments may include a core segment, a service segment, a database segment, and an application segment.

In some instances, the service segment may include one or more application services providing services for consumption by one or more applications running at the application segment of the first cloud platform and/or to entities running at external environments for the first cloud platform, wherein an application service from the one or more application services consumes data from a database running at the database segment.

In some instances, the application segment may include the one or more applications that provide services for consumption by other applications running at the first cloud platform and/or at external environments for the first cloud platform, wherein an application from the one or more applications consumes data from a database running at the database segment.

In some instances, the database segment may include one or more databases to store data that is accessible for consumption by at least one of an application service at the service segment and an application at the application segment running at the first cloud platform.

In some instances, the data from the plurality of internal web agents may be collected at a monitoring service running at the core segment, and wherein the collected data from the monitoring service is evaluated by a health service running at the core segment to generate the structured data.

In some instances, the determined health status may include at least one of (i) information defining a network outage being an outbound connectivity network outage, wherein the outbound connectivity network outage limits entities running at the first cloud platform to send requests and access services running on an external cloud platform and/or the Internet, and (ii) information defining a network outage being an inbound connectivity network outage, wherein the inbound connectivity network outage limits an entity running on the first cloud platform to provide services to other entities running on an external cloud platform and/or the Internet.

In some instances, the example method may include receiving a request for a health outbound connectivity status of the first cloud platform, wherein the request is received from an application running on the first cloud platform; and in response to the received request, providing the outbound connectivity status to the application, wherein the outbound connectivity status is determined based on the determined health status of the first cloud platform.

In some instances, the external web agents may be installed and configured at the second cloud platform communicatively coupled to the first cloud platform.

In some instances, the automatically collected data from the plurality of internal web agents is collected at predefined periodic time periods.

Other implementations of this first aspect include corresponding systems, apparatus, and computer programs, configured to perform the actions of the methods, encoded on computer storage devices.

In a second aspect, an example method may include iteratively collecting, at a plurality of availability zones of a first cloud platform, internal structured data defining network connectivity statuses of network segments, wherein the network segments are correspondingly defined for the plurality of availability zones of the first cloud platform, and wherein the plurality of availability zones of the first cloud platform are defined in a multiple availability zone cloud architecture; iteratively collecting, at the plurality of availability zones of the first cloud platform, external structure data defining inbound connectivity statuses of the network segments correspondingly defined for the plurality of availability zones of the first cloud platform, wherein the inbound connectivity statuses define availability for an entity running at an external cloud platform to the first cloud platform to connect to at least one entity running at the first cloud platform; and in response to evaluating the internal and external structured data, determining a health status of the first cloud platform to be provided to platform services provided by the first cloud platform and/or applications running on the first cloud platform to support managing of lifecycle of entities running on the first cloud platform, wherein the health status includes at least one of an inbound connectivity status of the first cloud platform, an outbound connectivity status of the first cloud platform, and an internal connectivity status of the first cloud platform.

In some instances, the inbound connectivity status may define external cloud accessibility status for network connectivity between entities running at an external second cloud platform and entities running at the first cloud platform.

In some instances, the outbound connectivity status may define an accessibility status for network connectivity between entities running at different network segments from the plurality of availability zones and external resources available over the Internet.

In some instances, the internal connectivity status may define internal zone accessibility status between entities running at a network segment of the network segments of a first zone from the plurality of availability zones and entities running at a network segment of the network segments of the first zone and/or of a second zone of the plurality of availability zones of the first cloud platform.

In some instances, the example method of the second example may include automatically collecting, at a first monitoring service running at a first availability zone of the first cloud platform, first data from a first plurality of internal web agents to generate structured data corresponding to network segments of the first availability zone. The first data may include status data for sent and/or received network calls at the first plurality of internal web agents. In some instances, the example method may also include automatically collecting, at a second monitoring service running on at a second availability zone of the first cloud platform, second data from a second plurality of internal web agents to generate structured data corresponding to network segments of the second availability zone. The second data includes status data for sent and/or received network calls at the first plurality of internal web agents. The iteratively collected internal structured data at the plurality of availability zones of the first cloud platform may include the first data and the second data.

In some instances, the automatic collection of the first and the second data at the first monitoring service and the second monitoring service may further include: automatically collecting, at the first monitoring service and at the second monitoring service, external connectivity data for external accessibility of corresponding network segments at the first availability zone and at the second availability zone of the first cloud platform, wherein the external connectivity data is received from a second cloud platform external to the first cloud platform, and wherein the external connectivity data is based on status data for sent and/or received calls at external web agents running at the second cloud platform. The iteratively collected external structured data at the plurality of availability zones of the first cloud platform includes the external connectivity data.

In some instances, a first plurality of internal web agents that is installed at a first plurality of network segments of a first availability zone of the first cloud platform is configured to perform network calls to entities running at the corresponding plurality of network segments of the first availability zone. The first cloud platform may include the plurality of availability zones that are accessible through one network address, and a second plurality of internal web agents is installed at a second plurality of network segments of a second availability zone of the first cloud platform.

In some instances, the example method of the second aspect may include configuring a plurality of external web agents installed at the external cloud platform to execute network calls to a plurality of internal web agents running at different network segments defined correspondingly for the plurality of availability zones of the first cloud platform.

In some instances, the plurality of external web agents are configured to perform network calls to an entity running at a network segment of at least one of the plurality of availability zones of the first cloud platform.

In some instances, determining the health status may include identifying a network outage at a network segment from the network segments of at least one of the plurality of availability zones based on the evaluation of the external and internal structured data. At least some on the external and internal structured data identifies failure in connectivity between an internal web agent running at the network segment and at least one internal web agent running at another network segment, and wherein the network outage limits connectivity between at least one of entities running at the network segment and entities at other network segments of the first cloud platform, entities running at the first cloud platform and entities running at different cloud platforms connected to the first cloud platform, and external resources to the first cloud platform accessible over the Internet.

In some instances, determining the health status of the cloud platform may include: determining whether there is an outage associated with the cloud platform, wherein the outage is identifiable at a network segment from the network segments based on the evaluation of the data defining the statuses of the network calls exchanged, wherein the outage limits connectivity between at least one of i) entities running at the network segment and entities at other network segments of the first cloud platform, ii) entities running at the first cloud platform and entities running at different cloud platforms connected to the first cloud platform; and in response to determining that there is an outage, determining scope of the outage, wherein the scope of the outage defines limited network segments from the cloud platform for outbound and inbound connections, wherein a network segment from the limited network segments is determined as affected by the outage when at least a portion of the internal and external structured data identifies failed calls to an internal web agent running at the network segment from an external entity running at other network segment on the first cloud platform different from the limited network segments and/or an external entity running in a different, second, cloud platform.

Other implementations of this second aspect include corresponding systems, apparatus, and computer programs, configured to perform the actions of the methods, encoded on computer storage devices.

In a third aspect, an example method may include evaluating, at a health service running on a cloud platform, data defining statuses of network calls exchanged between web agents registered at correspondingly different network segments of the cloud platform to determine health statuses of the cloud platform; in response to receiving a request to subscribe an application for notifications for a current health status, registering, at the health service, the application to receive the notifications associated with health statuses of network connectivity of the cloud platform, wherein the application is registered to receive the notifications at a subscription network address under a notification regime; and dynamically providing, by the health service, a notification for the current health status of network connectivity of the cloud platform, the notification being provided to the registered application according to notification rules defined in the notification regime, wherein the notification rules include a rule defining granularity of data associated with provided current health status of the cloud platform that is to be provided to the registered application with the notification.

In some instances, the health service may store, at a health service storage maintained at the cloud platform, metadata about the registered application and the subscription network address.

In some instances, the example method of this third aspect may include determining, at the health service, health statuses of the cloud platform, wherein determining a health status of the health statuses includes at least one of i) an inbound connectivity status of the cloud platform, ii) an outbound connectivity status of the cloud platform.

In some instances, the example method of this third aspect may include determining a health status of the cloud platform, wherein determining the health status of the cloud platform comprises determining an internal connectivity status between a plurality of availability zones of the cloud platform, wherein the first cloud platform is defined in a multiple availability zone architecture including the plurality of availability zones.

In some instances, the example method of this third aspect may include automatically receiving, at the health service running on the cloud platform, the data from a monitoring service running on the cloud platform, wherein the monitoring service collects the data from the web agents installed and registered at the different network segments of the cloud platform.

In some instances, in response to receiving the data from the monitoring service running on the cloud platform, structured data correspondingly defining network connectivity status for the different network segments is generated at the health service. The current health status of the first cloud platform can be determined based on evaluating the structured data according to predefined status evaluation rules. The notification to the registered application can be provided to include the determined current health status.

In some instances, the notification to the registered application can be dynamically provided in response to determining a change between a previously determined health status and the current health status of the cloud platform.

In some instances, the received request to register the application defines the notification regime as a regular notification process, and wherein under the regular notification process the health service is configured to provide scheduled notifications in regular time period intervals to the registered network address with current health statuses of the first cloud platform, wherein the time period intervals are predefined for the registered application.

In some instances, the example method of this third aspect may further include: maintaining, at a storage of the health service, records including health statuses of the cloud platform, wherein the records are associated with consecutive time points when corresponding health statuses are determined by the health service according to health evaluation logic.

In some instances, the received request to register the application defines the notification regime as a notification process triggered by a change between determined consecutive health statuses, and wherein the health service is configured to provide the notification to the registered network address with the current health status of the first cloud platform.

In some instances, the example method of this third aspect may further include installing and configuring a first set of the plurality of web agents as internal web agents installed at a corresponding plurality of network segments of a first cloud platform and a plurality of external web agents installed at an external second cloud platform to perform network calls to entities running at corresponding network segments from the plurality of network segments.

In some instances, the example method of this third aspect may further include that in response to determining that the registered application is non-responsive to within a predefined time period, actively unregistering, at the health service, the application to receive the notifications.

In some instances, the example method of this third aspect may further include determining a health status of the cloud platform. In some instances, determining the health status of the cloud platform may include determining whether there is an outage associated with the cloud platform, wherein an outage is identifiable at a network segment from the network segments based on the evaluation of the data defining the statuses of the network calls exchanged, wherein the outage limits connectivity between at least one of i) entities running at the network segment and entities at other network segments of the first cloud platform, ii) entities running at the first cloud platform and entities running at different cloud platforms connected to the first cloud platform, and in response to determining that there is an outage, determining scope of the outage, wherein the scope of the outage defines limited network segments from the cloud platform for outbound and inbound connection.

In some instances, the example method of this third aspect may further include in response to determining the scope of the outage, determining an outage status level from a predefined set of levels; in response to determining the outage status level, determining corresponding actions for an entity running on the cloud platform that is affected by the outage, wherein actions include countermeasures related to the execution of the entity to provide services by the entities affected by the outage.

Other implementations of this third aspect include corresponding systems, apparatus, and computer programs, configured to perform the actions of the methods, encoded on computer storage devices.

In a fourth aspect, an example method may include: iteratively collecting, at a health service, aggregated data for network connectivity status of web agents at the cloud platform, wherein the aggregated data is generated based on network call log data for external accessibility of the web agents, wherein the web agents run at different network segments of the cloud platform, and wherein the network call log data is generated based on executed network calls issued from one or more external web agents running outside of the cloud platform and directed to each of the web agents at the cloud platform; receiving a poll request for a network connectivity status for inbound connectivity for an entity running on the cloud platform, wherein the inbound connectivity is defined between the cloud platform and an external cloud platform; and in response to evaluating the collected aggregated data, providing the network connectivity status for inbound connectivity for the entity.

In some instances, the poll request is received from the entity running on the cloud platform. In some instances, the poll request is received from a service manager of the cloud platform.

In some instances, the example method of the fourth aspect may include collecting, at a monitoring service running on the cloud platform, data including a plurality of health statuses associated with external accessibility of the web agents of the cloud platform from external web agents running on an external cloud platform, wherein the data is aggregated to determine the network connectivity status of the cloud platform from the external cloud platform.

In some instances, the example method of the fourth aspect may include dynamically maintaining health statuses for external accessibility for the web agents running at the cloud platform. The cloud platform includes a plurality of network segments and each network segment includes at least one web agent. The health statuses may be determined based on tracking of consecutively received network calls issued from one or more of the external web agents and directed to each of the web agents.

In some instances, the health statuses may be defined on a predefined scale based on tracking of time elapsed since the latest received network call from an external web agent.

In some instances, the example method of the fourth aspect may include that in response to determining that the tracked time elapsed since the latest received network call is above a predetermined threshold value, a current health status of a web agent is dynamically updated.

In some instances, a health status of a web agent may be determined on a predefined scale that maps a counter value maintained at the web agent to the predetermined scale to determine the health status, wherein the counter value stores a time period that has lapsed since the latest received network call from an external web agent.

Other implementations of this fourth aspect include corresponding systems, apparatus, and computer programs, configured to perform the actions of the methods, encoded on computer storage devices.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
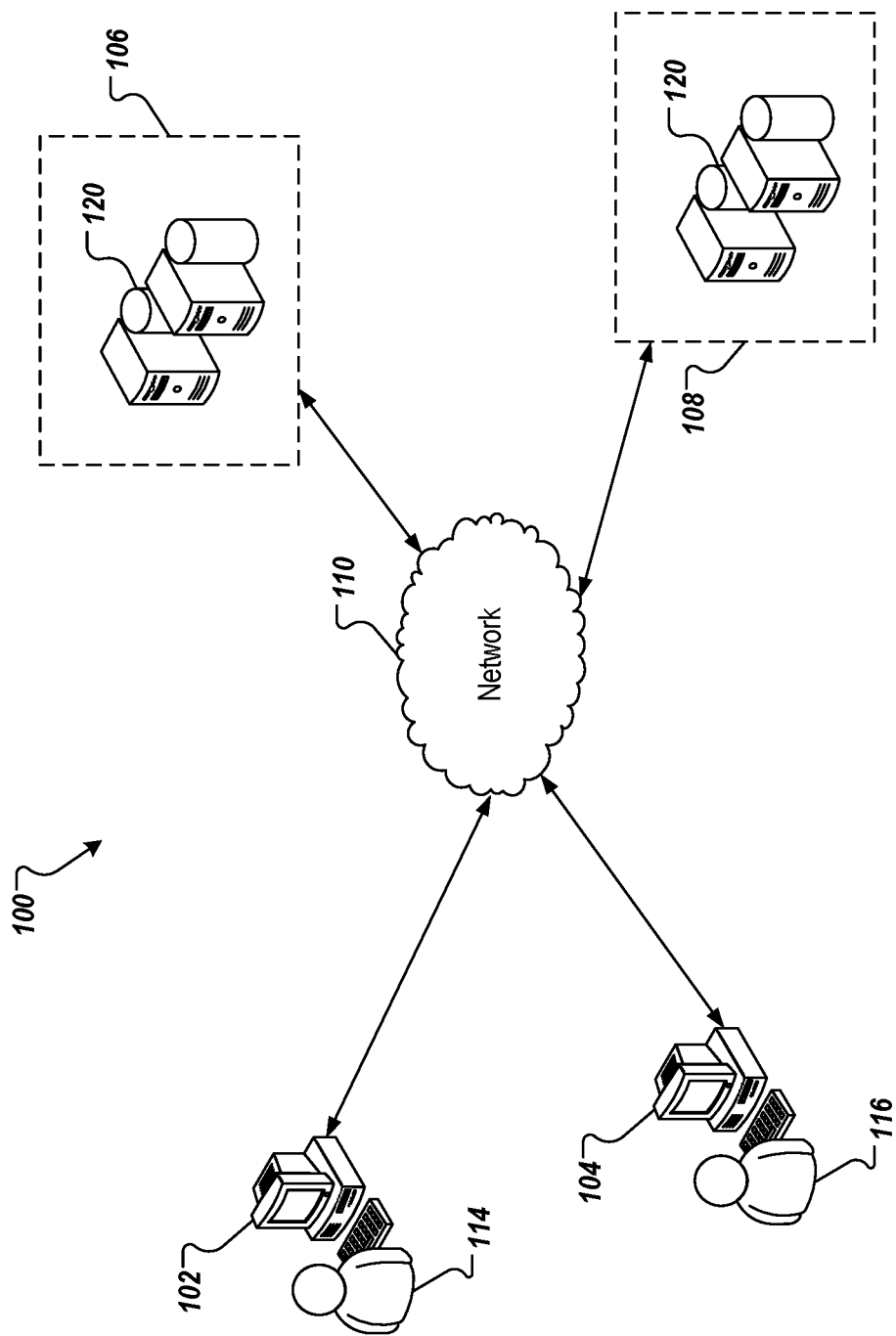
FIG. 1 illustrates an example computer system architecture that can be used to execute implementations of the present disclosure.

The present disclosure describes various tools and techniques for determining and monitoring the health status of network connectivity in a cloud environment. In a first aspect, the present disclosure describes various tools and techniques for detecting outages in a cloud environment. In a second aspect, the present disclosure describes various tools and techniques for determining an application segment health status of a cloud platform. In a third aspect, the present disclosure describes various tools and techniques for providing notification for a health status of network connectivity of a cloud platform. In a fourth aspect, the present disclosure describes various tools and techniques for detecting isolated zones of a cloud platform.

In some instances, a cloud platform may experience disruptions in the network connectivity. For example, a disruption may be caused by a failure in the underlying hardware and/or infrastructure where the cloud platform is hosted. The disruptions may affect in part or as a whole the cloud platform. In some instances, the disruptions may affect some or all connection types associated with the cloud platform. For example, different connection types may include inbound connections, outbound connections, and internal cloud connections, among others. An inbound connection type may refer to a connection coming into the cloud platform from a remote location. For example, the inbound connection could be from a web browser connecting to the cloud platform, from a remote server or system connecting to the cloud platform, or among other example hosted entities that can interact with the cloud platform. An outbound connection type may refer to a connection going out to an external entity from the cloud platform. For example, the external entity may be a specific device, another hosted application or service on an external infrastructure, or any suitable hosted entities that can be accessed from entities running on the cloud platform. An internal cloud connection may refer to a connection between entities running on the cloud platform. For example, an application hosted on the cloud platform may access resources provided by a platform provided service or a database.

A disruption in the connectivity may be associated with an outage having a given scope and affecting connections of certain type(s) (e.g., some or all of the connection types) associated with the cloud platform. For example, a disruption in the connectivity may be defined as an internal outage within the cloud platform, as an external outage for external accessibility of resources to and from the cloud platform, or as both external and internal outage. An internal outage may be associated with connectivity between entities running within the cloud platform, and may affect internal cloud connections. For example, an application running on the cloud platform may be restricted to access a database running on the cloud platform due to an internal outage between an application and a database segment where these instances are running. An external outage may restrict connectivity between the cloud platform and an external environment. In some instances, the external environment can be a connected cloud platform or an externally hosted application or service, and may be a cloud or an on-premise environment. The external outage may also be associated with inbound and/or outbound connections.

In some instances, a disruption in the network connectivity at a cloud platform may affect the execution of entities including software applications, application and/or platform services, databases, and among other entities that can be hosted on the cloud platform. The network connectivity disruption may be defined as an outage that may lead to downtime for a running entity and a disruption in the provided services and data from the running entity to end users. In some of those instances, a disruption in the network connectivity may result in unavailability, including the inability to access entities running on the cloud platform from an external point. In such cases, a cloud hosted application, service, or database may not be accessible from an external cloud platform or from an external service hosted on the Web. In some more instances, disruptions in the network connectivity may be associated with a connectivity outage between different segments of the cloud platform or between different availability zones defined within the cloud platform.

Due to a network connectivity disruption associated with a cloud platform, availability of services and resources provided by entities hosted on the cloud platform may be limited. Since availability of entities running on the cloud platform can be adversely affected by a network connectivity disruption, monitoring of a health status of the cloud platform can be performed to dynamically determine changes in a network connectivity status of the cloud platform. In response to determining a change, a notification for a network connection failure or a network connection recovery can be provided. For example, in response to determining a network failure, affected connection types may be determined and corresponding parts (e.g., network segments or availability zones) within the cloud platform that are associated with the network failure can be located.

In response to monitoring accessibility of different network segments and/or cloud zones of the cloud platform, notifications about outages due to network failures can be provided and appropriate countermeasures can be undertaken.

In some instances, a monitoring framework for detecting network disruptions between different cloud segments that affect execution of process scenarios associated with one or more entities running on the cloud platform may be provided. Monitoring the availability of different parts of the cloud platform can be performed by installing and configuring web agents within the cloud platform and at external locations for the cloud platform to execute remote calls and to store call log data. In some instances, the call log data may not be persisted but rather stored in memory. In such cases, detecting network disruptions would not rely on verifications performed based on persisted data, for example, stored at a database. Log data for executed network calls between web agents, including both internal and external web agents for the cloud platform, can be collected and processed to determine a health status of network connectivity of the cloud platform. In some instances, the multiple web agents can be deployed at a segment of the cloud platform. In those cases, calls can be executed to the multiple web agents from one segment to determine health status of the segment and to support high availability of the maintained information for the health status for the different segments in the cloud platform. In some of those instances, even if one web agent does not function properly and is inaccessible (e.g., due to an internal break-down), the rest of the web agents may function properly and may provide a reliable health status for the segment. Based on a determined health status, outages of different scope that affect the availability of a part or the whole cloud platform may be reported.

FIG. 1 depicts an example architecture 100 in accordance with implementations of the present disclosure. In the depicted example, the example architecture 100 includes a client device 102, a client device 104, a network 110, and a cloud environment 106, and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing devices such as a desktop computer, a laptop computer, a handheld computer, a tablet computer, a personal digital assistant (PDA), a cellular telephone, a network appliance, a camera, a smartphone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 includes at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple segments, for example, a core network segment, an application network segment, a service network segment, and a database network segment. The application network segment can include multiple applications. The service network segment can include multiple services, including application services and cloud platform provided services. The hosted applications and services can run on VMs hosted on cloud infrastructure. In some instances, one application can run as multiple application instances on multiple corresponding VMs, where each application instance is running on a corresponding VM.

In the cloud environment 106, an application may be running at an application network segment to provide end-user services, which can include, for example, services associated with requests sent through the network 110 from user 114 (or user 116) over device 102 (or device 104). The applications and the databases that are running in the cloud environment 106 may be designed, developed, executed, and maintained in relation to different customers and based on configured accounts that define process execution in relation to the applications and the database.

In some instances, the cloud environment 106 may be configured in a multiple availability zone architecture. The cloud environment 106 may be configured to include multiple availability zones where one application may include multiple instances running in corresponding multiple availability zones. The multiple availability zones may share resources of the cloud platform, and may be accessible from the outside through the same address, for example, the same uniform resource locator (URL). Cloud computing resources may be provided in highly available data center facilities that may represent the different availability zones. To provide additional scalability and reliability, the data center facilities (or data centers) may be located in different physical locations. In some instances, a cloud platform may include multiple regions that correspond to multiple availability zones, where the regions may be widely dispersed into separate geographic locations. In some instances, the availability zones are defined as distinct locations and thus are isolated, which also facilitates isolation from failures at the different availability zones. For example, a network connectivity failure that may be experienced at one data center representing one availability zone may not affect another data center representing another availability zone. By executing applications, services, databases, and other examples of entities that can run on cloud platform in a multiple availability zone setup, high availability for provided services and data is maintained. Maintaining a cloud platform with multiple availability zones supports providing low-latency network connectivity between different instances of applications executed at multiple zones.

In some instances, the cloud environment 104 may host applications, service, databases, other, which are associated with different customers and/or accounts and may be configured to interact in a particular way.

Figure 2:
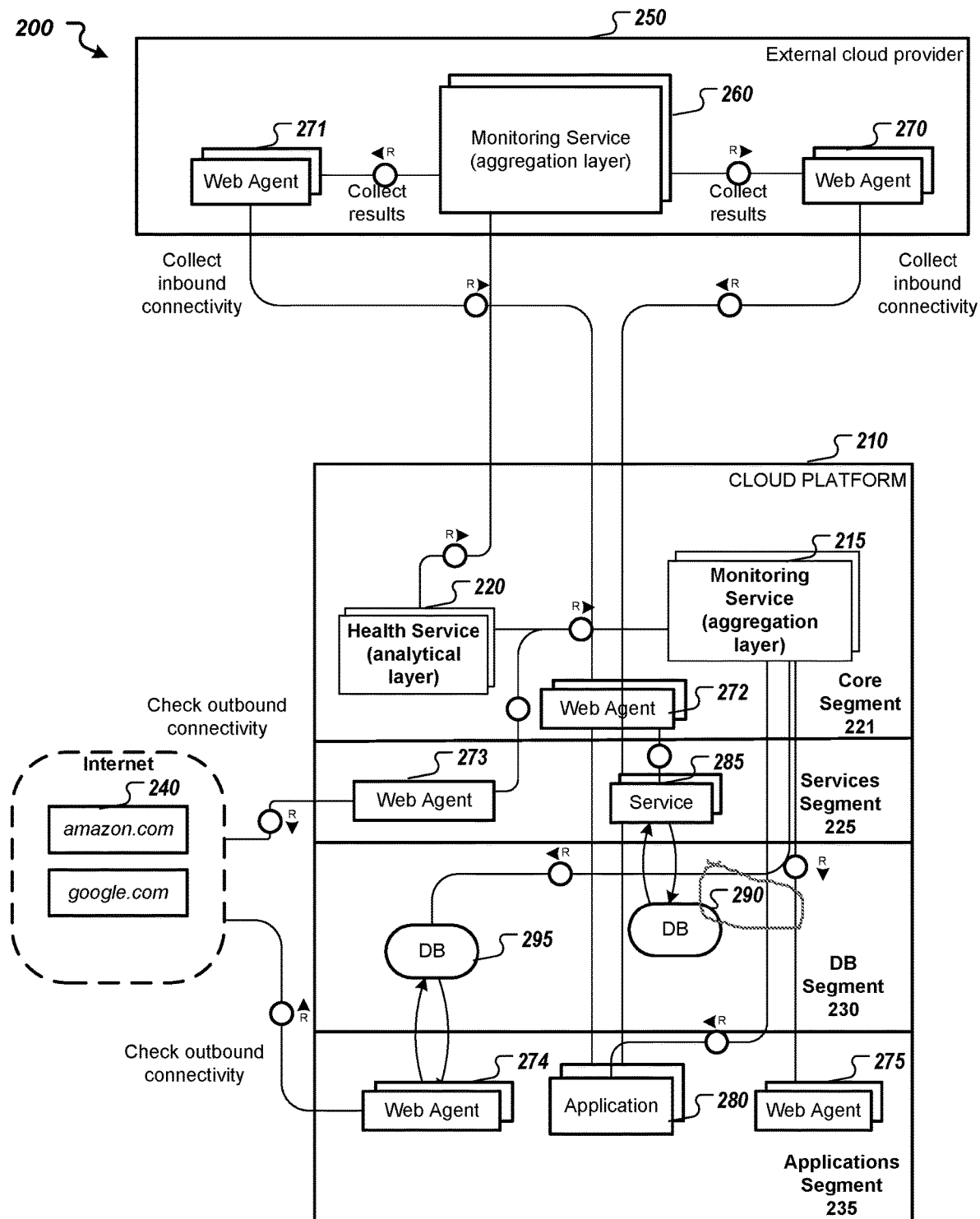
FIG. 2 is a block diagram for an example system for detecting outages in a cloud environment in accordance with implementations of the present disclosure.

FIG. 2 is a block diagram for an example system 200 for determining a health status of network connectivity in a cloud environment in accordance with implementations of the present disclosure. In some instances, the cloud environment may be similar to the cloud environment 106 and/or the cloud environment 108 of FIG. 1. A cloud platform 210 may be configured as one platform hosted at one physical location and not configured in a multiple availability zone setup as presented on FIG. 1. However, the cloud platform 210 may also be configured in a multiple availability zone setup where multiple data centers corresponding to the presented cloud platform set up may form the whole cloud platform.

In some instances, the cloud platform 210 includes multiple segments including a core segment 221, a services segment 225, a database (DB) segment 230, and an applications segment 235. The segments part of the cloud platform 210 are network segments that are associated with entities of different type running at the cloud platform 210. One entity running at one segment may be communicatively coupled to another entity in another segment, and can consume provided services and/or data. For example, service 285 at the service segment 225 can communicate with DB 290 at the DB segment 230, and can consume data stored at the database when executing implemented logic at the service 285. Further examples of such communications between entities may be provided even if no connection arrows are presented at FIG. 1. In some instances, any entity running at the cloud platform 210 can communicate with another entity running on the same cloud platform 210 unless there are access restrictions configured for the entities that are outside of the general network connectivity capabilities of the cloud platform 210.

In some instances, a monitoring framework may be provided to monitor network connection status of the cloud platform and provide indications when a network outage is identified. The monitoring framework may be incorporated at a different part of the cloud platform 210 and externally to the cloud platform 210. Data for accessibility of entities residing at different network segments of the cloud platform 210 can be collected and evaluated.

In some instances, the core segment 221 may host services and application(s) that are associated with managing the performance of the cloud platform 210. The core segment 221 may host a monitoring service 215 and a health service 220 that may implement logic to collect health status data related to different parts, segments, or entities of the cloud platform 210, and process that data to determine a health status of the network connectivity of the cloud platform 210. The monitoring service 215 may collect such health status data from internal and external web agents. In some instances, the monitoring service 215 may be implemented as a distributed service discovery and configuration system to provide an up-to-date view of the infrastructure of the cloud platform 210. For example, the monitoring server 215 may be implemented using CONSUL technology. The internal agents are installed at different parts and segments within the cloud platform, where multiple agents may be hosted at one part or segment. The external agents may be installed outside of, or external to, the cloud platform 210 and may be hosted at associated environments where entities that consume services from the cloud platform 210 are hosted. The web agents can be small and/or lightweight applications deployed inside and/or outside of the cloud platform, and may be configured to perform network calls between each other and/or to configure end points within the cloud platform. By exchanging network calls between different web agents at different locations, inbound, outbound, and internal connectivity statuses of the cloud platform 210 can be monitored. The web agents may be defined to form a health check layer of the monitoring framework.

In some instances, the web agents may be installed at different segments of the cloud platform 210, as well as externally to the platform 210 itself. The health check layer may be responsible for the execution of the health check tests in the form of the requests to monitor network connectivity of different segments of the cloud platform 210. Based on monitoring the network connectivity at different network segments and in association with communicating with external resource, a health status for the network connectivity of the cloud platform 210 can be determined. For example, the health status may identify a network inbound outage at the services segment 225 that may include an identification of services hosted at that services segment 225 that are determined to be inaccessible from an external system or platform (e.g. external cloud platform 250).

In some instances, multiple web agents (e.g., web agent 272, 273, 274, 275) may be internally installed in different locations at the cloud platform 210. Further web agents may be deployed outside the cloud platform 210. For example, web agent 271 and web agent 270 may be external web agents deployed at an external cloud platform 250. The external cloud platform 250 may be associated with the cloud platform 210. In some instances, the web agents are lightweight agents that can execute network calls to endpoints defined at the cloud platform. For example, the endpoints can be other web agents running inside and/or outside the cloud platform 210. In yet another example, or in addition, the endpoints can be other entities (i.e., non-web agents, such as an application or service, for example) running inside and/or outside the cloud platforms 210. Further, a web agent can be configured to execute calls to another web agent running at a different network segment and/or to another application running in the same network segment. The different types of agents (e.g., internal and external) may test various parts of the network associated with the cloud platform 210 as well as various execution scenarios in the cloud platform 210. Based on the information provided to the monitoring service 215 by the web agents, the health service 220 can aggregate the information and expose it to the interested parties, for example, to applications or services running on the cloud platform 210.

In some instances, both the internal web agents 272, 273, 274, and 275, and the external web agents 271 and 270, may perform relatively simple request, for example, over TCP or HTTP protocols that can form a full network mesh that covers the connectivity, including:

between different network segments of the cloud platform 210, from the external cloud provider 250 (e.g., deployed external web agents 271 and 270) to a segment of the cloud platform that is externally accessible (e.g., the services segment 225 and/or the applications segment 235), and from various network segments of the cloud platform 210 to the Internet (e.g., from amazon.com 240)

In some instances, a data log for executed network calls (including sent and received network calls) between agents running at different network segments of the cloud platform 210 and outside of the cloud platform 210 can be stored correspondingly at each web agent. Such data logs can be processed to determine whether a network segment from the different network segments of the cloud platform 210 is:
- accessible from external calls (inbound connectivity) that may originate from the external cloud platform 250;
- capable of connecting to an external resource (e.g., amazon.com 240) on the Internet (outbound connectivity); and
- accessible from entities running at other network segments and/or capable to access services or data hosted at different network segments of the cloud platform 210.

In some instances, the monitoring service 215 that is hosted at the core segment 220 of the cloud platform may be represented as a set of servers that form an aggregation layer of the monitoring framework. The monitoring service 215 can be responsible for collecting the health check data from all agents (external and internal) and providing the results in a structured format based on internal aggregation logic. In some instances, the monitoring service 215 may provide the structured aggregated data for consumption by external services, such as the health service 220, via an API. In implementations having a large number of web agents, there might be a server or a group of servers that are responsible to collect the data from a certain group of web agents. For example, agents located in a particular network segment and/or in a particular availability zone (e.g., if the cloud platform 210 is defined with multiple availability zones) may be grouped, and data from the group can be processed by a dedicated server responsible for collecting the data.

In some instances, the health service 220 is an analytical layer of the monitoring framework. The health service 220 periodically fetches the structured health check data from the aggregation layer, such as from the monitoring service 215, and performs an analysis on the fetched data. The health service 220 can also fetch health status data from a monitoring service 260 that is running externally from the cloud platform 210. The external monitoring service 260 may provide data collected from web agents 271 and 270 to the health service 220. In some instances, the data acquired from the health service 220 can be evaluated to determine whether there is an outage in the cloud platform 210 and, if so, to determine the scope of such an outage.

In some instances, a consumer (e.g., a platform service) that is interested in information about the health status of the cloud platform 210 and/or when an outage is detected can be duly notified by the health service 220. In some cases, a notification can be sent to such a consumer only if a detected outage is considered to affect the execution of the consumer. Consumers can register with the cloud platform 210 or other suitable component or service to be notified.

Figure 3:
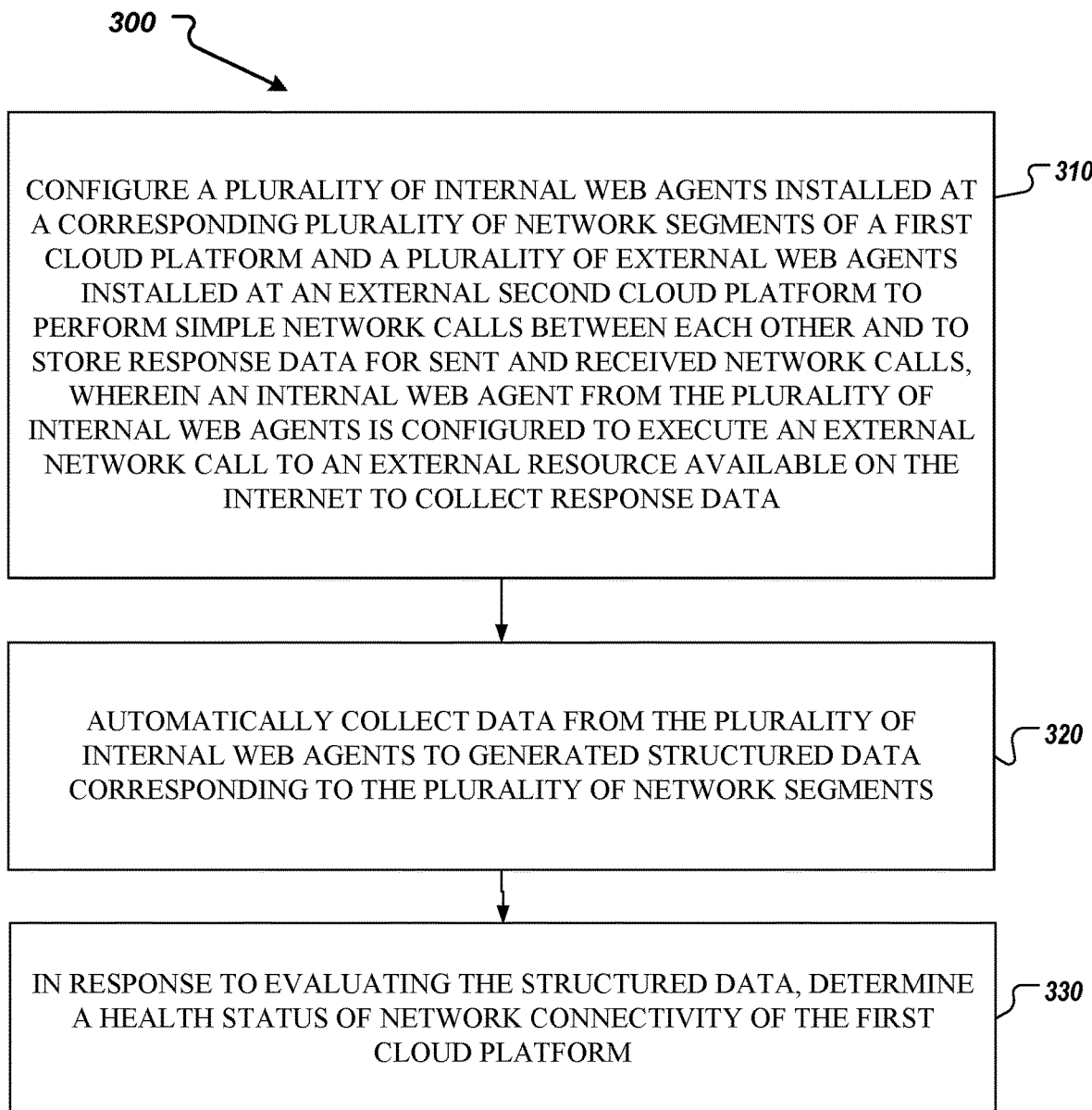
FIG. 3 is a flowchart for an example method for detecting outages in a cloud environment in accordance with implementations of the present disclosure.

FIG. 3 is a flowchart for an example method 300 for determining a health status of network connectivity of a cloud platform in accordance with implementations of the present disclosure. In some instances, applications, services, databases, among other entities that can be hosted in a cloud environment, may provide services for consumption within a cloud platform or outside of the cloud platform. Entities running on the cloud platform may execute logic that includes processing received requests and providing resources or data, dispatching received requests to other entities, querying database entities, accessing external resources to gather data or to request services, among other examples of implemented processing logic at running entities on the cloud platform. For example, an application may execute processes and access a database to provide services to end-users. In order to provide services with high availability, the entities running on the cloud platform have to be accessible from the outside, be able to access external services, resources, or other entities, and be able to communicate with other entities running within the same cloud platform. Thus, a health status of network connectivity of the cloud platform is relevant to the level and quality of services provided by entities running on the cloud platform. To maintain applications, services, and database(s) having a requirement for high availability, a monitoring framework can be setup at the cloud platform to monitor health status of different end points within the cloud platform and perform analysis that can support identifying network outages. The example method 300 may be executed at a cloud platform that may be configured to implement monitoring framework to determine a health status of network connectivity. The monitoring framework may correspond to, or be substantially equivalent to the monitoring framework described in FIG. 2. The monitoring framework may include multiple layers that interact between each other and gather and process data to determine the health status and to identify network connectivity outages.

At 310, a plurality of internal web agents installed at a first cloud platform and a plurality of external web agents installed at an external second cloud platform are configured to perform network calls between each other. In some instances, such networks calls may be relatively simple network calls, although any suitable network call can be used. The internal web agents can be installed at a corresponding plurality of network segments of the first cloud platform. The internal web agents and the external web agents can store response data for sent and received network calls. An internal web agent from the plurality of internal web agents may be configured to execute an external network call to an external resource available on the Internet to collect response data.

In some instances, at least one web agent from the plurality of internal web agents is installed within each of the network segments of the first cloud platform. The plurality of external web agents are installed and configured at the second cloud platform. The second cloud platform can be communicatively coupled to the first cloud platform.

In some instances, the first cloud platform includes network segments including a core segment, a service segment, a database segment, and an application segment. In some instances, the service segment includes one or more application services providing services for consumption by one or more applications running at the application segment of the first cloud platform and/or to entities running at external environments for the first cloud platform. An application service from the one or more application services consumes data from a database running at the database segment.

In some instances, the application segment includes an application(s) that provides services for consumption by other applications running at the first cloud platform and/or at external environments for the first cloud platform. The application may consume data from a database running at the database segment.

In some instances, the database segment includes one or more databases to store data that is accessible for consumption by at least one of an application service at the service segment and/or an application at the application segment running at the first cloud platform.

In some instances, some or all of the network segments of the first cloud platform may be configured to be inaccessible from external entities. For examples, databases running at the database segment may be accessible by services and/or applications running at different network segments, and may not be accessible from services and/or applications running at the external second cloud platform.

At 320, data from the plurality of internal web agents is automatically collected to generate structured data defining network connectivity status corresponding to the plurality of network segments of the first cloud platform. In some instances, the automatically collected data from the plurality of internal web agents can be collected at predefined periodic time periods.

In some instances, the data may be automatically collected at a monitoring service running on the first cloud platform. The monitoring service may be similar to the monitoring service 215 of FIG. 2. However, the collection of the data may be performed at a service that is different from the monitoring service 215, such as a health service that includes logic for evaluating the data.

In some instances, the data from the plurality of internal web agents is collected at a monitoring service running at the core segment of the first cloud platform. In some instances, data from the external web agents may be collected at the monitoring service through an external monitoring service running on the external second cloud platform. In some instances, the collected data from the monitoring service can be evaluated by a health service running at the core segment to generate the structured data At 330, in response to evaluating the structured data, a health status of the first cloud platform can be determined. The determination of the health status can be performed at a health service instantiated at the first cloud platform. The health service can be similar to or different from the health service 220 of FIG. 2.

In some instances, the evaluation of the structured data includes determining whether there is an outage associated with the cloud platform. In response to determining that there is an outage, a scope of the outage is determined. The scope of the outage can define a limited network segment(s) from the first cloud platform for outbound and/or inbound connections.

In some instances, the determined health status can be provided to platform services provided by the first cloud platform and/or applications running on the first cloud platform to support management of lifecycles (and lifecycle operations) of entities running on the first cloud platform. In some instances, one platform service may be responsible for managing a lifecycle of a corresponding one or more entities. In some instances, the platform services can be core services provided by the first cloud platform that are integrated into the first cloud platform for consumption by applications and/or services that are run by end-users on the first cloud platform. For example, the platform services may fetch processed data from a health service that determined the health status in a similar manner as discussed in FIG. 4 in association with consumer 405 and health service 410. In yet another example, the determined health status data can be provided to an application similar to the application 505 of FIG. 5. In some instances, an application manager can consume the health status data to manage application's lifecycle (e.g., to initiate start of the application, to stop the application, to change mode of the application, among other example lifecycle operations of the application). For example, the application manager may be similar to the application management service 605 of FIG. 6.

In some instances, entities can subscribe to receive notifications for health statuses for network connectivity of the first cloud platform. For example, an application can subscribe to received notifications for a detected outage or a resolved outage at a network segment corresponding to the application.

In some instances, a notification can be provided to a subscribed entity running at one of the plurality of network segments on the first cloud platform. In some instances, the notification can include an identification of the scope of the determined outage. For example, the notification may identify that the subscribed entity can be accessed from internal entities running on the first cloud platform but cannot be accessed from external entities running at the external second cloud platform.

In some instances, determining the health status can include identifying a network outage at a network segment from the plurality of network segments. The network outage can be determined based on the evaluation of the structured data. In some instances, a network outage can be associated with limiting network connectivity in relation to some or all entities running on the cloud platform. A network outage can be categorized based on the type of connection that the outage affect (e.g., outbound connections, inbound connections, and internal connections). In some instances, a network outage can be determined to in response to a limited (or less than completely limited) connectivity between at least one of i) entities running at the network segment and entities at other network segments of the first cloud platform, ii) entities running at the first cloud platform and entities running at different cloud platforms connected to the first cloud platform, and iii) external resources to the first cloud platform accessible over the Internet.

In some instances, entities are installed and run at each of the plurality of network segments. An entity that is installed and runs on the first cloud platform can provide services and/or data for consumption by another entity from the rest of the one or more entities running at different network segments of the first cloud platform or to an external entity running at an external cloud environments.

In some instances, a health status can be determined for the first cloud platform that includes information defining a network outage. In some instances, the network outage can be an outbound connectivity network outage. The outbound connectivity network outage can limit entities running at the first cloud platform 210 to send request for accessing resources from outside the first cloud platform 210, for example, from an external cloud platform and/or the Internet. In some instances, the network outage can be an inbound connectivity network outage. The inbound connectivity network outage limits an entity running on the first cloud platform 210 to provide services to other entities running outside the first cloud platform, for example, on an external cloud platform and/or the Internet. In some instances, inbound connectivity outage may be detected when an external agent deployed at the external cloud provider 250 cannot connect to an application running on the first cloud platform 210. In some instances, an outbound connectivity status is provided to an application running on the first cloud platform, in response to receiving a request from the application for acquiring a health outbound connectivity status of the first cloud platform. The outbound connectivity status may be determined based on the determined health status of the first cloud platform. In some instances, the determined health status may include an outbound connectivity status, an inbound connectivity status, and an internal status of the connectivity at the first cloud platform. The determined statuses of the health status may identify corresponding statuses for different network segments of the cloud platform. For example, the health status may include an inbound connectivity status for the application segment, an outbound connectivity status for the application segment, and an internal status for the application segment. The application segment may include one or more applications running on the cloud platform. Based on determining the health status for the application segment, a health status of an application running in the application segment can be determined as corresponding to the health status of the application segments. For example, if it is determined that there is an outbound outage for the application segment, i.e., the application segment cannot execute external requests over the Internet to web resources, then any application running in the application segment may be associated with this outbound outage. Corresponding notifications can be sent to the affected applications when the health status for the first cloud platform and the respective included network segments are determined.

Figure 4:
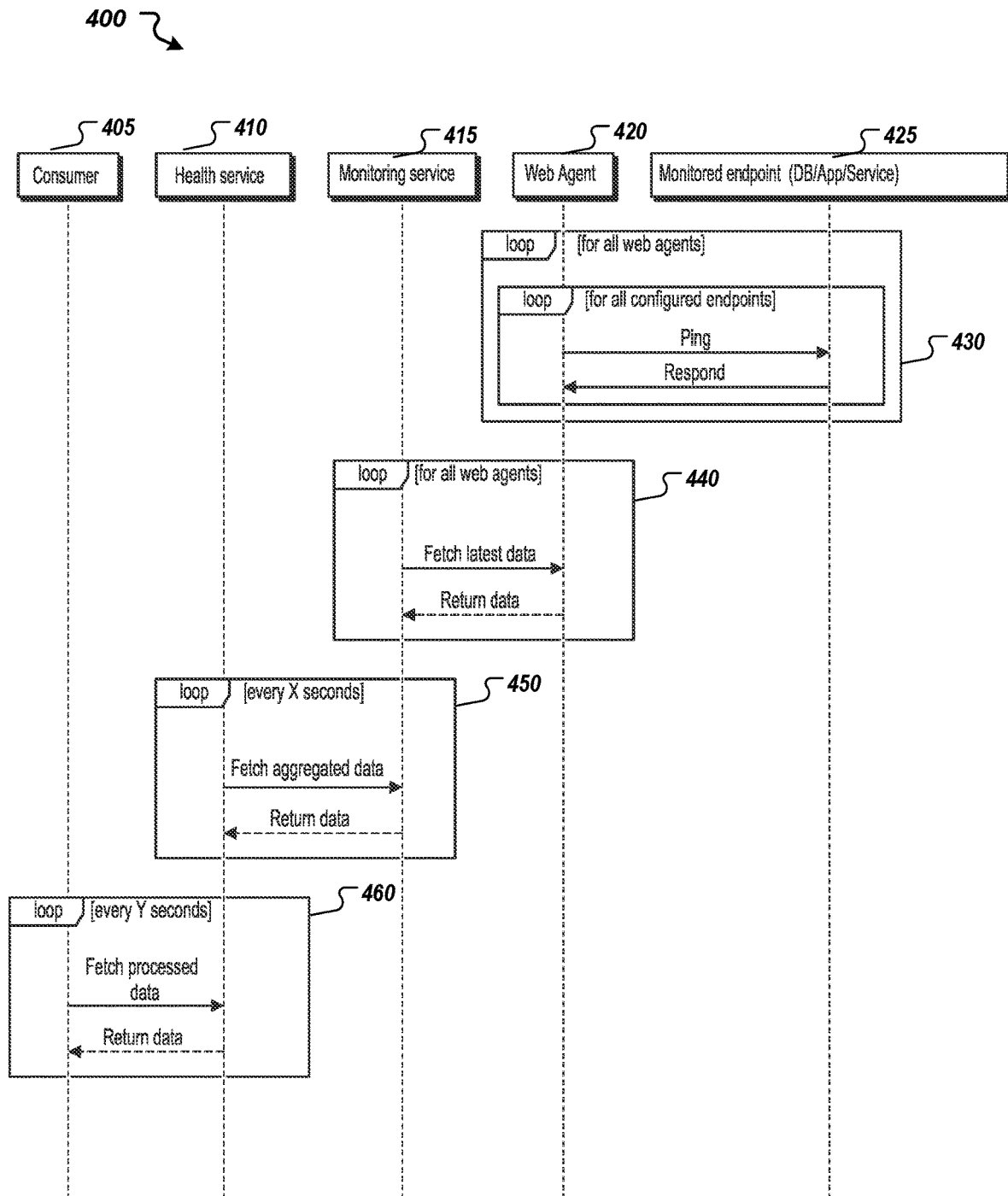
FIG. 4 is a block diagram for an example method for collecting health status data for a cloud platform in accordance with implementations of the present disclosure.

FIG. 4 is a block diagram for an example method 400 for collecting health status data for a cloud platform in accordance with implementations of the present disclosure. In some instances, the example method 400 may be executed at the example system 200 of FIG. 2 and in relation to the cloud platform 210 of FIG. 2. In some instances, a monitoring framework (e.g., as described in FIG. 1 and FIG. 2) may be setup at the cloud platform to monitor a health status of different endpoints of the cloud platform and determine statuses of different types of connections including inbound connections, outbound connections, and internal connections for the cloud platform. Setting up the monitoring framework may include installing and configuring web agents corresponding to the internal and external web agents as described for system 200 of FIG. 2. Further, the monitoring framework may include a monitoring service 415 that corresponds to the monitoring service 215 of FIG. 2, and a health service 410 that corresponds to the health service 220 of FIG. 2.

In some instances, web agent 420 is installed and configured on the cloud platform to execute network calls to different monitored endpoint(s) 425 at segments. The monitored endpoint 425 is an example endpoint where multiple endpoints may be configured at the cloud platform. The different web agents may execute calls to the configured endpoints. The endpoint(s) 425 may be defined as application(s) running on the cloud platform, services running on the cloud platform, databases at the cloud platform, and/or other web agents that are at the cloud platform or at an external cloud platform.

In some instances, the web agent 420 can be an internal web agent for the cloud platform or an external web agent for the cloud platform that runs at an external cloud platform. The external web agent may execute calls to endpoints defined at the cloud platform, such as an application running in an application segment of the cloud platform, an internal web agent running in the application segment of the cloud platform, or a service running in a service segment of the cloud platform, as well as other example entities running at different network segments of the cloud platform.

In some instances, a consumer 405 may be an entity that may be subscribed to the health service 410 to receive notification for a determined health status for (the whole or a part of) the cloud platform. In some instances, the consumer 405 may be an application and/or a service running on the cloud platform. In some other instances, the consumer 405 may be an application management service running on the cloud platform and managing workload and processing of requests by different applications and services.

In some instances, at 430, one or more web agents 420 may execute simple network calls (e.g., ping calls) to different configured monitored endpoints 425 (e.g., service and application endpoints from the cloud platform). At 440, the monitoring service 415 may collect and aggregate data from the web agent(s) 420. The monitoring service 415 may be hosted at one or more servers that may be dedicated to collecting data from web agents of the whole or parts of the cloud platform (e.g., all network segment, a particular network segment, a set of network segments, and other level of division of regions within the cloud platform). At 450, the health service 410 may fetch the collected data from the monitoring service 415 and may evaluate the health status of the cloud platform. At 460, the customer 405 may fetch the processed data from the health service 410. The customer 405 may be configured to fetch data from the health service as polling requests that are executed on a predefined fixed time periods. By executing such requests, the customer 405 may determine current network connectivity statuses, as well as whether there is a network outage that affect performance of entities running on the cloud platform.

In some instances, the fetching (450) of collected data from the monitoring service 415, and the fetching (460) of the processed data from the health service 410 may be performed as iterative requests that are configured to be performed in regular time intervals, for example, every five (5) seconds.

In some instances, the consumer 405 may include logic to evaluate the received data about the health status of the cloud platform and provide information for changes in the health status to relevant entities in the cloud platform and/or to an orchestrator service, which, for example, may provide instructions for affected entities to stop execution and offload service requests to other instances running at a different network segment or at a different region or zone where network outages are not limiting the services.

Figure 5:
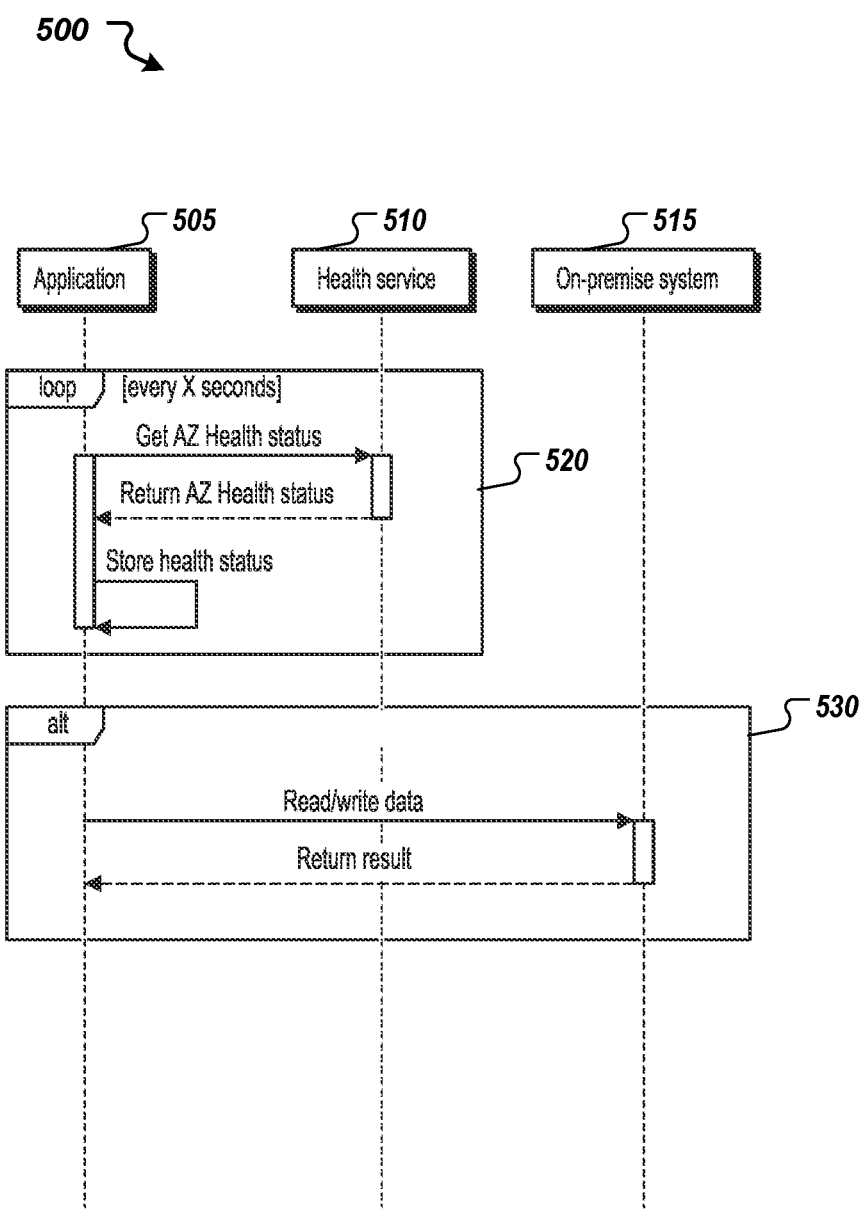
FIG. 5 is a block diagram for an example method for managing communication between an application running on a cloud platform and an on-premise system based on a connectivity status of a cloud platform in accordance with implementations of the present disclosure.

FIG. 5 is a block diagram for an example method 500 for managing communication between an application running on a cloud platform and an on-premise system based on a connectivity health status of the cloud platform in accordance with implementations of the present disclosure. In some instances, the example method 500 may be executed at the example system 200 of FIG. 2 and in relation to the cloud platform 210 of FIG. 2. In some instances, a monitoring framework, such as those described at FIG. 1 and FIG. 2, may be setup at the cloud platform to monitor a health status of network connectivity (e.g., inbound network connectivity and/or outbound network connectivity) of the cloud platform. Setup of the monitoring framework may include installing and configuring web agents corresponding to the internal and external web agents as described for system 200 of FIG. 2. Further, the monitoring framework may include a monitoring service that corresponds to the monitoring service 215 of FIG. 2 and the monitoring service 415 of FIG. 4, and a health service 510 that corresponds to the health service 220 of FIG. 2 and the health service 420 of FIG. 4.

In some instances, an application 505 may be running on the cloud platform where the monitoring framework is setup. The monitoring framework includes the health service 510 as an analytical layer, an aggregation layer (e.g., a monitoring service that is not shown on FIG. 5) to collect data from installed web agents (not shown on FIG. 5), where the web agents execute network calls and to store log data for call statuses, and a health check layer (not shown)

including internal web agents installed on the cloud platform and external web agents installed at external locations for the cloud platform (e.g., an external second cloud platform communicatively coupled to the cloud platform).

In some instances, the application 505 may request to receive a current health status of outbound network connectivity of the cloud platform from the health service 510 at 520. The requests sent from the application 505 may be sent automatically and in a preconfigured periodic manner, for example, every 5 second, every 10 second, every 60 seconds, among other example time periods. In some instances, once the application 505 receives the current health status of the outbound network connectivity of the cloud platform, the application 505 can store the received status. The application 505 can dynamically maintain an updated health status for outbound connectivity of the cloud application. In response to receiving a request to access an external resource, for example, from an on-premise system 515, the application 505 can verify that the outbound connectivity is functioning correctly and/or available. At 530, and in response to determining that the health status of the outbound connectivity indicates that the cloud platform can execute external calls to external resource, the application 505 can initiate to communicate with the on-premise system 515 outside the cloud platform. By verifying the health status of the outbound connectivity of the cloud platform prior to executing a call from the application 505 to the on-premise system 515, the application 505 is protected from experiencing unexpected communication errors that may require the application 505 to apply its implemented logic for failover. The application 505 can rely on the monitoring framework and on a centralized monitoring of a health status of the cloud platform that can be addressed on cloud platform level, and that can be available prior to experiencing any errors or issues directly by the application 505. By initiating regular requests to the health service 510, the application 505 determines when the outbound connectivity is unavailable or not functioning correctly. In some instances, when an outbound connectivity outage is determined, the application 505 can seize activities, return a comprehensive error message to an end user requesting services, and restore productive mode after the connectivity is determined to be restored.

In some instances, at 520, the application 505 may request to determine a current health status of network connectivity of the cloud platform that is associated with internal connectivity between the application segment where the application 505 is running and another segments (e.g., service segment and/or database segment) or with inbound connectivity of the cloud platform. If the inbound connectivity is unavailable or not functioning correctly, the application 505 may experience prolonged periods where no requests for services are directed to the application 505. In some instances, corresponding countermeasure may be taken to address different cases of unavailability or malfunction of the network to lead to a network connectivity outage scenarios. For example, if the inbound connectivity is unavailable or not functioning correctly, the application 505 may be stopped and restarted only after the inbound network connectivity is restored, thereby improving resource spending for maintaining running instances of application. In some more examples, to improve resource spending when a network connectivity outage is detected, the number of running instances of application 505 may be reduced to scale down the usage of resource and yet to keep some instances running to leverage with costs to restart instances when connectivity is recovered.

Figure 6:
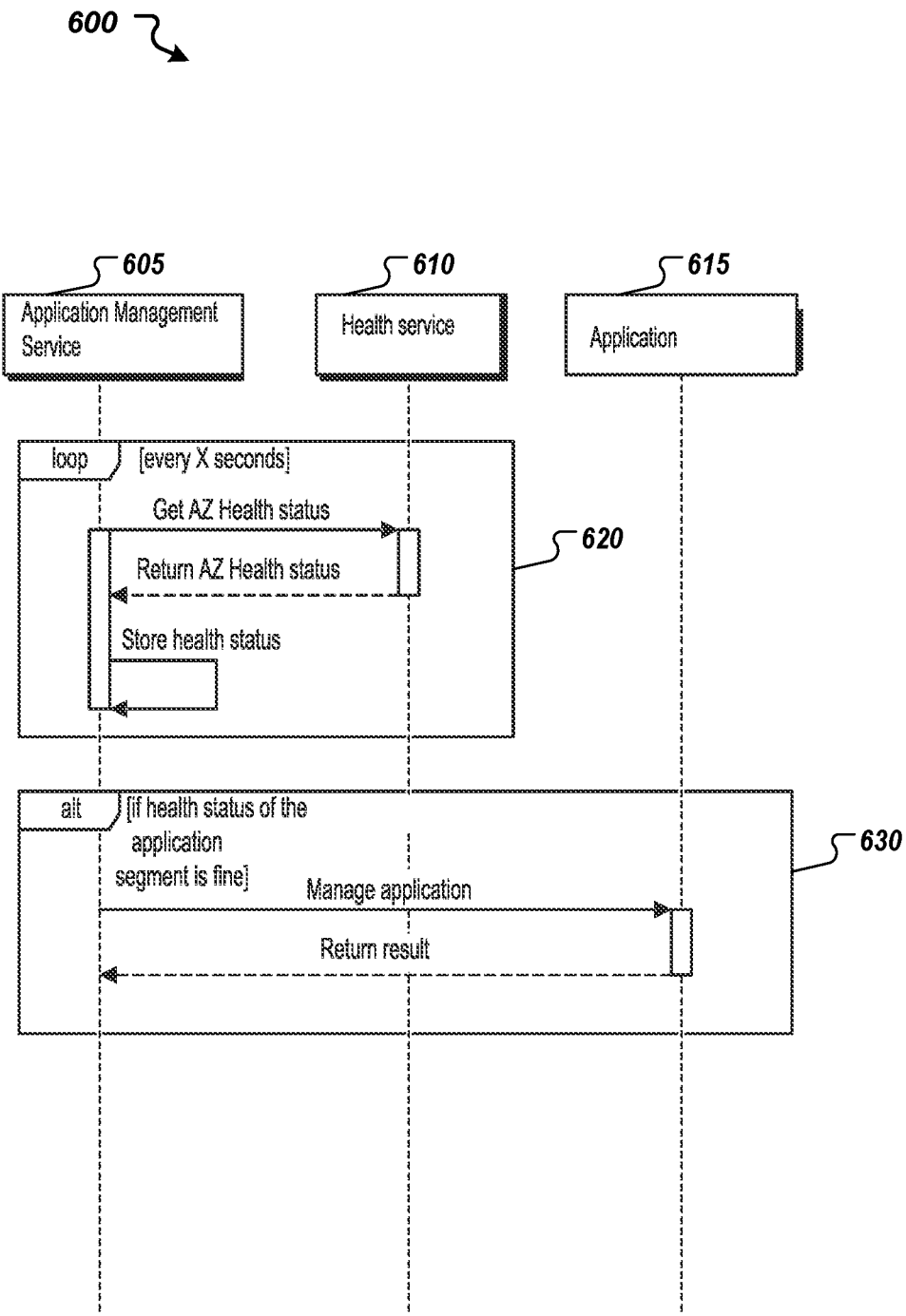
FIG. 6 is a block diagram for an example method for managing deployment of applications on a cloud platform based on a health status of an application segment of the cloud platform in accordance with implementations of the present disclosure.

FIG. 6 is a block diagram for an example method 600 for managing deployment of applications on a cloud platform based on determining an application segment a health status of an application segment of the cloud platform in accordance with implementations of the present disclosure. In some instances, the example method 600 may be executed at the example system 200 of FIG. 2 and in relation to the cloud platform 210 of FIG. 2. In some instances, a monitoring framework, such as those described at FIG. 1 and FIG. 2, may be setup at the cloud platform to monitor a health status of network connectivity of the cloud platform (e.g., inbound and/or outbound network connectivity status). Setting up the monitoring framework may include installing and configuring web agents corresponding to the internal and external web agents as described for system 200 of FIG. 2. Further, the monitoring framework may include a monitoring service that corresponds to the monitoring service 215 of FIG. 2 and the monitoring service 415 of FIG. 4, and a health service 610 that corresponds to the health service 220 of FIG. 2, the health service 410 of FIG. 4, and the health service 510 of FIG. 5.

In some instances, an application management service 605 may run on the cloud platform to manage execution of applications running at the cloud platform. For example, the application may be running at the application segment and the application management service 605 may be configured to request data for network connectivity status of the cloud platform and provide instructions for execution of applications in the cloud platform. The application 615 may be one instance of a multiple instance application running at the cloud platform.

At 620, the application management service 605 requests a health status of network connectivity of the cloud platform that includes a health status of the application segment part of the cloud platform. The health service 610 provides the health status of the network connectivity of the cloud platform and information about the application segment. The provided health status may be as described in 330 of FIG. 3. The health status may define whether the application segment is accessible from outside (i.e., inbound connectivity), whether entities running at the application segment can access external resources (e.g., over remote connections), and/or whether the application segment can access entities running at other segments of the cloud platform and can be accessible from other segments of the cloud platform.

In some instances, the requests sent from the application management service 605 may be sent automatically and in a preconfigured periodic manner, for example, every 5 second, every 10 second, or every 60 seconds, among other example time periods. In some instances, once the application management service 605 receives the current health status of the application network segment for the network connectivity of the cloud platform, the application management service 605 can store the received status. The application management service 605 can dynamically maintain an updated health status for the application segment's network connectivity. At 630, in response to determining the health status of network connectivity for the application segment of the cloud platform that defines whether an entity running at the application segment can be accessed or can access other entities, resources, or data, the application management service 605 can initiate to communicate with an application 615 that is running at the application segment of the cloud platform. Based on determining the health status of network connectivity of the application segment of the cloud platform, the application management service 605 may execute a call to the application 615 to provide instructions and to manage the application based on the determined status. For example, the application management service 605 may send instructions to stop the execution of the application 615 if the network connectivity is broken. In another example, the application management service 605 may send instructions to start the execution of the application 615 if it is determined that the network connectivity of the application segment is restored. In some other examples, access to the application can be disabled if the application network segment has been identified as associated with connectivity issues to access and/or get access from the Internet and/or from another network segment of the cloud platform.

Determining Outages in a Multiple Availability Zone Cloud Platform

In some instances, cloud platforms experience problems and downtime due to disruptions in network connectivity. In some instances, to prevent prolonged downtimes of cloud applications, the cloud platform that hosts the applications may be defined in multiple availability zones (AZs) that are located at different locations. In such instances, if a network disruption is experienced at one availability zone, another availability zone may be unaffected and proceed to provide services. In some instances, an application that is deployed in a multiple availability zone cloud platform may be deployed to have separate instances of the application running at different availability zones. The multiple availability zone cloud architecture of a cloud platform may be a hidden implementation such that it cannot be seen by or determined by an end-user of an application. A cloud platform with a multiple availability zone cloud platform architecture may be configured to provide proper synchronization between entities (e.g., services, applications, and databases) distributed at different AZs. In those cases, when one of the AZs becomes inaccessible (e.g., because of a network outage or because of another reason), the entities that are associated to those entities running in the inaccessible AZ can continue to function undisturbed in another AZ that is still accessible. For example, an entity, such as an application, can execute a process that depends on executing a cloud service. If the cloud service's execution is affected by an outage in the AZ where the cloud service is requested to run, the application can continue to function and request that the cloud service executes at one of the remaining AZs not affected by the outage. For example, such management of execution of services, applications, and databases at the cloud platform may be performed by an application management service that orchestrates the processes that run on the cloud platform. To be able to address network outages identified at different AZs, a monitoring framework (for example, as discussed in the disclosure of FIGS. 2, 3, 4, 5, and 6) can be implemented to monitor, evaluate, and report health status information about AZs, corresponding network segments, and corresponding status for different network connectivity types.

Figure 7:
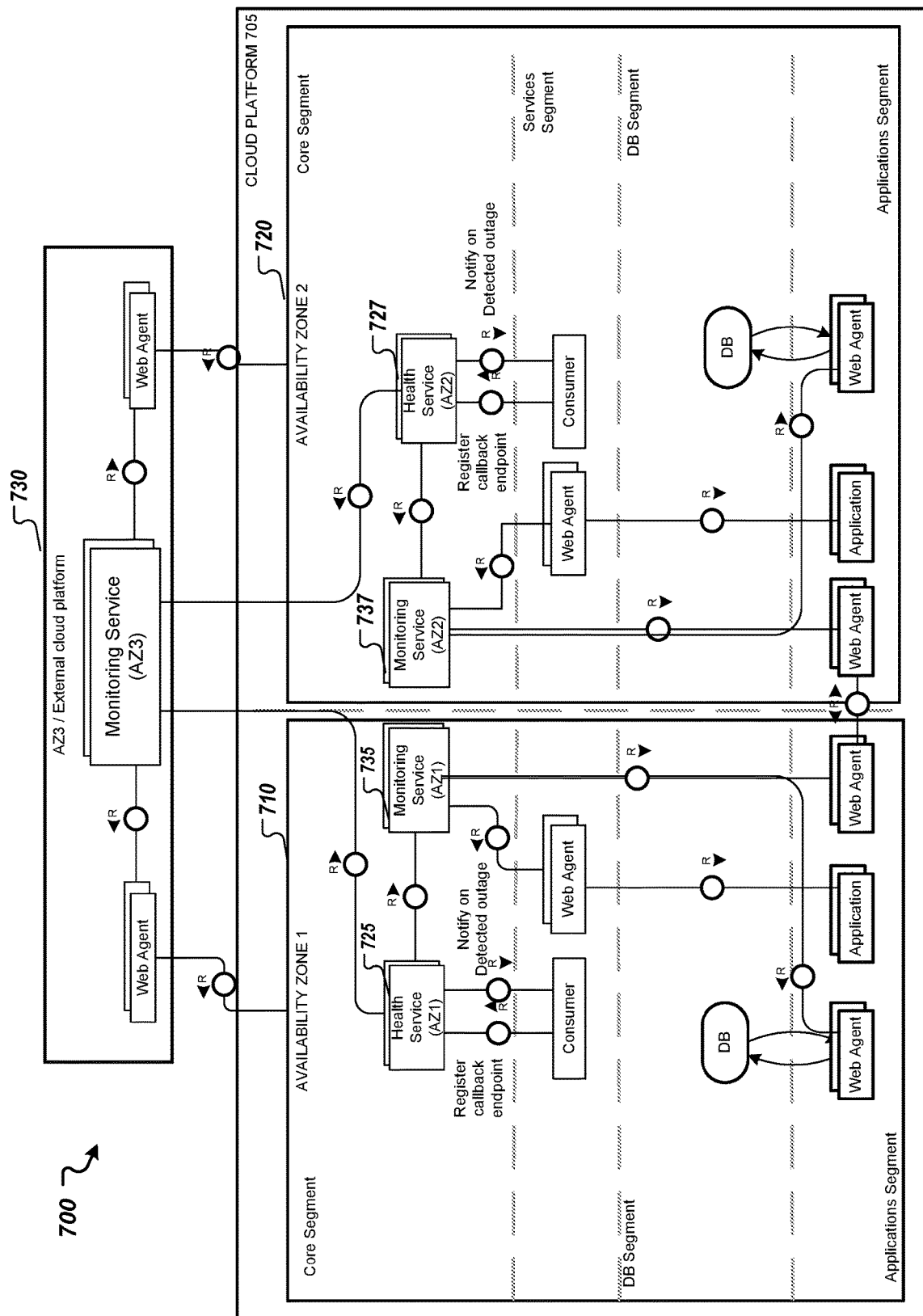
FIG. 7 is a block diagram for an example system for determining a health status of network connectivity of a multiple availability zone cloud platform in accordance with implementations of the present disclosure.

FIG. 7 is a block diagram for an example system 700 for determining a health status of network connectivity of a multiple availability zone cloud platform in accordance with implementations of the present disclosure. In some instances, the example system 700 may include a cloud platform that is defined as a multiple availability zone platform. The example system 700 may have a corresponding system architecture to the example system 700 of FIG. 7. The cloud platform includes two zones: availability zone 1 (AZ1) 710 and availability zone 2 (AZ2) 720. The availability zones represent data centers that can be distributed in different geographical locations to provide improved availability of services and applications running on the cloud. Each of the availability zones of the multiple availability zones (e.g., AZ1 710 and AZ2 720) may include a corresponding implementation to the cloud platform 210 described in FIG. 2, where the cloud platform 210 is represented as a single availability zone platform. For example, AZ1 710 and AZ2 720 can include corresponding network segments as described in the disclosure of FIG. 2.

In some instances, the two zones, AZ1 710 and AZ2 720, include internal web agents that are equivalent to the web agents discussed for example for FIG. 2. The cloud platform is associated with an external cloud platform 730. In some instances, the external cloud platform may be represented as a third availability zone, i.e., AZ3. Alternatively, the external cloud platform may be a multiple availability zone cloud platform. The external cloud platform 730 may have installed and configured web agents that correspond to the web agents 270 and 271 of the external cloud platform 250 of FIG. 2.

In some instances, the internal web agents installed on the AZ1 and AZ2 may be installed in every accessible network segment of the availability zones. The external web agents at the external cloud platform 730 may be installed at various locations external to the cloud platform 705.

In some instances, a web agent from the group of the internal web agents and the external web agents can perform relatively simple requests over TCP and HTTP protocols to other web agents to form a full network mesh that covers the connectivity, including:

1. between different network segments inside the same availability zone;
2. from Internet to the segment that must be externally accessible;
3. from various network segments to Internet; and
4. internally for the multiple availability zones cloud platform (i.e., between network segment from different availability zones).

The internal web agents and the external web agents may form a "health check layer" of the monitoring framework. The "health check layer" may be responsible for the execution of the health check tests in the form of the requests, as mentioned above.

The two zones include corresponding monitoring service instances, monitoring service (AZ1) 735 and monitoring service (AZ2) 737. The monitoring services 735 and 737 may correspond to the monitoring service 215 of FIG. 2 and represent an aggregation layer that collects health status data from the web agents, both internal and external. In some instances, the monitoring services 735 and 737 may be responsible for collecting the health check data from all agents and exposing such data for external consumption in a structured manner via an API. In some instances, a monitoring service at one of the availability zones of the cloud platform 705 may receive data about the health checks from external agents at the external cloud platform 730 through the monitoring service of the external cloud platform 730.

The two zones include corresponding health service instances, health service (AZ1) 725 and health service (AZ2) 727. The health services 725 and 727 may correspond to the health service 220 of FIG. 2 in some instances. The health services 725 and 727 may periodically fetch the structured health check data from the previous aggregation layer and perform an analysis on the collected data.

In some instances, and in the context of the multiple availability zone cloud platform 705, the monitoring framework can include logic to determine health status(es) of connectivity between the different AZs, while also determining health statuses within the different AZs individually (e.g., between different network segments of one AZ, and/or inbound and outbound connectivity for those segments in the AZ).

In some instances, an entity that runs on the cloud platform 705 may be associated with executions of a periodical synchronization processes. For example, the entity may be a database that runs with multiple instances at different AZs, where those instances synchronize stored and manipulated data to support high availability of the database. In the example of a database, one of the database instances can be running in one AZ as a primary instance and in another AZ as a secondary instance. The secondary instance can maintain copies of the data stored in the primary instance to provide disaster recovery services.

In some instances, health checks between availability zones can be executed on network segment level of each availability zone. In some cases, all possible combinations of network segment pairs can be evaluated to determine any outages in network connectivity.

In some instances, further health checks can be executed from an external entity over the Internet (e.g., as deployed in an external and/or a third-party cloud platform) to the cloud platform 705 that can be directed to the different AZs to monitor external accessibility. Data for executed health checks can be stored at the external entity, such as an external web agent, and/or at an internal entity including an internal web agent (or other entity) that received the health check network call.

In some instances, based on gathering the aggregated data at the different health services 725 and 727, a determination can be made as to whether there is a network disruption, and if so, a type of an outage that is detected. Different forms of outages can be identified, including a general downtime of an availability zone, a split brain outage, an inbound connectivity disruption, and an outbound connectivity disruption, among other types of outages.

In some instances, an availability zone can be determined as associated with an outage type "AZ Down". Such an outage can be detected when both the connectivity from the Internet and from the other AZ(s) to this AZ is disrupted. In some instances, when such an outage is experienced by a service and/or application that had their primary instances in that AZ, a failover process can be triggered. For example, a failover process can activate a secondary instance(s) in one of the remaining AZ(s) for an application instance in an AZ having an "AZ Down" outage status. By activating the secondary instance, the cloud platform can continue to function without the downtime reflecting on the service level of the cloud platform.

In some instances, an AZ can be determined to experience a "Split Brain" outage type. In such an outage type, only the connectivity between the AZs is affected, but the connectivity from the Internet remains uninterrupted. This can be a crucial scenario for services that synchronize their data. In those instances, countermeasures can be taken to react to such a "Split Brain" outage. For example, one possible reaction to such an outage can be to freeze the activities in a secondary AZs and allow only the primary AZ to serve the incoming requests to prevent future data inconsistencies.

In some instances, inbound and outbound connectivity disruptions may be associated correspondingly with connectivity from the Internet to one AZ and vice versa.

Figure 8:
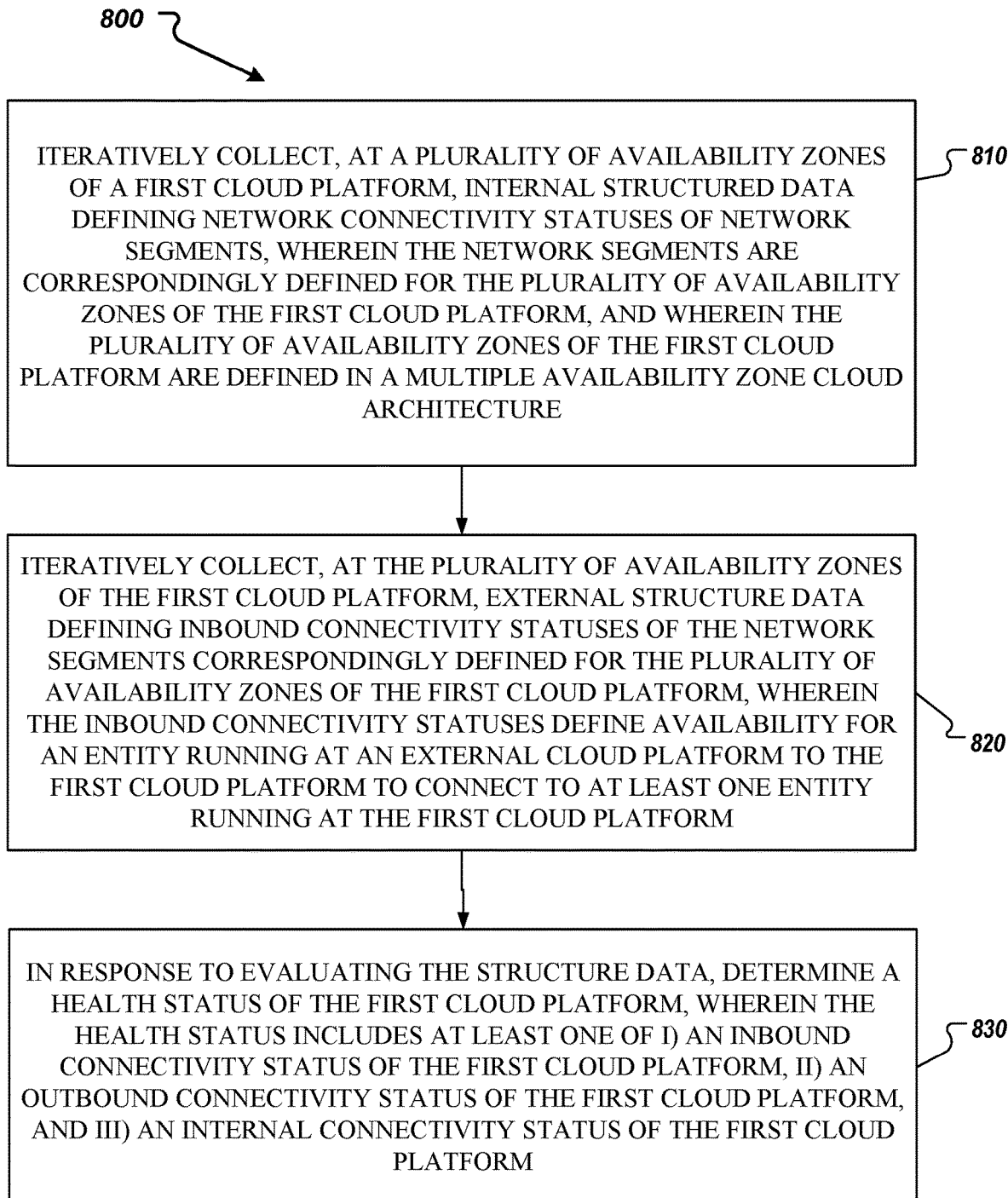
FIG. 8 is a flow chart for an example method for determining a health status of network connectivity of a multiple availability zone cloud platform in accordance with implementations of the present disclosure.

FIG. 8 is a flow chart for an example method 800 for determining a health status of network connectivity of a multiple availability zone cloud platform in accordance with implementations of the present disclosure. In some instances, the method 800 can be executed at a system corresponding to the system 700 of FIG. 7. The method 800 can be executed by different entities of the monitoring framework discussed at FIG. 7.

At 810, internal structured data defining network connectivity statuses of network segments is iteratively collected. The internal structured data is collected at a plurality of availability zones of a first cloud platform. The first cloud platform can be a multiple availability zone cloud platform as cloud platform 705 of FIG. 7. The first cloud platform includes the network segments that are correspondingly defined for the plurality of availability zones of the first cloud platform. For example, every availability zone of the first cloud platform has a core segment, a service segment, an application segment, and a database segment.

In some instances, a monitoring service running at a corresponding availability zone can automatically collect data from web agents running at that availability zone to generate at least a portion of the internal structured data. The portion of internal structured data can be provided by the monitoring service to the health service for automatic collection.

At 820, external structured data defining inbound connectivity statuses of the network segments correspondingly defined for the plurality of availability zones of the first cloud platform is iteratively collected. The external structured data is collected at the plurality of availability zones of the first cloud platform. The inbound connectivity statuses may define availability for an entity running at an external cloud platform to the first cloud platform to connect to at least one entity running at the first cloud platform.

In some instances, the monitoring services running at corresponding availability zones of the cloud platform can collect external connectivity data for external accessibility of corresponding network segments at one or all of the availability zones of the first cloud platform. In some instances, the external connectivity data can be received from a second cloud platform external to the first cloud platform. The external connectivity data is based on status data for sent and/or received calls at external web agents running at the second cloud platform.

At 830, in response to evaluating the internal and external structured data, a health status of the first cloud platform is determined. The health status that can be determined to include at least one of:
  an inbound connectivity status of the first cloud platform,
  an outbound connectivity status of the first cloud platform, and
  an internal connectivity status of the first cloud platform.

In some instances, the determined health status can be provided to platform services provided by the first cloud platform and/or applications running on the first cloud platform to support managing of lifecycles of entities running on the first cloud platform. In some instances, a platform service of the platform services may be responsible for managing lifecycle of a corresponding one or more entities. In some instances, the platform services can be core services provided by the first cloud platform that are integrated into the first cloud platform for consumption by applications or services run on the first cloud platform by end-users. For example, the platform services may fetch processed data from a health service that determined the health status in a similar manner as discussed in FIGS. 20 and 21 for an application management service 2020 and a database administration service 2125. The application management service and the database administration service may be platform provided services that support managing of the lifecycle of entities running on the first cloud platform. In response to receiving the health status data at a platform service, the platform service may evaluate the data and determine next operations associated with the lifecycle of an application and/or a database running on the first cloud platform. In some examples, a mode of a database may be changed, a start or a stop operation for an application instance may be instructed, a load balancing operation may be initiated, or other type of managing operation may be initiated (or instructed). In yet another example, the determined health status data can be provided to an application similar to the application 505 of FIG. 5, where the application is running in a first availability zone of multiple availability zones cloud platform. In some instances, the application can consume the health status data to perform operations related to execution of the application when in communication with a database or an external platform system. In some examples, the application may use the health status data to determine whether or not to execute outbound calls to other platforms, for example, an on-premise system. If the health status defines that the outbound connectivity is with a status "critical" (e.g., not operational), the application may suspend operations requiring outbound calls as the application cannot execute such calls due to the outbound connectivity outage. In some more instances, the health status data can be consumed by an application management service that manages application's lifecycle operations (e.g., to initiate start of the application, to stop the application, to change mode of the application, or change other operations of the application).

In some instances, the determined health status includes the inbound connectivity status. The inbound connectivity status may define an external cloud accessibility status for network connectivity between entities running at an external second cloud platform and entities running at the first cloud platform.

In some instances, the determined health status includes the outbound connectivity status. The outbound connectivity status may define an accessibility status for network connectivity between entities running at different network segments from the plurality of availability zones and external resources available over the Internet.

In some instances, the determined health status can include the internal connectivity status defining internal zone accessibility status. The internal zone accessibility status is related to connections between entities running at a network segment of the network segments of a first zone from the plurality of availability zones and entities running at a network segment of the network segments of a second zone of the plurality of availability zones of the first cloud platform. For example, the status may be between entities running in the application segments at two availability zones, or may be between entities running in a service segment at one zone and the application segment of another zone.

In some instances, based on determining the health status at 830, a network outage at a network segment from the network segments of at least one of the plurality of availability zones can be identified. The network outage can be identified based on the evaluation of the structured data collected at 810 and 820. In some instances, the outage can be based on a determination of limited or reduced connectivity between at least one of i) entities running at the network segment and entities running at other network segments of the first cloud platform, ii) entities running at the first cloud platform and entities running at different cloud platforms connected to the first cloud platform, and iii) external resources to the first cloud platform accessible over the Internet.

In some instances, based on the determined health status and the collected structured data, an outage can be identified as associated with a particular segment of the segments of an availability zone of the cloud platform. In some of those instances, the outage can be associated with an internal outage between entities running at that segment and entities running at another segment of the same availability zone. In some other instances, the outage may be determined as associated with limited accessibility of entities running at that segment from entities running at external cloud platforms.

In some instances, in response to determining that there is an outage, a particular or corresponding scope of the outage can be determined. The scope of the outage can define limited network segments from the cloud platform for outbound and inbound connections. In response to evaluating the scope of the outage, an outage status level can be determined. The outage status level can be determined from a predefined set of levels. The predefined set of status levels can be defined as a scale including, for example, status levels "ok," "warning," "critical," and "fatal," although alternative and/or additional levels of an outage can be used, including numerical or color-coded levels.

In some instances, in response to determining the outage status level, corresponding actions for an entity running on the cloud platform that is affected by the outage can be determined. The actions can include countermeasures related to the execution of the entity to provide services by the entities affected by the outage.

Figure 9:
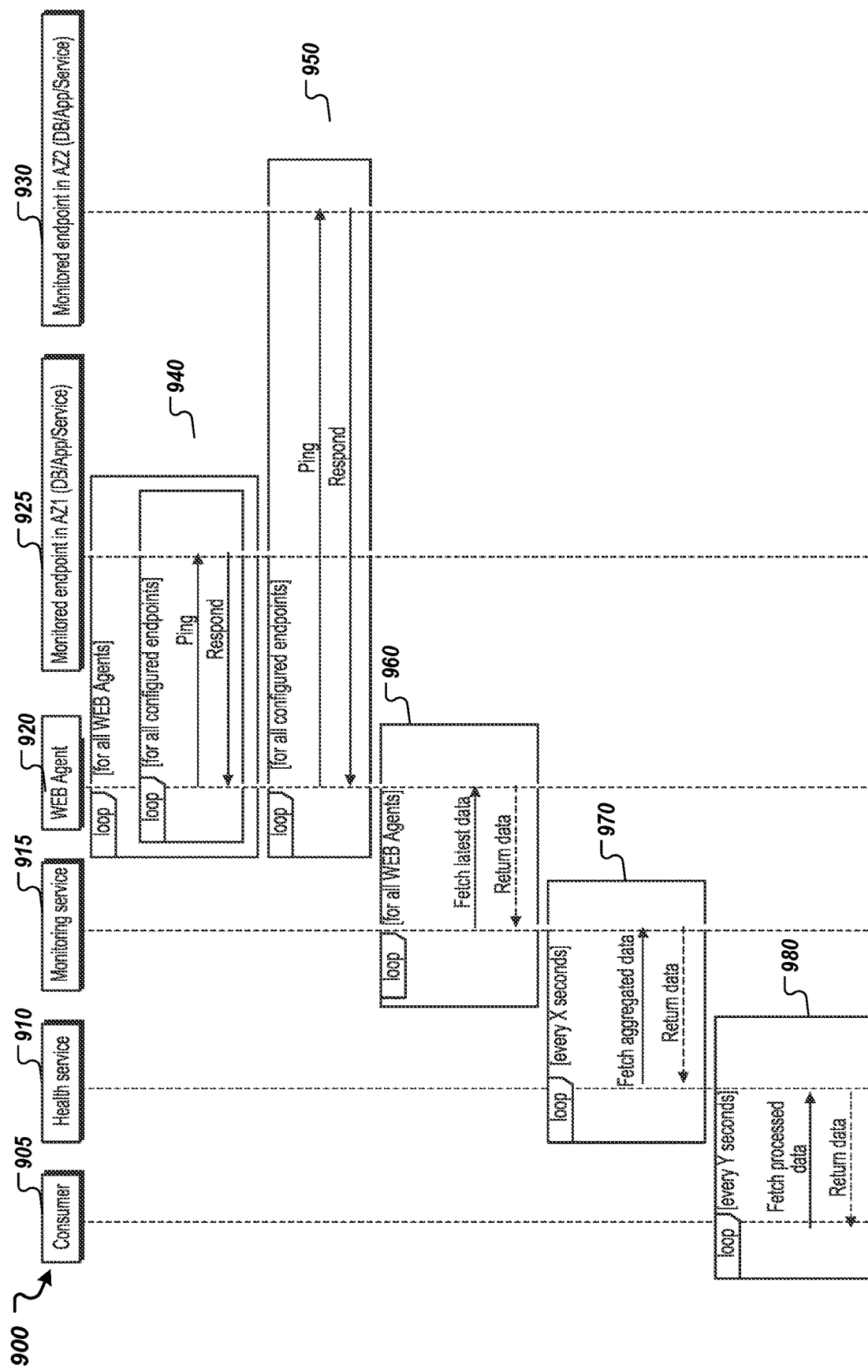
FIG. 9 is a block diagram for an example method for collecting health status data from web agents installed on a multiple availability zone cloud platform in accordance with implementations of the present disclosure.

FIG. 9 is a block diagram for an example method 900 for collecting health status data from web agents installed on a multiple availability zone cloud platform in accordance with implementations of the present disclosure. The entities associated with the method 900 may correspond to entities part of the monitoring framework as described for the description of FIGS. 7 and 8.

At 940, a web agent 920 sends a network call (e.g., a simple network call such as a ping call, or any other suitable network call) to a configured monitored endpoint(s) (925) at a first availability zone of a multiple availability zone cloud platform. For example, the web agent 920 can send the call to another web agent at the same availability zone. In some instances, the web agent 920 may be an internal web agent running in one availability zone of the multiple availability zone cloud platform, while in other instances, the web agent 920 may be an external web agent running in an external cloud platform to the multiple availability zone cloud platform, where the external cloud platform is communicatively coupled to the multiple availability zone cloud platform. In some cases, the external cloud platform can be a single zone cloud platform or a multiple availability zone cloud platform.

At 950, the web agent 920 sends a network call to a monitoring endpoint(s) 930 at another availability zone.

At 960, a monitoring service 915 (e.g., corresponding to the monitoring service 735 at FIG. 7) can collect data from the web agent 920. The collection of data can be performed periodically and automatically by the monitoring service 915. The monitoring service 915 collects data from multiple web agents and aggregates the data to generate structured data associated with multiple segments and corresponding availability zones of the cloud platform. For example, the monitoring service 915 collects data from multiple web agents and organizes the data based on association with the different network segments and availability zones. In this example, if data is received from one web agent, the data received from the web agent may be associated to the network segment of the availability zone where the web agent is running. Further, the data may also be associated to other network segments of other availability zones if the web agent has executed calls to endpoints configured at such segments.

At 970, a health service 910 (e.g., corresponding to the health service 725 at FIG. 7) collects structured data provided by the monitoring service 915. The health service 910 can collect aggregated data from the monitoring service 915 and may determine a health status of network connectivity of the cloud platform. For example, the health service 910 may determine that the application segment and all correspondingly running entities in that segment are inaccessible from the Internet.

At 980, a consumer fetches determined health status of a part of the whole of the cloud platform. The consumer may be an entity running on the cloud platform and interested in the status of the network connectivity and different network types. The consumer may be a service, an application, and/or a database running on the cloud platform. In yet another example, the consumer may be a management or an orchestration service distributing and scheduling lifecycle processes at the cloud platform.

Figure 10:
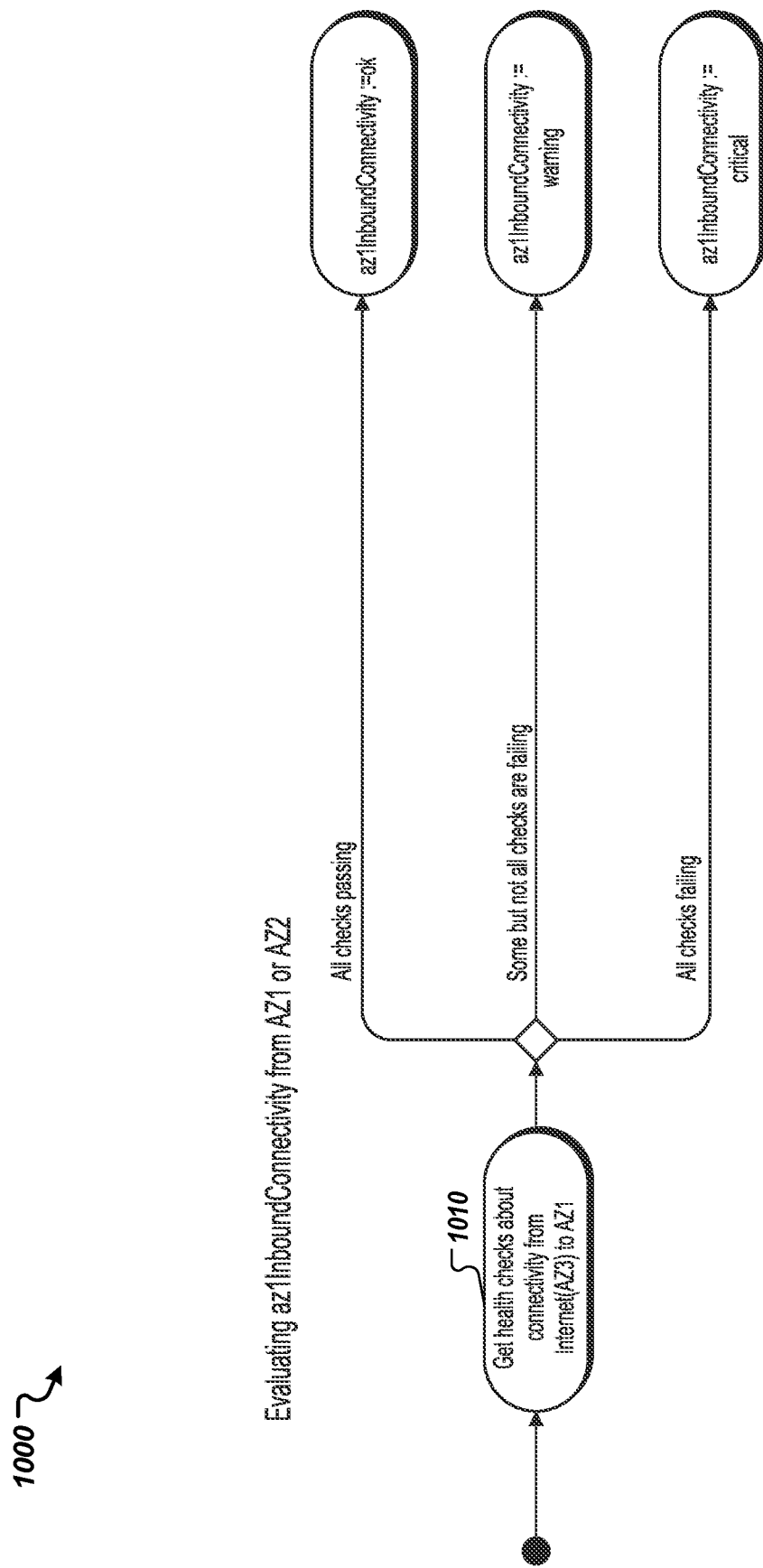
FIG. 10 is a block diagram for evaluating inbound connectivity for an availability zone of a cloud platform in accordance with implementations of the present disclosure.

FIG. 10 is a block diagram for evaluating inbound connectivity for an availability zone of a cloud platform in accordance with implementations of the present disclosure.

In some instances, FIG. 10 presents a flow 1000 for evaluation of inbound connectivity statuses for a first availability zone and/or a second availability zone of a cloud platform. The first and the second availability zones can correspond to the AZ1 710 and AZ2 720 of FIG. 7.

At 1010, data including health check data about connectivity from an external cloud platform to one availability zone of a cloud platform is collected. Health check data may be collected from web agents running at an availability zone as described previously. The health checks data may define whether an availability zone is accessible from an external cloud platform based on executed call between web agents from the availability zone and at the external cloud platform. If all the data indicates that connectivity is not disrupted, for example, by successful executed calls between web agents, the inbound connectivity status level can be determined to correspond to a first level, shown here as "OK." If a portion of the data indicates that connectivity between the availability zone and the external cloud platform is not verified, such as that there has not been a record for a successfully executed call between two entities in those zones, or there is an indicator for a failed call, then the inbound connectivity connection status level can be defined to indicate a second level, shown here as "warning." If all the health check data indicates that connectivity is interrupted, then the inbound connectivity status level can be determined to a third level, shown here as "critical."

Figure 11:
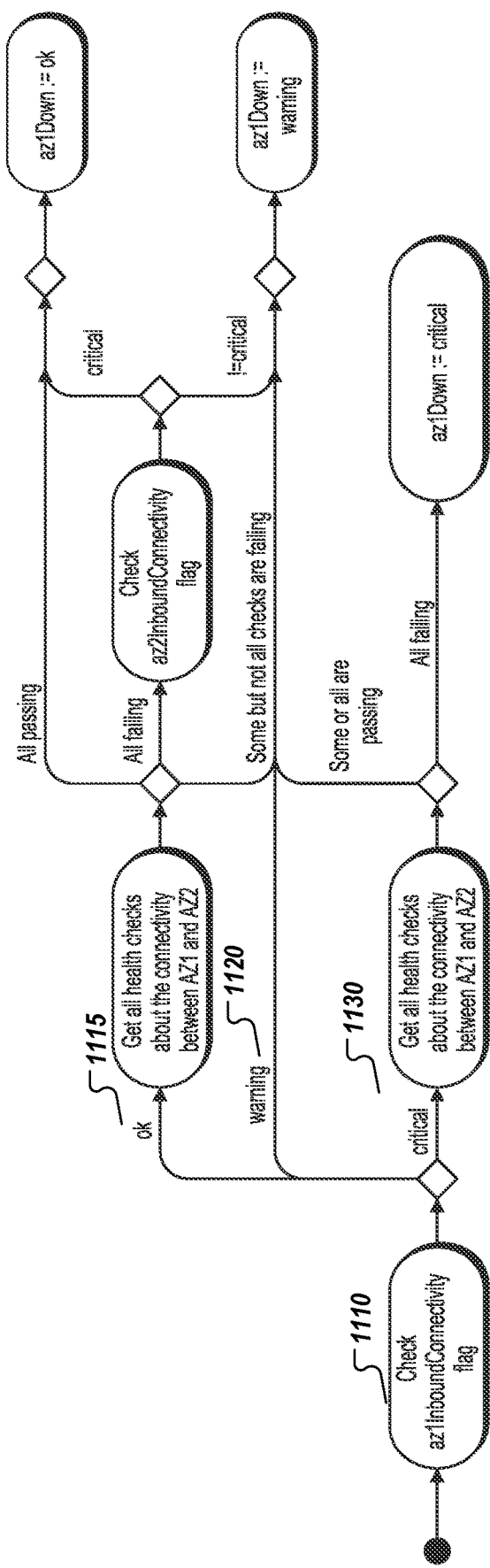
FIG. 11 is a block diagram for evaluating status of availability zones in a multiple availability zone cloud platform in accordance with implementations of the present disclosure.

FIG. 11 is a block diagram for a method 1100 for evaluating statuses of availability zones in a multiple availability zone cloud platform in accordance with implementations of the present disclosure.

In some instances, an evaluation of an inbound connectivity status of a first availability zone from multiple availability zones can be further evaluated once an inbound connectivity status level is determined (at 1110) in accordance with the disclosed status levels at FIG. 10. As discussed in FIG. 10, the example levels are defined as "ok," "warning," and "critical." Based on the different levels, different routes of the evaluation can be processed at 1115, 1120, and 1130.

At 1115, if the inbound connectivity of the first availability zone is associated with a status level "ok," then an evaluation of the connectivity between the availability zone and other availability zones of the cloud platform can be performed. Therefore, health check data for the connectivity status of the availability zone with other availability zones of the cloud platform is collected. The connectivity status can be determined by evaluating all of the checks defined with the configured network calls between web agents and monitored endpoint pass successfully.

If all of the checks pass successfully, then the inbound connectivity status can be categorized as "ok," as the availability zone is accessible from other availability zones of the cloud platform, from external entities over a network connection (e.g., web applications, external cloud platforms), and can also request access to resources from the other availability zones of the cloud platform.

If the connectivity status between the first availability zone and the at least one other availability zone is determined to be associated with a status level "warning," the inbound connectivity of the whole cloud platform can be determined as being associated with a status of "warning," since it may not be possible to determine whether and to what extent requests sent to the availability zones can be received and/or processed.

If all the checks are failing, further evaluations for the connectivity from the perspective of the other availability zones can be performed to determine whether the availability zone is accessible or a completely isolated zone. If some of the health checks are failing, the status can be defined as "critical." In some instances, the inbound connectivity of the availability zone can be determined to be associated with a status of "critical" based on determining that all of the health check calls performed between the availability zone and the other availability zones had failed. In order to further evaluate the availability zone connectivity, it can be first determined whether the failure of the health check calls is due to issues at the first availability zone being evaluated, or whether the failure is associated with connectivity issues at other availability zones. For example, if the cloud platform includes two availability zones, and if the second availability zone is inaccessible due to a network outage, even if there are health checks from the first availability zone to the second availability zone, those checks will all fail as the other side is non-responsive. Therefore, further evaluations can be made in relation to at least one of the other availability zones to determine whether the at least one other availability zone is accessible from the Internet and/or from another external cloud platform.

In some instances, if the inbound connectivity between the at least one other availability zone and the Internet and/or other cloud platforms is determined to be associated with a status of "critical" (e.g., that can be determined as a separate step or such determination can be reused from a previous evaluation of the connectivity status of the other availability zone), then it can be determined that the other availability zone is inaccessible, and the failure of the connectivity between the first availability zone (e.g., as evaluated in 1115 is not due to a technical issue (e.g. programming malfunction, hardware failure, other) at the first availability zone. Therefore, the status of the first availability zone can be determined as "ok," since at least some of the checks are successfully executed to the first availability zone and the first availability zone is running and accepting external calls (e.g., at least to a certain threshold).

In some instances, if the inbound connectivity between the at least one other availability zone and the Internet and/or other cloud platforms is not determined as a status "critical" (e.g., status "ok," "warning"), then it can be concluded that there is an communication issue between the first availability zone and the other availability zone, and the status of the first availability zone can be set to "warning," as the connectivity between different availability zone within the cloud platform may be compromised.

At 1120, if the inbound connectivity of the first availability zone is with a status level "warning," the inbound connectivity of the whole cloud platform can be determined as with status "warning" since it may not be possible to determine whether and to what extent requests sent to the availability zones can be received and/or processed. Then the connectivity status level can be determined as a whole for the cloud platform as "warning."

At 1130, if the inbound connectivity of the first availability zone is with a status level "critical," then the inbound connectivity status level can be determined by further evaluations that can be performed to determine whether the availability zone is further isolated from other availability zones or not, and can be defined as a final status of either "warning" or as updated to "critical."

Figure 12:
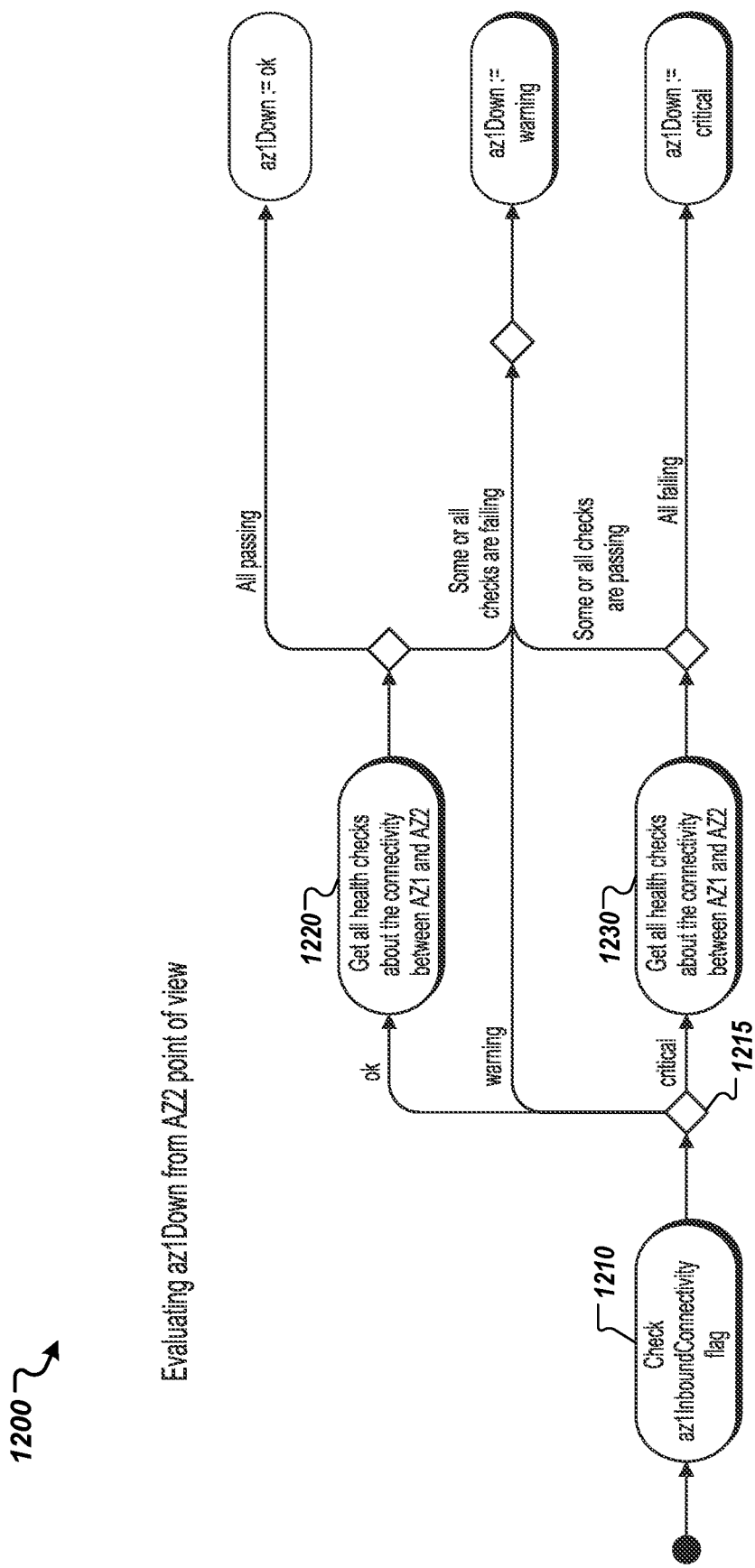
FIG. 12 is a block diagram for evaluating status of availability zones in a multiple availability zone cloud platform in accordance with implementations of the present disclosure.

FIG. 12 is a block diagram for a method 1200 for evaluating status of availability zones in a multiple availability zone cloud platform in accordance with implementations of the present disclosure.

In some instances, a health status "AZ1 Inbound Connectivity" of a first availability zone (e.g., AZ1 of a multiple availability zone cloud platform) can be determined at 1210. In some instances, the multiple availability zone cloud platform may be similar to the described multiple availability zone cloud platform at FIG. 7, 8, or 9.

In some instances, a status level of the "AZ Down" status can be determined at 1215. For example, the status level can be determined as either "ok," "warning," or "critical." In some other examples, other status levels can be determined to represent a corresponding scale for status levels.

In some instances, if the status level of the "AZ1 Inbound Connectivity" status is determined as "ok," then the health check data for the connectivity between AZ1 and AZ2 can be collected at 1220. For example, AZ2 may include a health service that can collected data from internal web agents and/or external web agents to determine the inbound connectivity status of AZ1. In some instances, if the data for executed health checks indicates that all network calls sent to entities at AZ1 can be executed (i.e., pass successfully), then the status level of the "AZ Down" of AZ1, based on the evaluations at AZ2, can be determined to be the status level "ok." If the data for executed health checks defines that some or all of the executed network calls were not able to be executed (e.g., they fail or identify another issue), then the status level of "AZ Down" of AZ1, based on the evaluations at AZ2, can be determined to correspond to a status level "warning."

In some instances, if the status level of the "AZ1 Inbound Connectivity" status is determined as "warning," then the status level of the "AZ Down" status of AZ1 can be determined to be status level "warning" based on the evaluations at AZ2.

In some instances, if the status level of the "AZ1 Inbound Connectivity" status is determined as "critical," then health check data for the connectivity between AZ1 and AZ2 can be collected at 1230. In some instances, if the data for executed health checks indicates that all network calls sent to entities at AZ1 cannot be executed (e.g., they fail, or identify another issue), then the status level of the "AZ Down" status of AZ1 can be determined to be status level "critical" based on the evaluations at AZ2. If the data for executed health checks indicates that some or all of the executed network calls were able to executed (e.g., pass successfully), then the status level of the "AZ Down" status of AZ1 can be determined to be status level "warning" based on the evaluations at AZ2.

Figure 13:
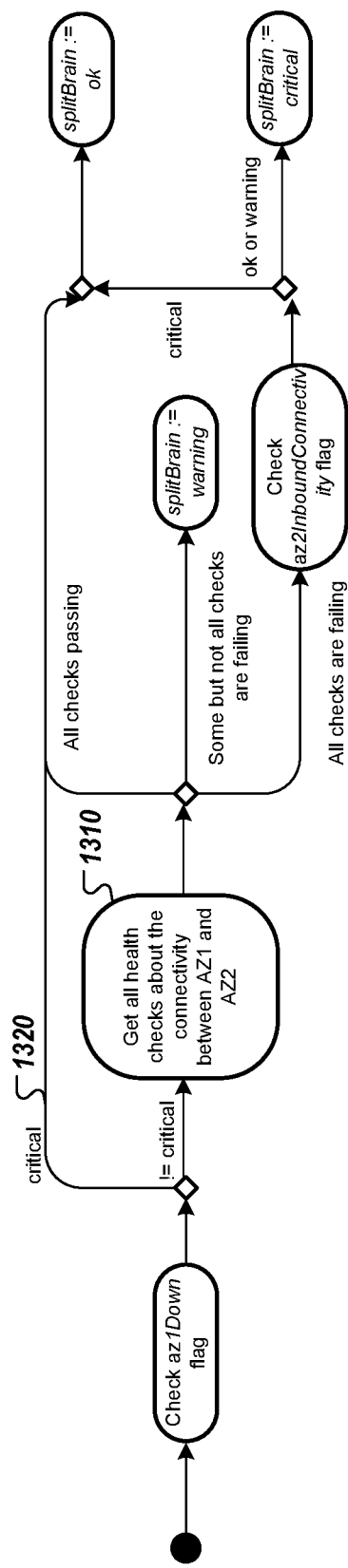
FIG. 13 is a block diagram for evaluating status of availability zones in a multiple availability zone cloud platform in accordance with implementations of the present disclosure.

FIG. 13 is a block diagram for a method 1300 for evaluating status of availability zones in a multiple availability zone cloud platform in accordance with implementations of the present disclosure.

In some instances, a first availability zone (e.g., AZ1 of a multiple availability zone cloud platform) can be determined to have a health status of "AZ Down." In some instances, the multiple availability zone cloud platform may be similar to the described multiple availability zone cloud platform at FIG. 7, 8, or 9. With a status of "AZ Down," the AZ1 is determined to have disrupted accessibility from the Internet and/or from another AZ of the cloud platform.

In some instances, when the status level of a health status outage "AZ Down" of AZ1 is determined, then further evaluations can be performed to determine whether the "AZ Down" outage status causes a "Split brain" status, and if so, the status level of the determined "Split brain" status. In some instances, the "Split brain" status can be determined when a cloud platform comprises multiple availability zones (or data centers) that cannot communicate and synchronize data between each other while, at the same time, the cloud platform still provides working functionality.

In some instances, "Split brain" status levels can include the status levels of "ok," "warning," or "critical." Other suitable status levels can be used in other examples and implementations. In some instances, determining the status level of a "Split brain" status can be associated with further evaluations of health check data for the connectivity of AZ1.

In some instances, at 1320, the "AZ Down" status for the first availability zone can be determined as "critical." In some instances, the "AZ Down" status can be determined to be "critical" when AZ1 is inaccessible and not running while the other availability zones remain functioning and running. In some instances, when the cloud platform includes two availability zones and one of the zones is not running and inaccessible (e.g., down), then the cloud platform can be evaluated as a single availability zone platform. In those instances, if one of the availability zones is not running and is inaccessible while the other availability zone remains, then the "Split Brain" status can be defined as "ok."

In some instances, if it can be determined that the status level of a health status outage "AZ Down" of AZ1 is determined to be different from "critical" (e.g., "ok" or "warning"), then at 1310, health check data about connectivity between AZ1 and a second availability zone (e.g., AZ2) of the cloud platform can be collected and evaluated.

In some instances and based on an evaluation of the collected data at 1310, if the data for executed health checks defines that all network calls sent to entities at AZ1 can be executed (i.e., pass successfully), then the status level of the "Split brain" status of AZ1 can be determined to be status level "ok." If the data for executed health checks defines that some, but not all, of the executed network calls were not able to be executed (e.g., randomly fail), then the status level of the "Split brain" status of AZ1 can be determined to be status level "warning." If the data for executed health checks defines that all of the executed network calls were not able to be executed (e.g., all fail), then an inbound connectivity status of AZ2 can be determined.

If the inbound connectivity status of AZ2 is determined to be "critical", then the status level of the "Split brain" status of AZ1 can be determined to be status level "ok." In those cases, as there is an outage in the inbound connectivity status of AZ2 (i.e., the status is "critical") and the connectivity between AZ1 and AZ2 is disrupted, then it can be determined that AZ2 is in an isolation mode. As such, the cloud platform remains with a single working availability zone (i.e., AZ1), a "Split brain" status can be determined as a status of "ok," as there are no multiple zones in working mode. If the inbound connectivity status of AZ2 is "ok" or "warning," then the status level of the "Split brain" status of AZ1 can be determined to be status level "critical."

Figure 14:
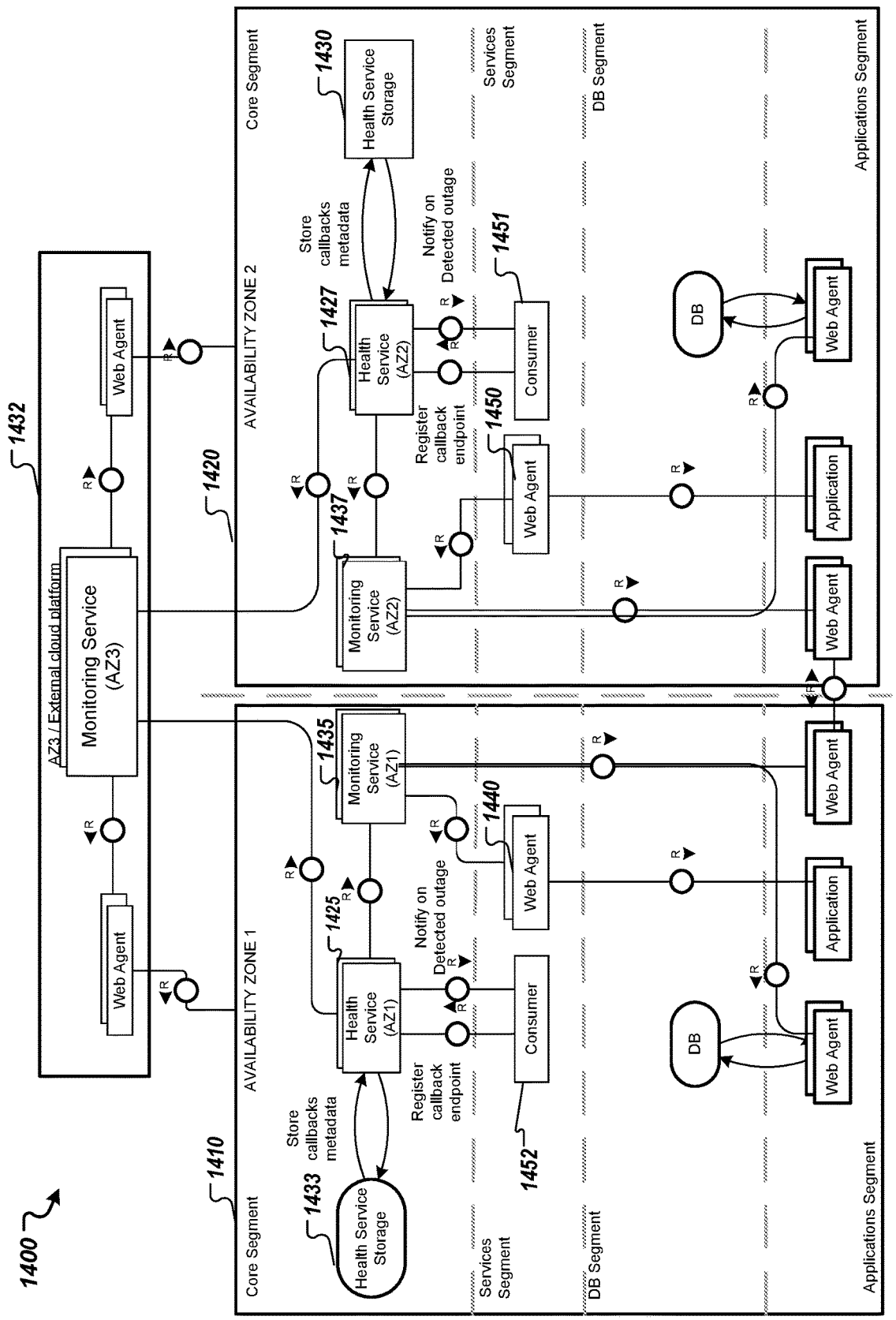
FIG. 14 is a block diagram for an example system for providing notification for a health status of network connectivity of a cloud platform in accordance with implementations of the present disclosure.

Subscriptions and Notifications for Health Status Updates for Network Connectivity of a Cloud Platform FIG. 14 is a block diagram for an example system 1400 for providing notifications for health statuses of network connectivity of a cloud platform in accordance with implementations of the present disclosure. In some instances, the example system 1400 may include a cloud platform that is defined as a multiple availability zone platform. The example system 1400 may have a corresponding system architecture to the example system 700 of FIG. 7. The cloud platform includes two zones: availability zone 1 (AZ1) 1410 and availability zone 2 (AZ2) 1420. The availability zones represent data centers that can be distributed in different geographical locations to provide improved availability of services and applications running on the cloud. Each of the availability zones of the multiple availability zones (e.g., AZ1 1410 and AZ2 1420) may correspond to the cloud platform 210 described in FIG. 2, where the cloud platform 210 is represented as a single availability zone platform. For example, AZ1 1410 and AZ2 1420 can include corresponding network segments as described in the disclosure of FIG. 2.

In some instances, the two zones, AZ1 1410 and AZ2 1420, include internal web agents that are equivalent to the web agents discussed for example for FIG. 2 and/or FIG. 7. The cloud platform is associated with an external cloud platform 1432. In some instances, the external cloud platform may be represented as a third availability zone, i.e., AZ3 1432. Alternatively, the external cloud platform may be a multiple availability zone cloud platform. The external cloud platform 1430 may have installed and configured web agents that correspond to the web agents 270 and 271 of the external cloud platform 250 of FIG. 2.

The two zones include corresponding monitoring service instances, monitoring service (AZ1) 1435 and monitoring service (AZ2) 1437. The monitoring services 1435 and 1437 may correspond to monitoring service 215 of FIG. 2, and/or to monitoring services 735 and 737 of FIG. 7 and can represent an aggregation layer that collects health status data from both internal and external web agents.

The two zones include corresponding health service instances, health service (AZ1) 1425 and health service (AZ2) 1427. The health services 1425 and 1427 may correspond to the health service 220 of FIG. 2 and/or the health services 725 and 727 of FIG. 7.

In some instances, the health services 1425 and 1427 gather information about the health status of the cloud platform landscape. In some instances, the gathered information includes information for different components and/or segments of the cloud platform. In some instances, the health services 1425 and 1427 may evaluate the gathered data and determine a health status of network connectivity of the cloud platform. In some instances, the gathered information at the health services 1425 and 1427 and/or the determined health status of network connectivity of the cloud platform may be exposed through an API for consumption by interested entities, for example, consumer 1451 or 1452. The customer 1451 and/or 1452 may be an entity such as a service, an application, a database. In FIG. 14 the consumer 1451 and 1452 are located at the service segments of the different availability zones, however, other locations can be appreciated as available for a consumer to receive exposed data through the API.

In some instances, the health service 1425 and 1427 may store information for registered subscriptions at a corresponding health service storages 1433 and 1430. The health services 1425 and 1427 store data about received and processed request for registering a consumer for receiving notification for a current health status of the cloud platform. Further, the health services 1425 and 1427 may include logic to evaluate the stored data for the registered subscriptions. When a subsequent request for registration is received, such a request can be processed based on evaluating the stored data. In response to evaluating the stored data, a determination can be made for how to provide notifications to subscribed consumers.

In some instances, the consumer 1452 may request through the API on regular intervals to receive up-to-date status information about the health status of the network connectivity of the cloud platform. As an alternative, instead of actively polling the health service's API for receiving the latest health status information about the network connectivity of the cloud platform, the consumer (e.g., consumer 1451 and/or consumer 1452) can request to be subscribed for notifications of changes of the health status. In some instances, the consumer 1451 and/or 1452 can register to receive notifications at a subscription network address (e.g., a callback URL). The subscribed network address can be provided with a requested set of data according to a notification regime. In some instances, the provided data may be determined according to different rules included in the notification regime.

In some instances the notification regime may include one or more conditions or rules for providing notifications to a subscribed entity (e.g., consumer). For example, the notification regime may define that a notification is sent to the subscribed entity in regular time intervals, for example, every X seconds. With this notification regime, even if the health check statuses have not changed between two consecutive time points when notification has to be provided, the health status is provided to the subscribed consumer in regular intervals with fixed length. In some more instances, a subscribed consumer for notifications for the health status of the network connectivity of the cloud platform can be provided with notification in response to a determined change in the current health status of the cloud platform. In those instances, notifications are provided with improved resource spending as execution is performed only when necessary and when relevant.

In some instances, a consumer such as the consumer 1451 or the consumer 1452 may be referred to as callback applications associated with the registered callback URLs with the corresponding subscriptions.

In some instances, a combination of a regular notification regime and a regime where a consumer is provided with a notification due to a change in the health status may be implemented at the consumers (1451 and/or 1452). In some instances, the callback application can subscribe for notifications at the health service (either 1425 or 1427 based on the availability zone where the callback application is running) in both modes, or may choose the mode that corresponds to the execution and notification needs and/or requirements of the application.

In some instances, the callback application can subscribe for a specific type of health check information (e.g., internal health status information for network connectivity between segments in the cloud platform). In some instances, the callback application can be limited to receiving only events related to changes in this type of health status data.

In some instances, to provide notifications in a reliable manner, relatively long connection timeouts for establishing a connection between the health service and the registered callback application can be configured. In some instances, a failed notification can be resent at least once to network address subscribed to receive the notifications.

In some instances, more than one consumer can be registered to receive notifications. Thus, more than one network address to receive callbacks can be registered at the health service. In some instances, restrictions to the number of consumers registered for notification can be implemented. For example, a same network address can be limited to a single registration for notifications. In another example, a single application may be limited to registering only a limited set of network addresses (URLs) to receive notifications. In yet another example, undeployed or non-responsive applications or services can be identified and automatically unregistered from receiving notifications. In such examples, a time period of non-responsiveness may be used as a threshold value to determine whether to unregister an application from receiving notifications.

Figure 15:
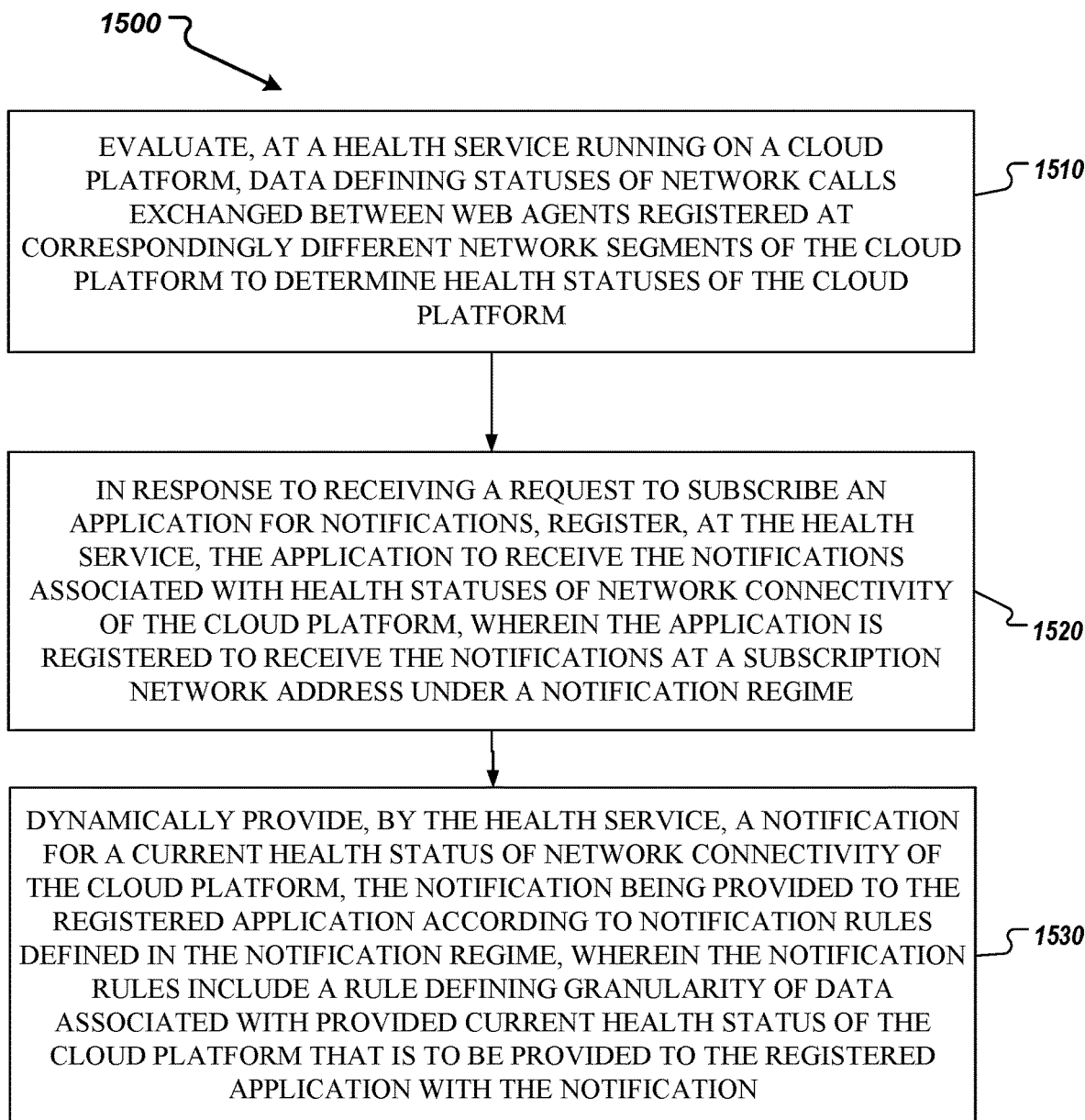
FIG. 15 is a flow chart for an example method for providing notification to registered application for a health status of network connectivity of a cloud platform in accordance with implementations of the present disclosure.

FIG. 15 is a block diagram for an example method 1500 for providing notification for a health status of network connectivity of a cloud platform in accordance with implementations of the present disclosure. In some instances, the method 1500 may be executed within the example system 1400 of FIG. 14 and in association with the cloud platform comprising multiple availability zones, AZ1 1410 and AZ2 1420 of FIG. 14. In some other instances, the method 1500 may be executed within the example system 200 of FIG. 2 where the cloud platform includes a single availability zone (e.g., data center), or within the example system 700 of FIG. 7 where the cloud platform includes multiple availability zones.

In some instances a monitoring framework is setup at a cloud platform as discussed in relation to various embodiments described in the present disclosure. The monitoring framework may include a health service that corresponds to the health service 1425 and 1427. The health service may provide health status information for network connectivity of the cloud platform. The health status may include information for different types of connectivity including inbound, outbound, and internal cloud connectivity as discussed in the present disclosure.

At 1510, data defining statuses of network calls is evaluated at a health service running on the cloud platform. The network calls are exchanged between web agents registered at correspondingly different network segments of the cloud platform to determine health statuses of the cloud platform. The exchange of network calls may be similar to that discussed in FIGS. 1, 2, and/or 7.

In some instances, the health service automatically receives the data from a monitoring service running on the cloud platform, where the monitoring services collect the data from the web agents installed and registered at the different network segments of the cloud platform.

In some instances, in response to receiving the data at the health service from the monitoring service, structured data correspondingly defining network connectivity status for the different network segments is determined. A current health status of the first cloud platform can be determined based on evaluating the structured data according to predefined status evaluation rules. Such current health status can be communicated to an application running on the cloud platform.

In some instances, the health service determines health statuses corresponding to different connectivity types of the cloud platform. In some instances, a health status of the determined health statuses may be an inbound connectivity status of the first cloud platform, an outbound connectivity status of the first cloud platform, and/or an internal connectivity status between network segments of one availability zone of a cloud platform or between different availability zones of a multiple availability zone cloud platform.

In some instances, determining a health status of the cloud platform may include determining an internal connectivity status between a plurality of availability zones of the cloud platform. The cloud platform is defined in a multiple availability zone cloud architecture including the plurality of availability zones.

At 1520, in response to receiving a request at the health service to subscribe an application for notifications, the application registers to receive the notifications associated with health statuses of network connectivity of the cloud platform. In some instances the application can be a consumer as discussed in the description of FIG. 14. In some instances, the application can be an application service or a database. In some instances, the application registers to receive the notifications at a subscription network address under a notification regime. The subscription network address may be defined as a callback URL where the health service may send the notifications according to the notification regime.

In some instances, the health service stores metadata about the registered application and the subscription network address at a health service storage maintained at the cloud platform.

In some instances, the received request to register the application defines the notification regime. In some instances, the notification regime can be a regular notification process. The regular notification process may be configured for the health service to provide scheduled notifications in regular time period intervals to the registered network address with current health statuses of the first cloud platform. The time period intervals may be predefined for the registered application.

In some other instances, the received request to register the application defines the notification regime as a notification process triggered by a change between determined consecutive health statuses. In those instances, the health service is configured to provide the notification to the registered network address with the current health status of the first cloud platform.

At 1530, the health service dynamically provides a notification for a current health status of network connectivity of the cloud platform to the registered application. The notification regime applied for providing the notifications may include notification rules. The notification rules can include a rule defining a granularity of data associated with provided current health status of the cloud platform that is to be provided to the registered application with the notification. In some instances, the notification to the registered application is dynamically provided in response to a determined change between a previously determined health status and the current health status of the cloud platform.

In some instances, in response to determining that the registered application is non-responsive within a predefined time period, the application is actively unregistered at the health service.

In some instances, the health service may provide notifications to registered application based on a determination of whether there is an outage associated with the cloud platform. In some instances, an outage may be associated with a network segment of the network segments of the cloud platform. In some other instances, an outage may be identified based on the evaluation of the data defining the statuses of the network calls exchanged. The outage may be determined based on limited connectivity between at least one of i) entities running at the network segment and entities at other network segments of the first cloud platform, ii) entities running at the first cloud platform and entities running at different cloud platforms connected to the first cloud platform. In some instances, based on a determined outage, a scope of the outage can be determined to correspond to one or more network segments and in relation to different connection types, including outbound, inbound, and internal connections for the cloud platform. The determined scope may be mapped to entities running in related segments, and those of the entities that are registered for notifications may be provided with a notification. The notification may be provided with a subsequent notification sent to the application according to the notification regime or upon determining that a change in the connectivity status associated with the application is identified.

In some instances, in response to evaluating a scope of a determined outage, an outage status level from a predefined set of levels can be determined for the outage. In response to determining the outage status level, corresponding actions for an entity running on the cloud platform that is affected by the outage may be determined. Those actions may include countermeasures related to the execution of the entity to provide services by the entities affected by the outage.

Figure 16:
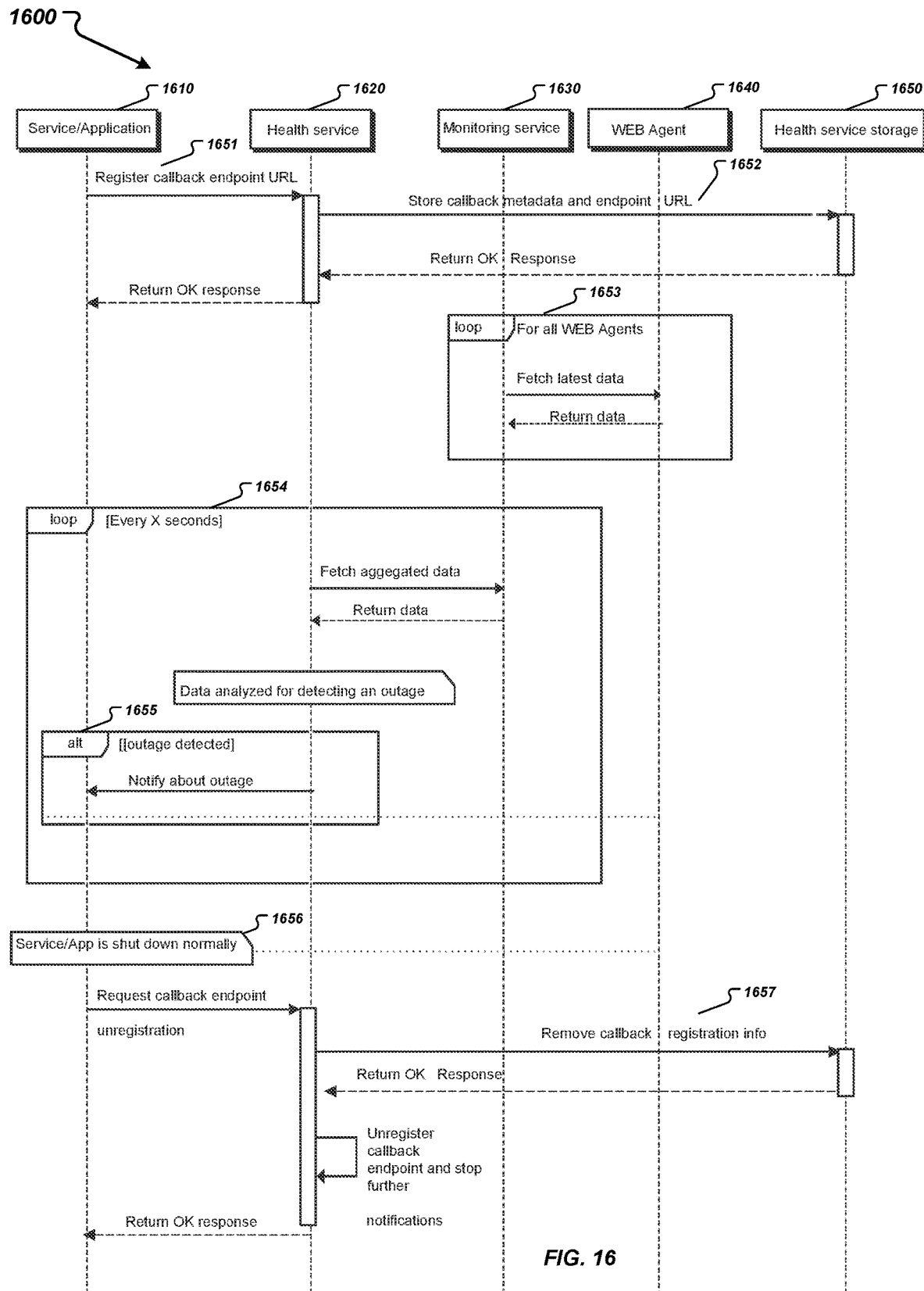
FIG. 16 is a block diagram for an example method for providing notification for a health status of network connectivity of a cloud platform in accordance with implementations of the present disclosure.

FIG. 16 is a block diagram for an example method 1600 for providing notification for a health status of network connectivity of a cloud platform in accordance with implementations of the present disclosure. In some instances, the example method 1600 may be executed at the example system 1400 of FIG. 14 and in relation to the cloud platform 210 of FIG. 2 and/or cloud platform 705 of FIG. 7. In some instances, a monitoring framework, e.g., as described in the description of various figures in the present disclosure, may be setup at the cloud platform. The monitoring framework may be setup to monitor a health status of different endpoint of the cloud platform and to determine a status of different types of connections. For example, health status can include status for inbound connections, outbound connections, and internal connections for the cloud platform. Setting up the monitoring framework may include installing and configuring web agents corresponding to the internal and external web agents as described, for example, for system 200 of FIG. 2. Further, the monitoring framework may include a monitoring service 1630, including a service 1630 that corresponds to the monitoring service 215 of FIG. 2, and a health service 1620 that may correspond to the health service 220 of FIG. 2.

In some instances, web agent 1640 is installed and configured on the cloud platform to execute network calls (e.g., simple or complex calls, including simple "ping" calls) to different monitored endpoint(s) located at different segments and/or zones of the cloud platform. The monitored endpoint can be other web agents running at different location at the cloud platform and externally to the cloud platform. The different web agents may execute calls to the configured endpoints. The endpoint(s) may be also an application and/or service running on the cloud platform.

In some instances, the web agent 1640 can be an internal web agent for the cloud platform, but also an external web agent for the cloud platform that runs at an external cloud platform. The external web agent may execute calls to endpoints defined at the cloud platform, e.g., an application running in an application segment of the cloud platform, an internal web agent running in the application segment of the cloud platform, a service running in a service segment of the cloud platform, among other example entities running at different network segments of the cloud platform.

In some instances, at 1651, a service or an application 1610 may request to subscribe to the health service 1620 to receive notification for a determined health status for (the whole or a part of) the cloud platform. In some instances, the service or application 1610 requests to subscribe by sending a registration request including a network address for receiving the notifications. The network address may be defined as a callback endpoint URL. In some instances, different services and applications, deployed on the cloud platform, can register endpoint URLs to receive notifications including a current health status of the cloud platform. Further, the registered services and applications can receive notifications when an outage is identified based on evaluating the health data received at the health service 1620 from the monitoring service 1630.

At 1652, in response to receiving a request to register a network address, the health service 1620 sends a request to store metadata for the received requests and the network address as a callback endpoint URL to a health service storage 1650. The health service storage 1650 may be as health service storage 1433 and 1430 of FIG. 14. The callback registration information that is sent from the health service 1620 to the health service storage 1650 may include metadata about the application or service that has requested to register and the network address itself. The health service storage 1650 is a persistent storage, which can be accessed at a later point to retrieve data about the registered applications and/or services, as needed.

In some instances, the monitoring service 1630 may periodically call a web agent 1640 (at 1653) to gather health check status information for executed calls to determine the health status of the cloud platform.

In some instances, the health service 1620 may collect data from the monitoring service 1630 at 1654. At 1653, the collected data is aggregated data based on the fetched data. The health service 1620 may analyze the data and determine whether there is an outage, for example, at one or more of the different type of connections related to the cloud platform—inbound, outbound, and internal communications. In some instances, when an outage is determined, a notification can be provided (at 1655) to the service/application 1610 according to the notification regime defined for the service/application 1610.

At 1656, the registered application 1610 is shut down and, in response to being shut down, a request to unregister the service/application 1610 is sent to the health service 1620. At 1657, the health service 1620 can communicate with the health service storage 1650 to request removal of the registration information for the service/application 1610, and a confirmation of the unregistration can be confirmed to the service/application 1610.

Figure 17:
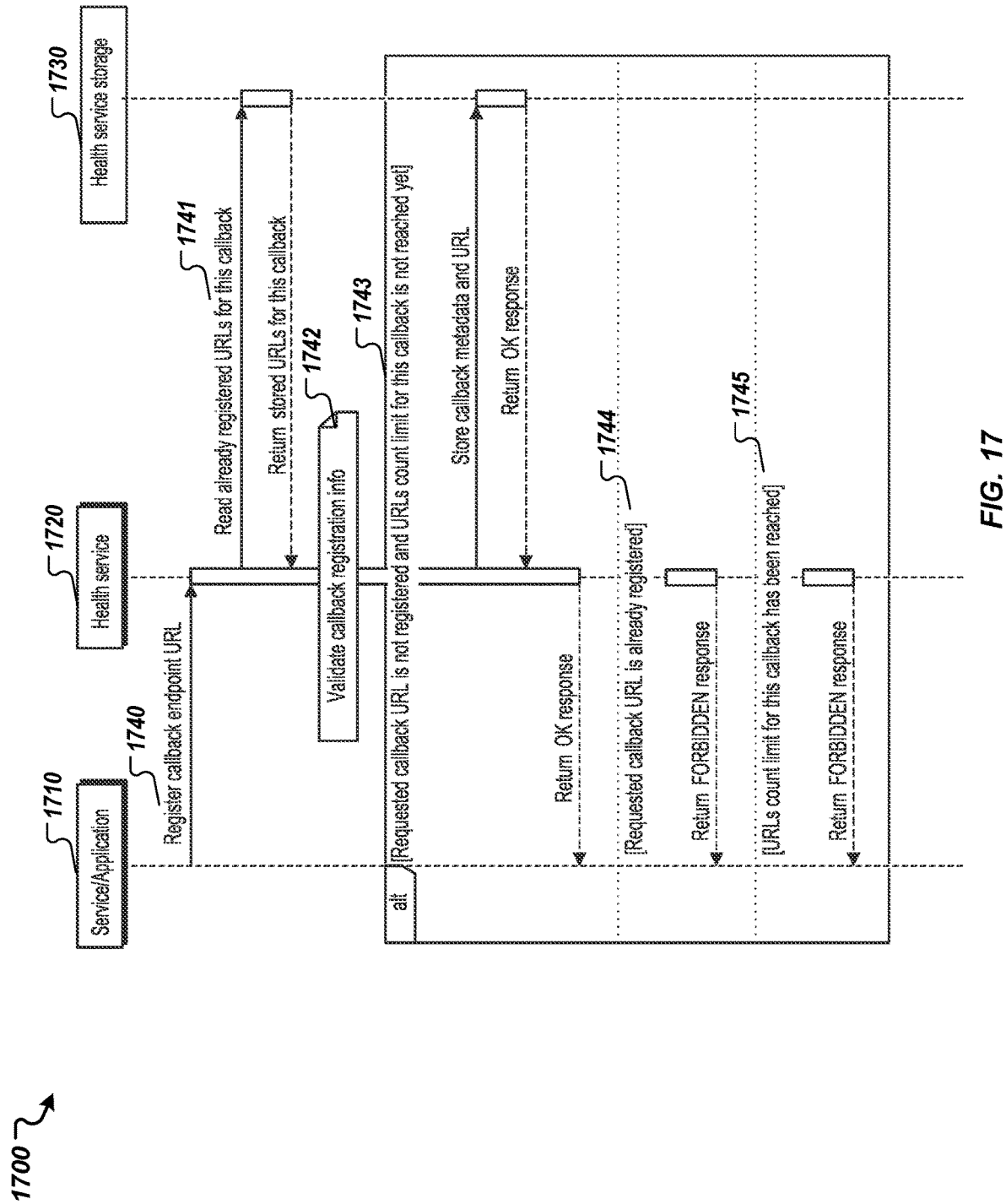
FIG. 17 is a block diagram for an example method for registration of applications for notification for a health status of network connectivity of a cloud platform in accordance with implementations of the present disclosure.

FIG. 17 is a block diagram for an example method 1700 for registration of applications for notification for a health status of network connectivity of a cloud platform in accordance with implementations of the present disclosure. The example method 1700 may include a service/application 1710, a health service 1720 and a health service storage 1730, where those elements may, in some instances, correspond to the service/application 1610, the health service 1620, and the health service storage 1650 of FIG. 16. The method 1700 may be executed over a cloud platform as discussed in the description of FIG. 14.

At 1740, the service/application 1710 can send a request to register a callback endpoint URL as a network address to be notified with information about the health status of the cloud platform. The health service 1720 can send a request to read information about registered applications and services from the health service storage 1730. The health service storage 1730 stores information for registered services, their corresponding network addresses for receiving notification, a correspondingly defined notification regime information.

At 1742, the received information from the health service storage 1730 associated with the already registered application is validated. At 1743, if the requested network address (at 1740) is not registered and the number of registered network addresses is below a threshold limit for registration of notifications, the service/application 1710 is registered to receive information and corresponding metadata and network address are provided to the health service storage 1730.

At 1744, if the requested network address is already registered, the health service 1720 may return a response to reject registration of the service/application 1710 for notifications.

At 1745, if, when the requested network address is received, the number of registered network addresses by the health service 1720 for the service/application 1710 has already reached a threshold limit, then the health service 1720 may return a response to reject registration of the service/application 1710 for notifications.

Figure 18:
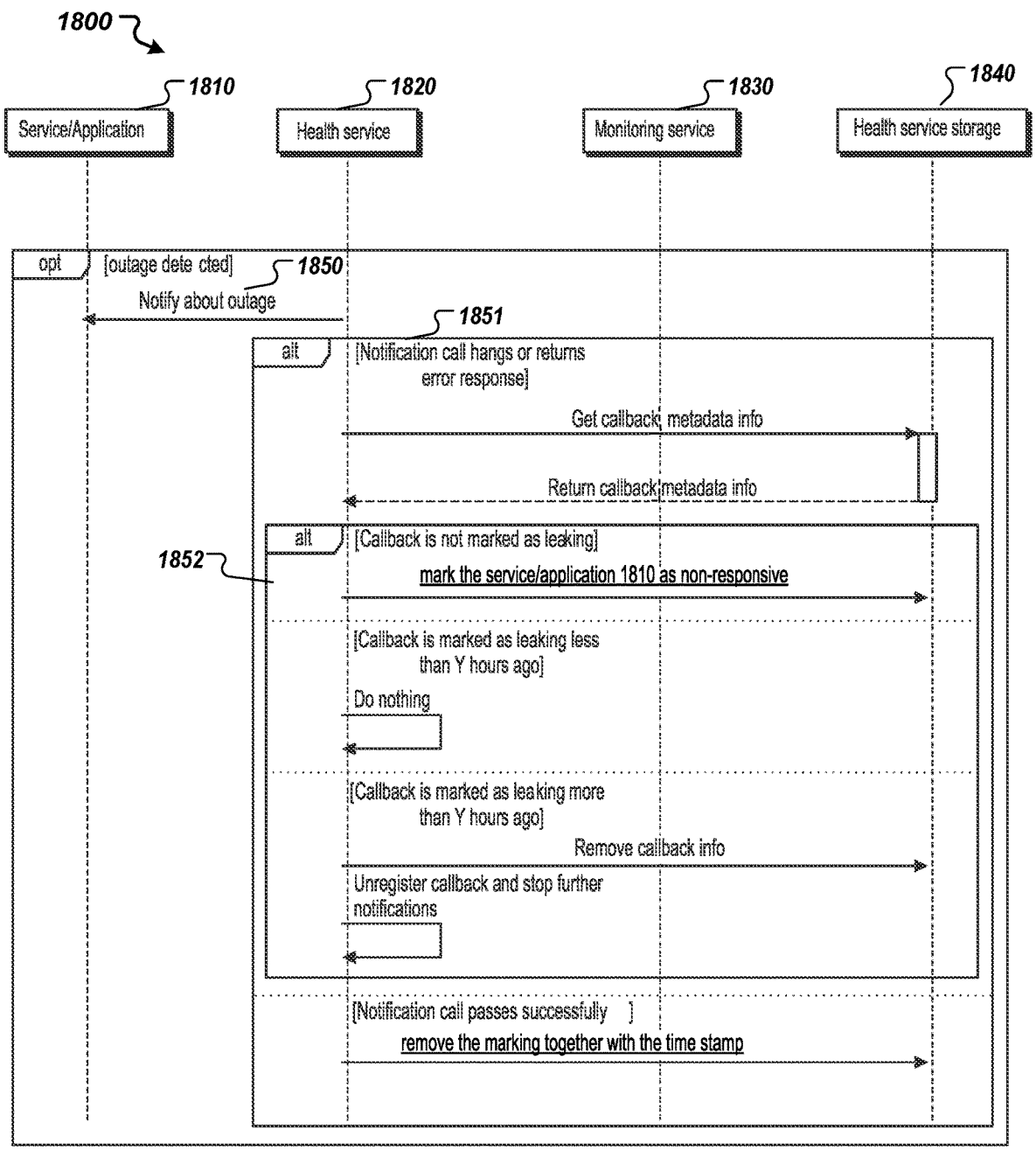
FIG. 18 is a block diagram for an example method for removal of registrations of applications for receiving notification for a health status of network connectivity of a cloud platform in accordance with implementations of the present disclosure.

FIG. 18 is a block diagram for an example method 1800 for removal of registrations of applications for receiving notification for a health status of network connectivity of a cloud platform in accordance with implementations of the present disclosure. The example method 1800 may include a service/application 1810, a health service 1820, a monitoring service 1830, and a health service storage 1840, where those components may, in some instances, correspond to the service/application 1610, the health service 1620, the monitoring service 1630, and the health service storage 1650 of FIG. 16. The method 1800 may be executed over a cloud platform as discussed in the description of FIG. 14.

At 1850, the service/application 1810 receives a notification with information about the health status of the cloud platform.

At 1851, if the notification call that is sent at 1850 hangs and/or there is an error message received, the health service 1820 may request to receive metadata information about the registered service/application 1810 from the health service storage 1840. If the service/application 1810 is not already identified as non-responsive, then, at 1852, the health service 1820 sends a request to mark the service/application 1810 as non-responsive and include a timestamp to such a record at the health service storage 1840. If the service/application 1810 is marked as non-responsive for less than a predefined amount of time, the health service 1820 does not execute any action in response to determining that the predefined amount of time has not been reached. If the service/application 1810 is marked as non-responsive for more than the predefined amount of time, then the health service 1820 requests to remove the service/application 1810 together with the information stored for the registration from the health service storage 1840. Then, the health service 1820 unregisters the application/service 1810 and stops providing notifications with the health status of the cloud platform and/or notifications about identified outages. In some instances, the health service 1820 does not have to constantly send notifications to network addresses that are non-responsive, for example, because they are no longer maintained or activated. In those cases, the performance of the health service 1820 is improved since the number of executed notification calls is reduced, and thus resource spending is improved.

If the notification that is sent at 1850 passes successfully when there was a period of non-responsiveness and the application/service 1810 has been marked as non-responsive at the health service storage 1840, then the marking is removed together with a timestamp (if stored).

Detecting Isolated Zones of a Cloud Platform

Figure 19:
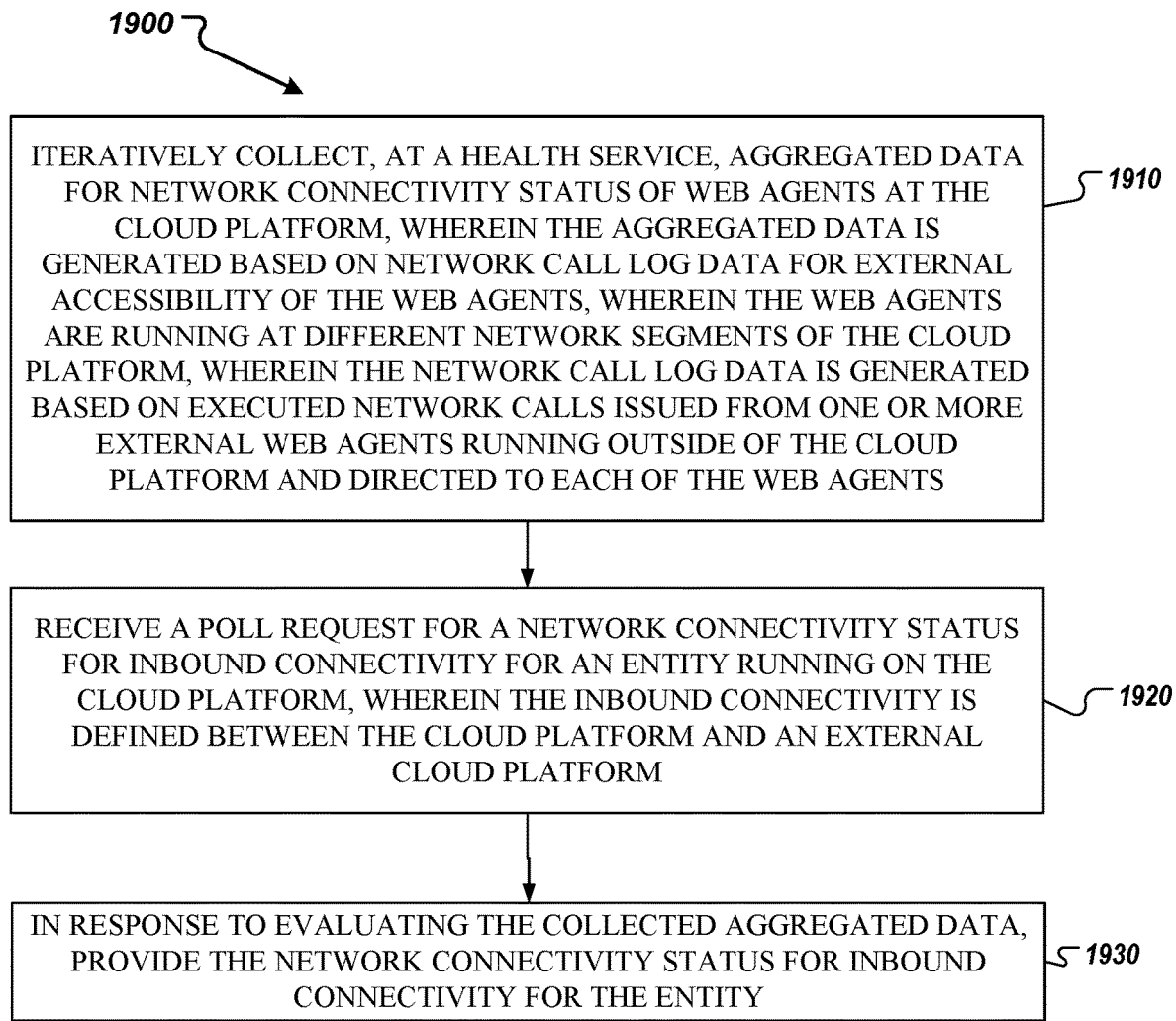
FIG. 19 is a block diagram for an example method for detecting isolated zones of a cloud platform in accordance with implementations of the present disclosure.

FIG. 19 is a block diagram for an example method 1900 for detecting isolated zones of a cloud platform in accordance with implementations of the present disclosure. The example method 1900 may be executed at a health service implemented as part of a monitoring framework at a cloud platform. In some instances, the monitoring framework may be implemented in a cloud platform that is a single availability zone or comprised of multiple availability zones. For example, the health service may correspond or be similar to the health service 220 of FIG. 2 as described in a single availability zone scenario. In another example, the health service may correspond to the health service 725 of the cloud platform 705, which includes multiple availability zones.

In some instances, the example method 1900 may be implemented to determine whether entities running at different segments of a cloud platform are accessible from other entities running at external environment to the cloud platform. For example, the method 1900 may be implemented to determine whether applications or services running at a first cloud platform may be accessibly by entities running at an external second cloud platform.

In some instances, web agents may be installed and configured to run on the first cloud platform and on the external cloud platform, where the external web agents that are running on the external cloud platform may be configured to execute network calls to internal web agents that are running internally on the first cloud platform. The cloud platform can include a plurality of network segments and each network segments can include at least one internal web agent. By executing calls, which are initiated from the outside of the first cloud platform, the internal web agents can collect data associated with received calls from external web agents. In some instances, the collected data may be defined and stored in different form. For example, the collected data may be a log of received calls. In another example, the collected data may be stored in the form of a counter value that may store a time period defining the period of time since a latest received call from an external web agent. In yet another example, the collected data may be stored in the form of a Boolean value flag that can be configured to change its status from "green" (1) to "red" (0), depending on received network calls. In the example of the Boolean flag implementation, the flag may be set up with an initial red status for any given internal web agent. When the web agent receives a network call, the flag can change to "green," and a next network call is awaited. If a network call is not received in a predefined time period, for example, five (5) seconds, then the flag can automatically be moved to "red" flag. When a next call is received, the status can change to a "green" flag, and further evaluations of the status can be performed iteratively based on data for received network calls with a reference to a predefined time period.

At 1910, aggregated data for network connectivity status of web agents can be iteratively collected. The web agents can run at different network segments of the cloud platform. The aggregated data can be health status data defining a connectivity status of the web agent from external web agents. For example, the aggregated data can be a status value defined on a scale of 0 and 1 corresponding to "red" (not-accessible) and "green" (accessible) status.

In some instances, the health service may iteratively collect aggregated data from some or all of the web agents configured at the cloud platform. In some instances, the aggregated data can be generated based on network call log data for external accessibility of the internal web agents. The network call log data can be stored at the internal web agents and the aggregated data can be generated based on such collected network call log data. The network call log data can be generated based on executed network calls issued from one or more external web agents running outside of the cloud platform and directed to each of the web agents.

In some instances, the health service may collect the aggregated data for network connectivity status of web agents running on the cloud platform from a monitoring service. The monitoring service can collect data from the web agents of the cloud platform. The monitoring service may collect the data from some or all of the web agents, where the agents are dispersed at the cloud platform at different segments and/or different availability zones. The collected data includes a plurality of health statuses associated with external accessibility of the web agents. For example, the health statuses may correspond to the Boolean flag values discussed, e.g. having 0 for inaccessible and 1 for accessible status.

In some instances, based on collected data from web agents at the monitoring service, the data can be grouped and further evaluated at the health service. For example, the monitoring service may aggregate the data to provide groups of statuses per network segments of an availability zone of the cloud platform.

At 1920, a poll request for a network connectivity status for inbound connectivity for an entity running on the cloud platform is received. The poll request is received at the health service. The poll request can be received from an application, service, database, an application management service, among other example of entities running on the cloud platform interested in determining the inbound connectivity status. The inbound connectivity status that is requested with the poll request can be defined as a connectivity status between the cloud platform and the external cloud platform where the external web agents execute.

At 1930, in response to evaluating the collected aggregated data at the health service, the network connectivity status for inbound connectivity for the entity is provided.

In some instances, the health service can dynamically maintain health statuses for external accessibility for the web agents running at the cloud platform. The health statuses can be determined based on tracking of consecutively received network calls issued from one or more of the external web agents and directed to each of the web agents. The health statuses can be defined on a predefined scale based on tracking of elapsed time since the latest received network call from an external web agent. In response to determining that the tracked elapsed time since the latest received network call is above a predetermined threshold value, a current health status of a web agent is dynamically determined. For example, if there have been ten (10) seconds since a web agent has not been called by an external web agent, where ten is the predetermined threshold value, then the current health status of the web agent can be dynamically determined as inaccessible, "red," or else. In some instances, the health status of a web agent can be determined on a predefined scale that maps a counter value maintained at the web agent to the predetermined scale to determine the health status, wherein the counter value stores a time period that has elapsed since the latest received network call from an external web agent.

Figure 20:
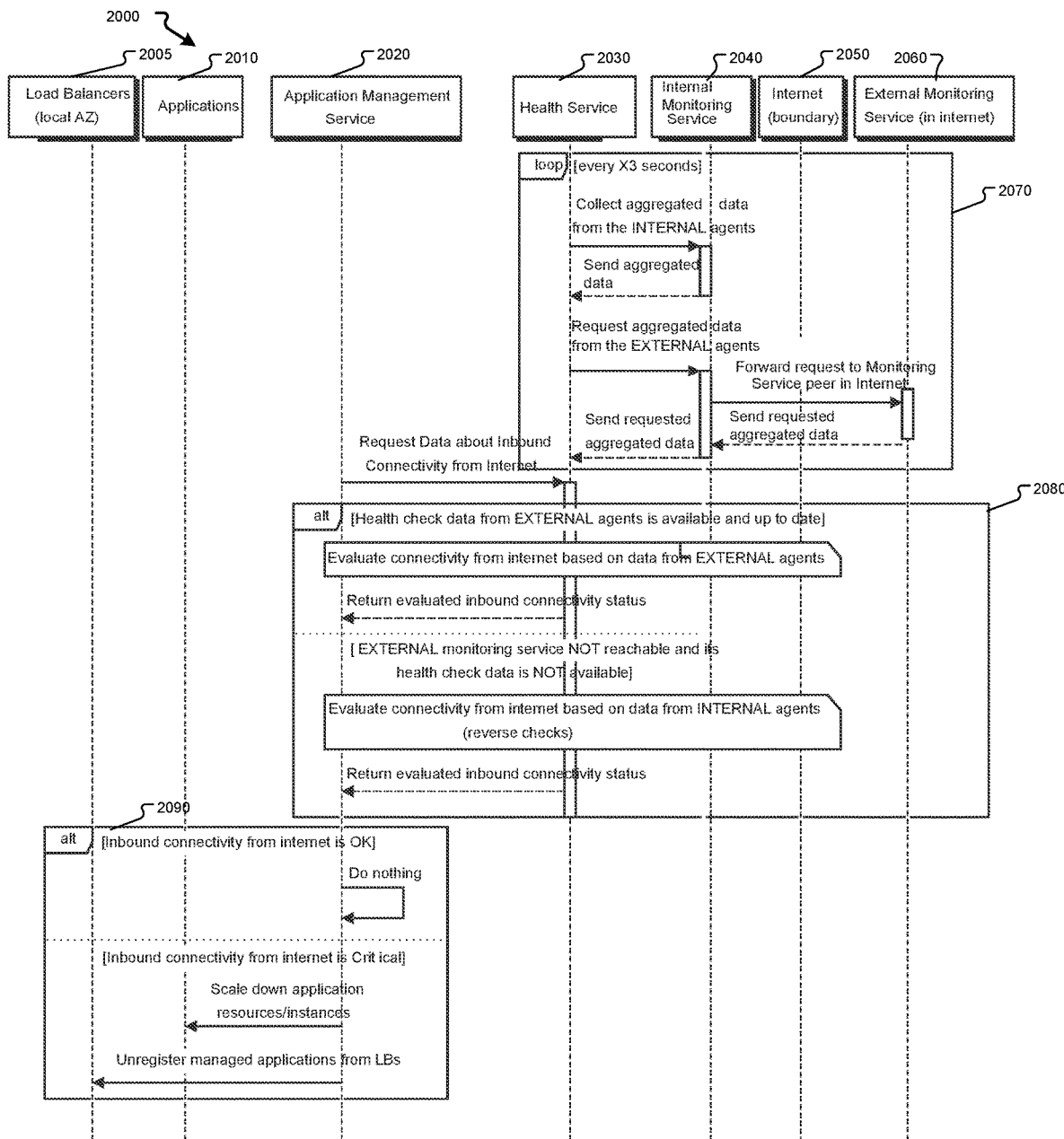
FIG. 20 is a flow chart for an example method for detecting isolated zones of a cloud platform in accordance with implementations of the present disclosure.

FIG. 20 is a block diagram for an example method 2000 for detecting isolated zones of a cloud platform in accordance with implementations of the present disclosure.

In some instances, the example method can be executed over a cloud platform as described in the disclosure of the previous figures. The cloud platform includes a health service 2030, an internal monitoring service 2040, applications 2010, and a load balancer 2005. The cloud platform can be associated with an external environment. The first cloud platform and the external environment communicate over the Internet (2050). The external environment can be a cloud platform. The external environment can include an external monitoring service 2060 that can communicate with the internal monitoring service 2040. The communication between the first cloud platform and the external environment being a cloud platform may correspond to the disclosure described for FIG. 1, FIG. 2, FIG. 7, among other figures, describing communications between entities running in connected cloud platforms. The first cloud platform and the external cloud platform can have installed and configured web agents that execute network calls between each other and/or with other configured endpoints and store network call status log data. The stored data at the web agents can be provided to monitoring services at the cloud platform and aggregated. The aggregated data can be collected at a health service corresponding to a region or the whole cloud platform and be further evaluated.

At 2070, the health service 2030 communicates iteratively with an internal monitoring service 2040 to collect aggregated data in a periodical manner. The collected aggregated data is aggregated data acquired at the internal monitoring service 2040 from web agents running on the cloud platform.

At 2080, an application management service 2020 that is running on the cloud platform requests to receive a health status for inbound network connectivity at the cloud platform. Based on the received request, health status of the cloud platform can be determined based on either communication with external web agents running at the external environment and executing network calls to the cloud platform or from the internal web agents that are running at the cloud platform and receive calls from the external web agents.

At 2090, the application management service 2020 requests to receive information about the inbound connectivity status of entities running at the cloud platform from the health service 2030. If the inbound network connectivity status is "ok" and entities are accessible from the external environment, no particular actions can be undertaken by the application management service 2020. If the inbound network connectivity is broken and entities running at the cloud platform cannot be externally accesses, the application management service 2020 may instruct an application running at a segment affected by the outage in the inbound connectivity. For example, the application management service 2020 may notify applications 2010 for the network outage in the inbound connections. The application management service 2020 may request that the applications 2010 scale down their resources as they are not accessible from the outside. For example, the applications can completely shut down, or go into a hibernate mode to reduce resource consumption. Further, the application management service 2020 may notify the load balancer 2005 that the applications 2010 is not accessible and thus unregister the application from the load balancer 2005 as unable to process requests. Thus, if a request for such application are received, those requests can be dispatched to different instances performing same services, or a relevant response can be provided to the requesting party.

Figure 21:
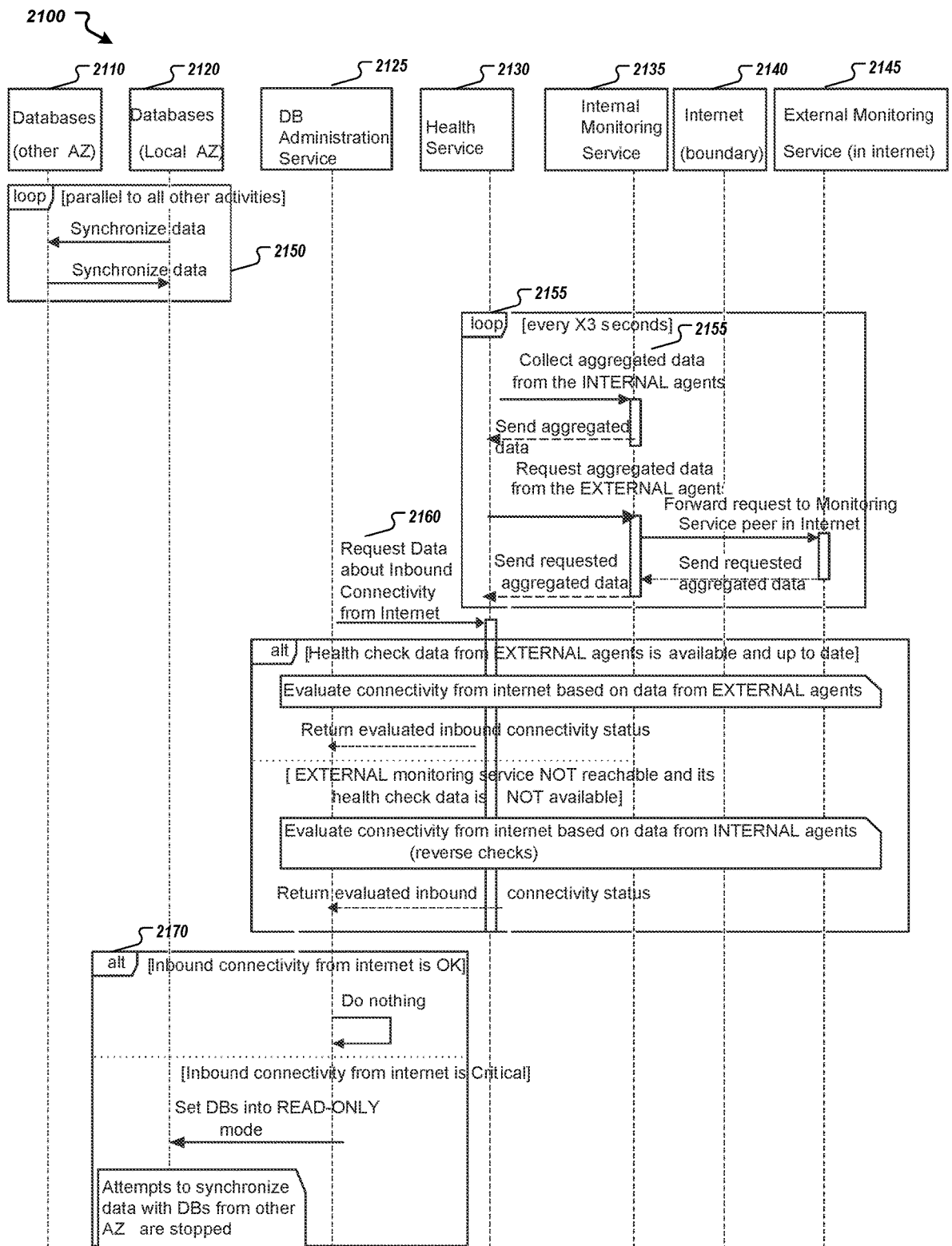
FIG. 21 is a block diagram for an example method for detecting isolated zones of a cloud platform including multiple availability zones in accordance with implementations of the present disclosure.

FIG. 21 is a block diagram for an example method 2100 for detecting isolated zones of a cloud platform including multiple availability zones in accordance with implementations of the present disclosure. In some instances, the example method 2100 can be executed over a cloud platform as described in the disclosure of the previous figures. The example method may involve databases 2110 and database 2120 running at different availability zones of a cloud application having a multiple availability zone architecture. The two databases 2110 and 2120 execute data synchronization at 2150.

The cloud platform also includes a health service 2130, an internal monitoring service 2135 and a database administration service 2125. The cloud platform can be associated with an external environment. The first cloud platform and the external environment communicate over the Internet (2140).

At 2155, the health service 2130 collects aggregated data from the internal monitoring service 2135, where the monitoring service collects data to generate the aggregated data from internal web agents executing on the cloud platform and from the external monitoring service 2145 that collects data for the external web agents.

At 2160, the database administration service 2125 request to collect data for inbound connectivity status from the health service 2130 and received evaluated inbound connectivity data. The evaluated data can include data from internal web agents, data from external web agents, or combination thereof.

At 2170, if the inbound connectivity is not disrupted, the database administration service 2125 does not interfere with the operations of the databases, including databases 2110 and 2120. In some instances, if the inbound connectivity is disrupted, then the database administration service 2125 may determine whether to set the database in a read-only mode as the availability zone where the database is running is isolated and may not be accessible from external entities. If the database is a primary (or lead) database instance, the database administration service 2125 may change the database to a secondary database and configure the database instance in the other availability zone (that does not have inbound connectivity issues) to take the role of a primary (or lead) database node.

In some instances, during an inbound connectivity disruption, one availability zone may be inaccessible from external resources. Thus, a database running at such an availability zone would not be able to receive data during data synchronization, and thus cannot be used as a main instance for execution of services, or as a secondary backup instance, as access would be restricted. Therefore, by setting the database that is affected by a disruption of inbound network connectivity is a read-only mode, data from the database can be read, but no updates, modifications, or additions to the database can be done until the database is switched to fully productive read-write mode.

Figure 22:
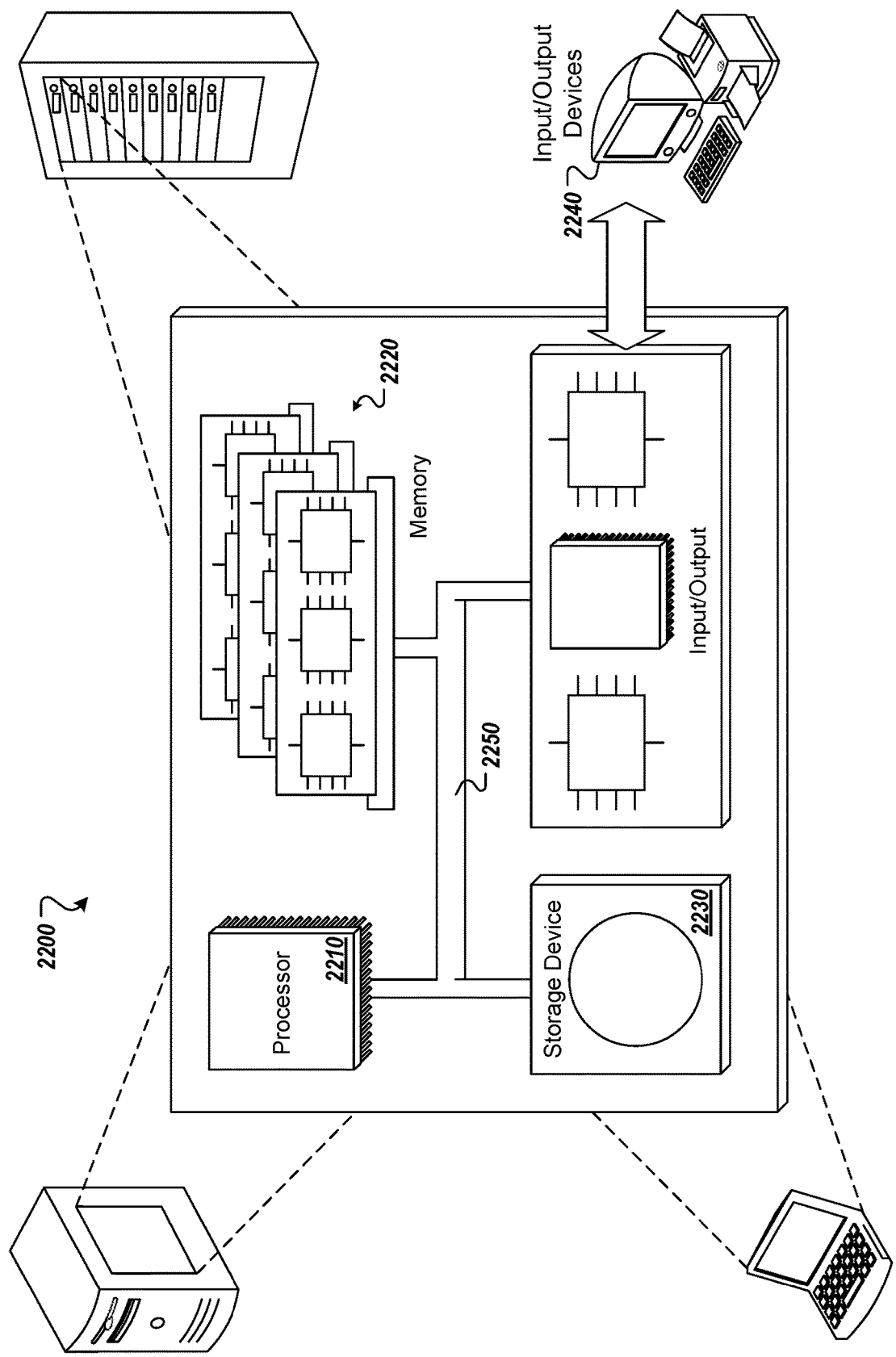
FIG. 22 is a schematic illustration of example computer systems that can be used to execute implementations of the present disclosure.

Referring now to FIG. 22, a schematic diagram of an example computing system 2200 is provided. The system 2200 can be used for the operations described in association with the implementations described herein. For example, the system 2200 may be included in any or all of the server components discussed herein. The system 2200 includes a processor 2210, a memory 2220, a storage device 2230, and an input/output device 2240. The components 2210, 2220, 2230, and 2240 are interconnected using a system bus 2250. The processor 2210 is capable of processing instructions for execution within the system 2200. In some implementations, the processor 2210 is a single-threaded processor. In some implementations, the processor 2210 is a multi-threaded processor. The processor 2210 is capable of processing instructions stored in the memory 2220 or on the storage device 2230 to display graphical information for a user interface on the input/output device 2240.

The memory 2220 stores information within the system 2200. In some implementations, the memory 2220 is a computer-readable medium. In some implementations, the memory 2220 is a volatile memory unit. In some implementations, the memory 2220 is a non-volatile memory unit. The storage device 2230 is capable of providing mass storage for the system 2200. In some implementations, the storage device 2230 is a computer-readable medium. In some implementations, the storage device 2230 may be a floppy disk device, a hard disk device, an optical disk device, or a tape device. The input/output device 2240 provides input/output operations for the system 2200. In some implementations, the input/output device 2240 includes a keyboard and/or pointing device. In some implementations, the input/output device 2240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also (alternatively) defined in accordance with the following examples:

Detecting Outages in a Cloud Environment

Example 1. A computer-implemented method, the method comprising: configuring a plurality of internal web agents installed at a corresponding plurality of network segments of a first cloud platform and a plurality of external web agents installed at an external second cloud platform, wherein the plurality of internal web agents and the plurality of external web agents are configured to perform network calls between themselves and the other web agents and to store response data for sent and received network calls, wherein an internal web agent from the plurality of internal web agents is configured to execute an external network call to an external resource available on the Internet to collect response data;
  automatically collecting data from the plurality of internal web agents to generate structured data defining network connectivity status corresponding to the plurality of network segments of the first cloud platform based on the performed network calls between the internal and external web agents; and
  in response to evaluating the structured data, determining a health status of network connectivity of the first cloud platform to be provided to platform services provided by the first cloud platform and/or applications running on the first cloud platform to support managing of lifecycles of entities running on the first cloud platform.

Example 2. The method of Example 1, wherein evaluating the structure data comprises:
  determining whether there is an outage associated with the cloud platform, wherein an outage is determine based on response results of the performed network calls between the plurality of internal web agent and the plurality of external web agents; and in response to determining that there is an outage, determining scope of the outage, wherein the scope of the outage defines limited network segments of the cloud platform, wherein the outage is associated with at least one of an outbound, inbound, and internal network connection disruptions.

Example 3. The method of any one of the preceding Examples, further comprising:
  providing a notification to at least one subscribed entity running at one of the plurality of network segments on the first cloud platform, wherein the notification includes an identification of the scope of the determined outage.

Example 4. The method of any one of the preceding Examples, wherein determining the health status of network connectivity of the first cloud platform comprises:
  identifying a network outage at a network segment from the plurality of network segments based on the evaluation of the structured data, wherein identifying the network outage comprises determining a limit of connectivity between at least one of (i) entities running at the network segment and entities at other network segments of the first cloud platform, (ii) entities running at the first cloud platform and entities running at different cloud platforms connected to the first cloud platform, and (iii) external resources to the first cloud platform accessible over the Internet.

Example 5. The method of any one of the preceding Examples, wherein at least one web agent from the plurality of internal web agents is installed within each of the network segments of the first cloud platform.

Example 6. The method of any one of the preceding Examples, wherein the network segments include a core segment, a service segment, a database segment, and an application segment.

Example 7. The method of Example 6, wherein:
the service segment includes one or more application services providing services for consumption by one or more applications running at the application segment of the first cloud platform and/or to entities running at external environments for the first cloud platform, wherein an application service from the one or more application services consumes data from a database running at the database segment,
the application segment includes the one or more applications that provide services for consumption by other applications running at the first cloud platform and/or at external environments for the first cloud platform, wherein an application from the one or more applications consumes data from a database running at the database segment, and
the database segment includes one or more databases to store data that is accessible for consumption by at least one of an application service at the service segment and an application at the application segment running at the first cloud platform.

Example 8. The method of Example 7, wherein the data from the plurality of internal web agents is collected at a monitoring service running at the core segment, and wherein the collected data from the monitoring service is evaluated by a health service running at the segment to generate the structured data.

Example 9. The method of any one of the preceding Examples, wherein the determined health status comprises at least one of (i) information defining a network outage being an outbound connectivity network outage, wherein the outbound connectivity network outage limits entities running at the first cloud platform to send requests and access services running on an external cloud platform and/or the Internet, and (ii) information defining a network outage being an inbound connectivity network outage, wherein the inbound connectivity network outage limits an entity running on the first cloud platform to provide services to other entities running on an external cloud platform and/or the Internet.

Example 10. The method of Example 9, further comprising:
receiving a request for a health outbound connectivity status of the first cloud platform, wherein the request is received from an application running on the first cloud platform; and in response to the received request, providing the outbound connectivity status to the application, wherein the outbound connectivity status is determined based on the determined health status of the first cloud platform.

Example 11. The method of any one of the preceding Examples, wherein the external web agents are installed and configured at the second cloud platform communicatively coupled to the first cloud platform.

Example 12. The method of any one of the preceding Examples, wherein the automatically collected data from the plurality of internal web agents is collected at predefined periodic time periods.

Detecting Outages in a Multiple Availability Zone Cloud Environment

Example 1. A computer-implemented method for determining a health status in multiple availability zones of a cloud landscape, the method comprising:
iteratively collecting, at a plurality of availability zones of a first cloud platform, internal structured data defining network connectivity statuses of network segments, wherein the network segments are correspondingly defined for the plurality of availability zones of the first cloud platform, and wherein the plurality of availability zones of the first cloud platform are defined in a multiple availability zone cloud architecture;
iteratively collecting, at the plurality of availability zones of the first cloud platform, external structure data defining inbound connectivity statuses of the network segments correspondingly defined for the plurality of availability zones of the first cloud platform, wherein the inbound connectivity statuses define availability for an entity running at an external cloud platform to the first cloud platform to connect to at least one entity running at the first cloud platform; and in response to evaluating the internal and external structured data, determining a health status of the first cloud platform to be provided to platform services provided by the first cloud platform and/or applications running on the first cloud platform to support managing of lifecycle of entities running on the first cloud platform, wherein the health status includes at least one of an inbound connectivity status of the first cloud platform, an outbound connectivity status of the first cloud platform, and an internal connectivity status of the first cloud platform.

Example 2. The method of Example 1, wherein the inbound connectivity status defines external cloud accessibility status for network connectivity between entities running at an external second cloud platform and entities running at the first cloud platform.

Example 3. The method of any one of the preceding Examples, wherein the outbound connectivity status defines an accessibility status for network connectivity between entities running at different network segments from the plurality of availability zones and external resources available over the Internet.

Example 4. The method of any one of the preceding Examples, wherein the internal connectivity status defines internal zone accessibility status between entities running at a network segment of the network segments of a first zone from the plurality of availability zones and entities running at a network segment of the network segments of the first zone and/or of a second zone of the plurality of availability zones of the first cloud platform.

Example 5. The method of any one of the preceding Examples, further comprising:
automatically collecting, at a first monitoring service running at a first availability zone of the first cloud platform, first data from a first plurality of internal web agents to generate structured data corresponding to network segments of the first availability zone, wherein the first data includes status data for sent and/or received network calls at the first plurality of internal web agents; and automatically collecting, at a second monitoring service running on at a second availability zone of the first cloud platform, second data from a second plurality of internal web agents to generate structured data corresponding to network segments of the second availability zone, wherein the second data includes status data for sent and/or received network calls at the first plurality of internal web agents,
wherein the iteratively collected internal structured data at the plurality of availability zones of the first cloud platform includes the first data and the second data.

Example 6. The method of Example 5, wherein automatically collecting the first and the second data at the first monitoring service and the second monitoring service further comprising:

automatically collecting, at the first monitoring service and at the second monitoring service, external connectivity data for external accessibility of corresponding network segments at the first availability zone and at the second availability zone of the first cloud platform, wherein the external connectivity data is received from a second cloud platform external to the first cloud platform, and wherein the external connectivity data is based on status data for sent and/or received calls at external web agents running at the second cloud platform, wherein the iteratively collected external structured data at the plurality of availability zones of the first cloud platform includes the external connectivity data.

Example 7. The method of any one of the preceding Examples, wherein a first plurality of internal web agents that is installed at a first plurality of network segments of a first availability zone of the first cloud platform is configured to perform network calls to entities running at the corresponding plurality of network segments of the first availability zone, wherein the first cloud platform includes the plurality of availability zones that are accessible through one network address, and wherein a second plurality of internal web agents is installed at a second plurality of network segments of a second availability zone of the first cloud platform.

Example 8. The method of any one of the preceding Examples, further comprising:
configuring a plurality of external web agents installed at the external cloud platform to execute network calls to a plurality of internal web agents running at different network segments defined correspondingly for the plurality of availability zones of the first cloud platform.

Example 9. The method of Example 8, wherein the plurality of external web agents are configured to perform network calls to an entity running at a network segment of at least one of the plurality of availability zones of the first cloud platform;

Example 10. The method of any one of the preceding Examples, wherein determining the health status comprises:
identifying a network outage at a network segment from the network segments of at least one of the plurality of availability zones based on the evaluation of the external and internal structured data, wherein at least some on the external and internal structured data identifies failure in connectivity between an internal web agent running at the network segment and at least one internal web agent running at another network segment, and wherein the network outage limits connectivity between at least one of entities running at the network segment and entities at other network segments of the first cloud platform, entities running at the first cloud platform and entities running at different cloud platforms connected to the first cloud platform, and external resources to the first cloud platform accessible over the Internet.

Example 11. The method of any one of the preceding Examples, wherein determining the health status of the cloud platform comprises:
determining whether there is an outage associated with the cloud platform, wherein the outage is identifiable at a network segment from the network segments based on the evaluation of the data defining the statuses of the network calls exchanged, wherein the outage limits connectivity between at least one of i) entities running at the network segment and entities at other network segments of the first cloud platform, ii) entities running at the first cloud platform and entities running at different cloud platforms connected to the first cloud platform; and
in response to determining that there is an outage, determining scope of the outage, wherein the scope of the outage defines limited network segments from the cloud platform for outbound and inbound connections, wherein a network segment from the limited network segments is determined as affected by the outage when at least a portion of the internal and external structured data identifies failed calls to an internal web agent running at the network segment from an external entity running at other network segment on the first cloud platform different from the limited network segments and/or an external entity running in a different, second, cloud platform.

On-Demand Outages Notification in a Cloud Environment

Example 1. A computer-implemented method for providing notifications for a health status of network connectivity of a cloud platform, the method comprising:
evaluating, at a health service running on a cloud platform, data defining statuses of network calls exchanged between web agents registered at correspondingly different network segments of the cloud platform to determine health statuses of the cloud platform;
in response to receiving a request to subscribe an application for notifications for a current health status, registering, at the health service, the application to receive the notifications associated with health statuses of network connectivity of the cloud platform, wherein the application is registered to receive the notifications at a subscription network address under a notification regime; and dynamically providing, by the health service, a notification for the current health status of network connectivity of the cloud platform, the notification being provided to the registered application according to notification rules defined in the notification regime, wherein the notification rules include a rule defining granularity of data associated with provided current health status of the cloud platform that is to be provided to the registered application with the notification.

Example 2. The method of Example 1, wherein the health service stores, at a health service storage maintained at the cloud platform, metadata about the registered application and the subscription network address.

Example 3. The method of any one of the preceding Examples, further comprising:
determining, at the health service, health statuses of the cloud platform, wherein determining a health status of the health statuses includes at least one of an inbound connectivity status of the cloud platform, ii) an outbound connectivity status of the cloud platform.

Example 4. The method of any one of the preceding Examples, further comprising:
determining a health status of the cloud platform, wherein determining the health status of the cloud platform comprises determining an internal connectivity status between a plurality of availability zones of the cloud platform, wherein the first cloud platform is defined in a multiple availability zone architecture including the plurality of availability zones.

Example 5. The method of any one of the preceding Examples, further comprising:
automatically receiving, at the health service running on the cloud platform, the data from a monitoring service running on the cloud platform, wherein the monitoring service collects the data from the web agents installed and registered at the different network segments of the cloud platform.

Example 6. The method of Example 5, further comprising: in response to the receiving the data from the monitoring service running on the cloud platform, generating, at the health service, structured data correspondingly defining network connectivity status for the different network segments;
  determining the current health status of the first cloud platform based on evaluating the structured data according to predefined status evaluation rules; and providing the notification to the registered application to include the determined current health status.

Example 7. The method of any one of the preceding Examples, wherein the notification to the registered application is dynamically provided in response to determining a change between a previously determined health status and the current health status of the cloud platform.

Example 8. The method of any one of the preceding Example, wherein the received request to register the application defines the notification regime as a regular notification process, and wherein under the regular notification process the health service is configured to provide scheduled notifications in regular time period intervals to the registered network address with current health statuses of the first cloud platform, wherein the time period intervals are predefined for the registered application.

Example 9. The method of any one of the preceding Examples, further comprising:
  maintaining, at a storage of the health service, records including health statuses of the cloud platform, wherein the records are associated with consecutive time points when corresponding health statuses are determined by the health service according to health evaluation logic.

Example 10. The method of any one of the preceding Example, wherein the received request to register the application defines the notification regime as a notification process triggered by a change between determined consecutive health statuses, and wherein the health service is configured to provide the notification to the registered network address with the current health status of the first cloud platform.

Example 11. The method of any one of the preceding Examples, further comprising:
  installing and configuring a first set of the plurality of web agents as internal web agents installed at a corresponding plurality of network segments of a first cloud platform and a plurality of external web agents installed at an external second cloud platform to perform network calls to entities running at corresponding network segments from the plurality of network segments.

Example 12. The method of any one of the preceding Examples, the method further comprising, in response to determining that the registered application is non-responsive to within a predefined time period, actively unregistering, at the health service, the application to receive the notifications.

Example 13. The method of any one of the preceding Examples, the method further comprising determining a health status of the cloud platform, wherein determining the health status of the cloud platform comprises:
  determining whether there is an outage associated with the cloud platform, wherein an outage is identifiable at a network segment from the network segments based on the evaluation of the data defining the statuses of the network calls exchanged, wherein the outage limits connectivity between at least one of i) entities running at the network segment and entities at other network segments of the first cloud platform, ii) entities running at the first cloud platform and entities running at different cloud platforms connected to the first cloud platform, and
  in response to determining that there is an outage, determining scope of the outage, wherein the scope of the outage defines limited network segments from the cloud platform for outbound and inbound connections.

Example 14. The method of Example 13, further comprising: in response to determining the scope of the outage, determining an outage status level from a predefined set of levels;
  in response to determining the outage status level, determining corresponding actions for an entity running on the cloud platform that is affected by the outage, wherein actions include countermeasures related to the execution of the entity to provide services by the entities affected by the outage.

Reverse Health Checks

Example 1. A computer-implemented method to detect isolated zones of a cloud platform, the method comprising:
  iteratively collecting, at a health service, aggregated data for network connectivity status of web agents at the cloud platform, wherein the aggregated data is generated based on network call log data for external accessibility of the web agents, wherein the web agents run at different network segments of the cloud platform, and wherein the network call log data is generated based on executed network calls issued from one or more external web agents running outside of the cloud platform and directed to each of the web agents at the cloud platform;
  receiving a poll request for a network connectivity status for inbound connectivity for an entity running on the cloud platform, wherein the inbound connectivity is defined between the cloud platform and an external cloud platform; and
  in response to evaluating the collected aggregated data, providing the network connectivity status for inbound connectivity for the entity.

Example 2. The method of Example 1, wherein the poll request is received from the entity running on the cloud platform.

Example 3. The method of Example 1 or Example 2, wherein the poll request is received from a service manager of the cloud platform.

Example 4. The method of any one of the preceding Examples, further comprising:
  collecting, at a monitoring service running on the cloud platform, data including a plurality of health statuses associated with external accessibility of the web agents of the cloud platform from external web agents running on an external cloud platform, wherein the data is aggregated to determine the network connectivity status of the cloud platform from the external cloud platform.

Example 5. The method of any one of the preceding Examples, further comprising:
  dynamically maintaining health statuses for external accessibility for the web agents running at the cloud platform, wherein the cloud platform includes a plurality of network segments and each network segments includes at least one web agent, wherein the health statuses are determined based on tracking of consecutively received network calls issued from one or more of the external web agents and directed to each of the web agents.

Example 6. The method of Example 5, wherein the health statuses are defined on a predefined scale based on tracking of time elapsed since the latest received network call from an external web agent.

Example 7. The method of Example 6, further comprising: in response to determining that the tracked time elapsed since the latest received network call is above a predetermined threshold value, dynamically updating a current health status of a web agent.

Example 8. The method of Example 6 or 7, wherein a health status of a web agent is determined on a predefined scale that maps a counter value maintained at the web agent to the predetermined scale to determine the health status, wherein the counter value stores a time period that has lapsed since the latest received network call from an external web agent.

What is claimed is:

1. A computer-implemented method executed at a health service, the method comprising:
   acquiring data for network calls performed between a first internal web agent installed at a first network segment of a plurality of network segments of a first cloud platform and at least one of a second internal web agent installed at a second network segment of the first cloud platform and at least one external web entity running outside of the first cloud platform, wherein the first network segment and the second network segment are network segments of a first availability zone of the cloud platform;
   automatically generating structured data defining network connectivity status corresponding to the first network segment based on response results of performed network calls from the first internal web agent and to the first internal web agent as acquired from the data for the performed network calls; and
   dynamically determining, based on an evaluation of the structured data and by the health service, a current health status of network connectivity of the first cloud platform, wherein the current health status is allocated to at least one of (i) a particular network segment of the first cloud platform, (ii) a particular availability zone of the cloud platform, or (iii) the first cloud platform as a whole.

2. The method of claim 1, the method comprising:
   periodically collecting, at a monitoring service running at a core segment of the first cloud platform, the data for the performed network calls, wherein the network calls include calls between (i) at least one agent of a plurality of internal web agents installed at a corresponding segment of the plurality of network segments of the first cloud platform and at least one other internal web agent installed at a different network segment of the first cloud platform and (ii) at least one of the plurality of internal web agents and an external web agent as an external web entity running on an external second cloud platform.

3. The method of claim 1, wherein determining the current health status of network connectivity of the first cloud platform comprises:
   determining whether there is an outage associated with the first cloud platform at one or more network segments, wherein an outage is determined for the first network segment based on the response results of performed network calls from internal web agents installed at the plurality of network segments at the first availability zone of the first cloud platform; and
   in response to determining that there is the outage for the first network segment, determining a scope of the outage, wherein the scope of the outage defines that the first network segment is with limited network connectivity, wherein the outage is associated with at least one of an outbound, inbound, and internal network connection disruptions.

4. The method of claim 3, wherein determining the scope of the outage comprises:
   determining that an entity running on a network segment outside of the scope of the determined outage on the first cloud platform is available to provide platform services when invoked by entities running on one of (i) a different network segment of the first cloud platform outside of the scope of the outage or (ii) at an external second cloud platform outside of the first cloud platform.

5. The method of claim 3, wherein the evaluation of the structured data is performed at a health service running on the first cloud platform to determine health statuses of network connectivity of at least one network segments of the first cloud platform, wherein the evaluation comprises:
   in response to receiving a request to subscribe an application for notifications for a current health status, registering, at the health service, the application to receive the notifications associated with the health statuses of network connectivity of the first cloud platform, wherein the application is registered to receive the notifications at a subscription network address under a notification regime; and
   dynamically providing, by the health service, a notification for the current health status for the registered application according to notification rules defined in the notification regime, wherein the notification includes an identification of the scope of the determined outage, and wherein the current health status is associated with a network segment where the registered application is running.

6. The method of claim 3, wherein determining the scope of the outage comprises:
   identifying a network outage at a network segment from the plurality of network segments based on the evaluation of the structured data, wherein identifying the network outage comprises determining a limit of connectivity between at least one of (i) entities running at the network segment and entities at other network segments of the first cloud platform, (ii) entities running at the first cloud platform and entities running at different cloud platforms connected to the first cloud platform, or (iii) external resources to the first cloud platform accessible over the Internet;
   wherein an internal web agent from a plurality of internal web agents running at different network segment of the first cloud platform is configured to execute an external network call to an external resource available on the Internet to collect response data.

7. The method of claim 6, wherein the first cloud platform includes a plurality of network segments including a service segment and an application segment, wherein:
   the service segment includes one or more application services providing services for consumption by at least one of (i) one or more applications running at the application segment of the first cloud platform or (ii) entities running at external environments for the first cloud platform, wherein an application service from the one or more application services consumes data from a database; and the application segment includes the one or more application services that provide services for consumption by other applications running at at least one of the first cloud platform and at external environments for the first cloud platform, wherein an application service from the one or more application services consumes data from a database, and wherein the database stores data that is accessible for consumption by at least one of an application service at the service segment and an application at the application segment running at the first cloud platform.

8. The method of claim 3, wherein the scope of the outage comprises at least one of (i) information defining a network outage being an outbound connectivity network outage, wherein the outbound connectivity network outage limits entities running at the first cloud platform from sending requests and accessing services running on at least one of an external cloud platform or the Internet, or (ii) information defining a network outage being an inbound connectivity network outage, wherein the inbound connectivity network outage limits an entity running on the first cloud platform from providing services to other entities running on at least one of an external cloud platform or the Internet.

9. The method of claim 8, further comprising:
receiving a request for a health outbound connectivity status of the first cloud platform, wherein the request is received from an application running on the first cloud platform; and
in response to the received request, providing the health outbound connectivity status to the application, wherein the health outbound connectivity status is determined based on the scope of the outage.

10. A non-transitory, computer-readable medium coupled to one or more processors and having instructions stored thereon which, when executed by the one or more processors, cause the one or more processors to perform operations, the operations comprising:
acquiring data for network calls performed between a first internal web agent installed at a first network segment of a plurality of network segments of a first cloud platform and at least one of a second internal web agent installed at a second network segment of the first cloud platform and at least one external web entity running outside of the first cloud platform, wherein the first network segment and the second network segment are network segments of a first availability zone of the cloud platform;
automatically generating structured data defining network connectivity status corresponding to the first network segment based on response results of performed network calls from the first internal web agent and to the first internal web agent as acquired from the data for the performed network calls; and
dynamically determining, based on an evaluation of the structured data and by a health service, a current health status of network connectivity of the first cloud platform, wherein the current health status is allocated to at least one of (i) a particular network segment of the first cloud platform, (ii) a particular availability zone of the cloud platform, or (iii) the first cloud platform as a whole.

11. The non-transitory computer-readable medium of claim 10, further having instructions stored thereon, which when executed by the one or more processors, cause the one or more processors to perform operations comprising:
periodically collecting, at a monitoring service running at a core segment of the first cloud platform, the data for the performed network calls, wherein the network calls include calls between (i) at least one agent of a plurality of internal web agents installed at a corresponding segment of the plurality of network segments of the first cloud platform and at least one other internal web agent installed at a different network segment of the first cloud platform and (ii) at least one of the plurality of internal web agents and an external web agent as an external web entity running on an external second cloud platform.

12. The non-transitory computer-readable medium of claim 11, wherein determining the current health status of network connectivity of the first cloud platform comprises:
determining whether there is an outage associated with the first cloud platform at one or more network segments, wherein an outage is determined for the first network segment based on the response results of performed network calls from internal web agents installed at the plurality of network segments at the first availability zone of the first cloud platform; and
in response to determining that there is the outage for the first network segment, determining a scope of the outage, wherein the scope of the outage defines that the first network segment is with limited network connectivity, wherein the outage is associated with at least one of an outbound, inbound, and internal network connection disruptions.

13. The non-transitory computer-readable medium of claim 12, wherein determining the scope of the outage comprises:
determining that an entity running on a network segment outside of the scope of the determined outage on the first cloud platform is available to provide platform services when invoked by entities running on one of (i) a different network segment of the first cloud platform outside of the scope of the outage or (ii) at an external second cloud platform outside of the first cloud platform.

14. The non-transitory computer-readable medium of claim 12, wherein the evaluation of the structured data is performed at a health service running on the first cloud platform to determine health statuses of network connectivity of at least one network segments of the first cloud platform, wherein the evaluation comprises:
in response to receiving a request to subscribe an application for notifications for a current health status, registering, at the health service, the application to receive the notifications associated with the health statuses of network connectivity of the first cloud platform, wherein the application is registered to receive the notifications at a subscription network address under a notification regime; and
dynamically providing, by the health service, a notification for the current health status for the registered application according to notification rules defined in the notification regime, wherein the notification includes an identification of the scope of the determined outage, and wherein the current health status is associated with a network segment where the registered application is running.

15. A system comprising
at least one processor; and memory communicatively coupled to the at least one processor and having instructions stored thereon which, when executed by the processor, cause the processor to perform operations, the operations comprising:

acquiring data for network calls performed between a first internal web agent installed at a first network segment of a plurality of network segments of a first cloud platform and at least one of a second internal web agent installed at a second network segment of the first cloud platform and at least one external web entity running outside of the first cloud platform, wherein the first network segment and the second network segment are network segments of a first availability zone of the cloud platform;

automatically generating structured data defining network connectivity status corresponding to the first network segment based on response results of performed network calls from the first internal web agent and to the first internal web agent as acquired from the data for the performed network calls; and dynamically determining, based on an evaluation of the structured data and by a health service, a current health status of network connectivity of the first cloud platform, wherein the current health status is allocated to at least one of (i) a particular network segment of the first cloud platform, (ii) a particular availability zone of the cloud platform, or (iii) the first cloud platform as a whole.

16. The system of claim 15, wherein the memory further stores instructions, which when executed by the at least one processor, cause the at least one processor to perform operations comprising:

periodically collecting, at a monitoring service running at a core segment of the first cloud platform, the data for the performed network calls, wherein the network calls include calls between (i) at least one agent of a plurality of internal web agents installed at a corresponding segment of the plurality of network segments of the first cloud platform and at least one other internal web agent installed at a different network segment of the first cloud platform and (ii) at least one of the plurality of internal web agents and an external web agent as an external web entity running on an external second cloud platform.

17. The system of claim 15, wherein determining the current health status of network connectivity of the first cloud platform comprises:

determining whether there is an outage associated with the first cloud platform at one or more network segments, wherein an outage is determined for the first network segment based on the response results of performed network calls from internal web agents installed at the plurality of network segments at the first availability zone of the first cloud platform; and in response to determining that there is the outage for the first network segment, determining a scope of the outage, wherein the scope of the outage defines that the first network segment is with limited network connectivity, wherein the outage is associated with at least one of an outbound, inbound, and internal network connection disruptions.

18. The system of claim 17, wherein determining the scope of the outage comprises:

determining that an entity running on a network segment outside of the scope of the determined outage on the first cloud platform is available to provide platform services when invoked by entities running on one of (i) a different network segment of the first cloud platform outside of the scope of the outage or (ii) at an external second cloud platform outside of the first cloud platform.

19. The system of claim 17, wherein the evaluation of the structured data is performed at a health service running on the first cloud platform to determine health statuses of network connectivity of at least one network segments of the first cloud platform, wherein the evaluation comprises:

in response to receiving a request to subscribe an application for notifications for a current health status, registering, at the health service, the application to receive the notifications associated with the health statuses of network connectivity of the first cloud platform, wherein the application is registered to receive the notifications at a subscription network address under a notification regime; and dynamically providing, by the health service, a notification for the current health status for the registered application according to notification rules defined in the notification regime, wherein the notification includes an identification of the scope of the determined outage, and wherein the current health status is associated with a network segment where the registered application is running.

20. The system of claim 17, wherein determining the scope of the outage comprises:

identifying a network outage at a network segment from the plurality of network segments based on the evaluation of the structured data, wherein identifying the network outage comprises determining a limit of connectivity between at least one of (i) entities running at the network segment and entities at other network segments of the first cloud platform, (ii) entities running at the first cloud platform and entities running at different cloud platforms connected to the first cloud platform, or (iii) external resources to the first cloud platform accessible over the Internet; wherein an internal web agent from a plurality of internal web agents running at different network segment of the first cloud platform is configured to execute an external network call to an external resource available on the Internet to collect response data.

* * * * *